(12) United States Patent
Porto

(10) Patent No.: US 6,572,313 B2
(45) Date of Patent: Jun. 3, 2003

(54) FREIGHT RAIL WHEELSET HANDLING AND STORAGE PROTECTION

(76) Inventor: Joseph A. Porto, 3710 Verdun Avenue #5, Verdun, Quebec (CA), H4G 1K6

( * ) Notice: Subject to any disclaimer, the term of this patent is extended or adjusted under 35 U.S.C. 154(b) by 0 days.

(21) Appl. No.: 09/901,616

(22) Filed: Jul. 11, 2001

(65) Prior Publication Data

US 2002/0098051 A1 Jul. 25, 2002

Related U.S. Application Data

(60) Provisional application No. 60/244,374, filed on Oct. 30, 2000, and provisional application No. 60/217,405, filed on Jul. 11, 2000.

(51) Int. Cl.[7] ......................... B65D 81/133; B60P 7/12; B60P 7/16; B61D 45/00
(52) U.S. Cl. .............................. 410/42; 410/36; 410/39; 410/43; 410/155; 206/443; 206/586; 248/68.1
(58) Field of Search .................. 410/30, 32, 33, 410/34, 36, 37, 39, 40, 41, 42, 43, 47, 48, 49, 50, 155; 206/443, 446, 523, 586; 248/68.1

(56) References Cited

U.S. PATENT DOCUMENTS

| | | | | |
|---|---|---|---|---|
| 3,752,086 A | * | 8/1973 | Smith | 410/42 |
| 3,994,115 A | * | 11/1976 | Mako et al. | 53/452 |
| 4,551,049 A | * | 11/1985 | Klosk | 410/42 |
| 5,170,717 A | * | 12/1992 | Richmond et al. | 105/377.09 |
| 5,735,412 A | * | 4/1998 | Sheckells | 211/59.4 |

* cited by examiner

Primary Examiner—Stephen T. Gordon
Assistant Examiner—Paul Chenevert
(74) Attorney, Agent, or Firm—Hunton & Williams

(57) ABSTRACT

This invention relates to methods that can be used for the safe storage and transportation of freight rail wheelsets. The object of this invention is to prevent the direct contact between the roller bearings or axle and the adjacent wheelset flange. To do this at storage sites the application of a roller bearing or axle protector to the present wheelset stacking arrangement is required. During transportation this objective is achieved by (a) applying roller bearing protectors, (b) applying axle protectors, (c) shifting the wheelsets on the wheel transporter so that roller bearing and adjacent wheel flange never come in contact, (d) applying wheelset stoppers and/or axle spacers.

11 Claims, 15 Drawing Sheets

Figure 5
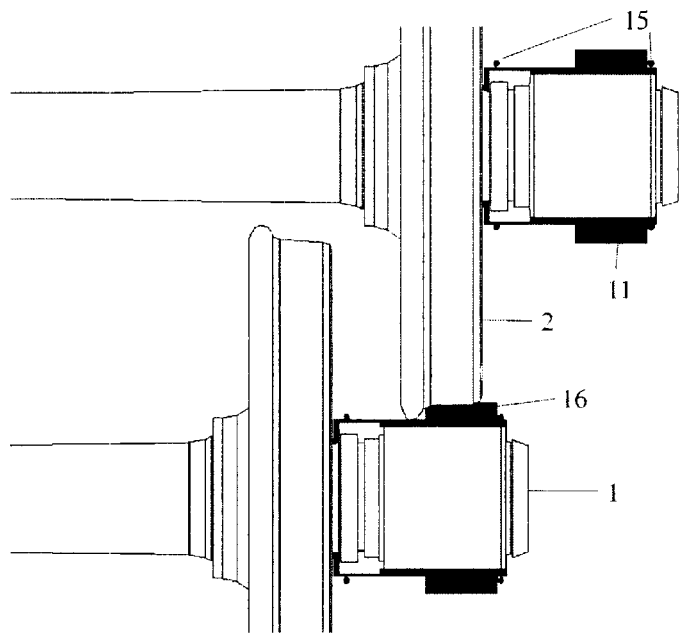
Figure 6 *(Prior Art)*
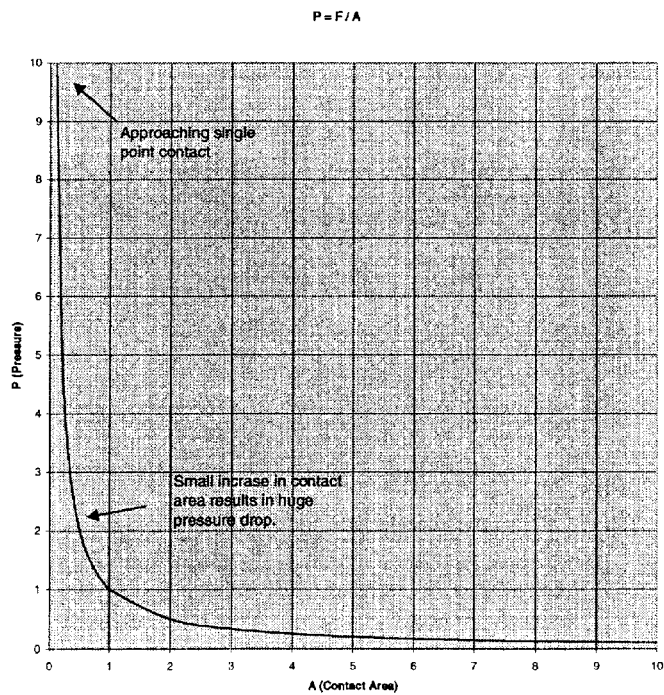

Figure 7 *(Prior Art)*
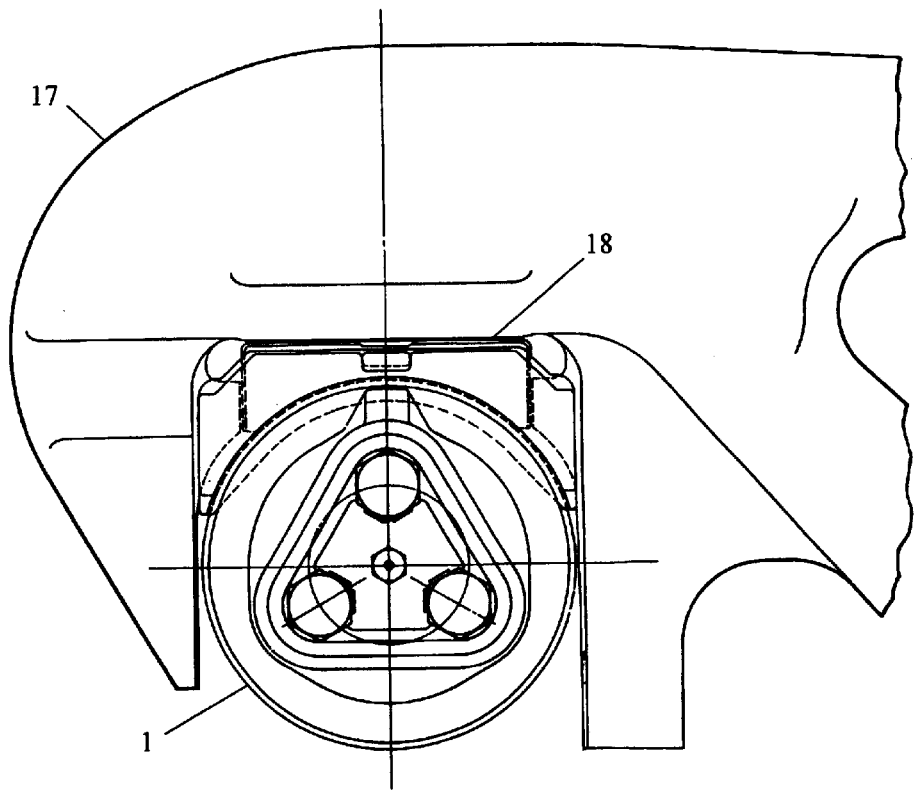
Figure 8 *(Prior Art)*
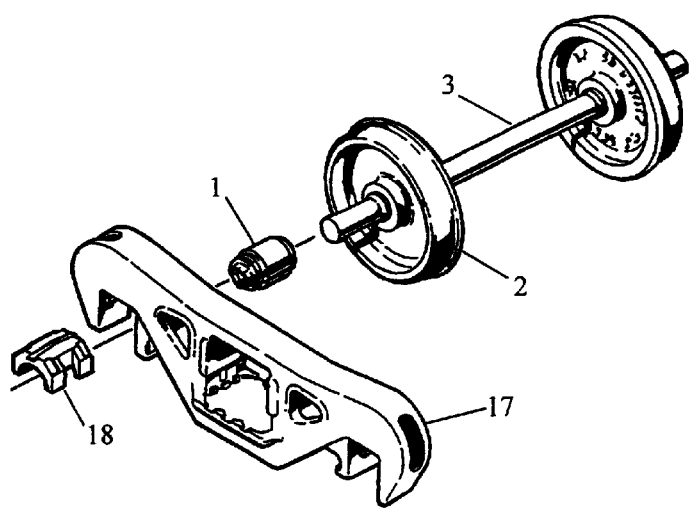

Figure 9 (*Prior Art*)
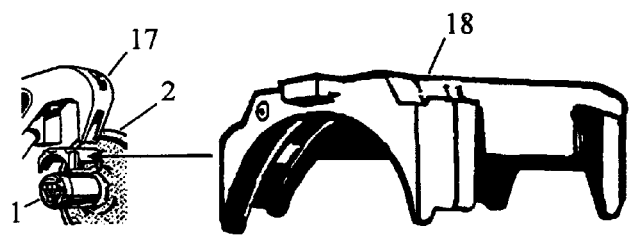
Figure 10
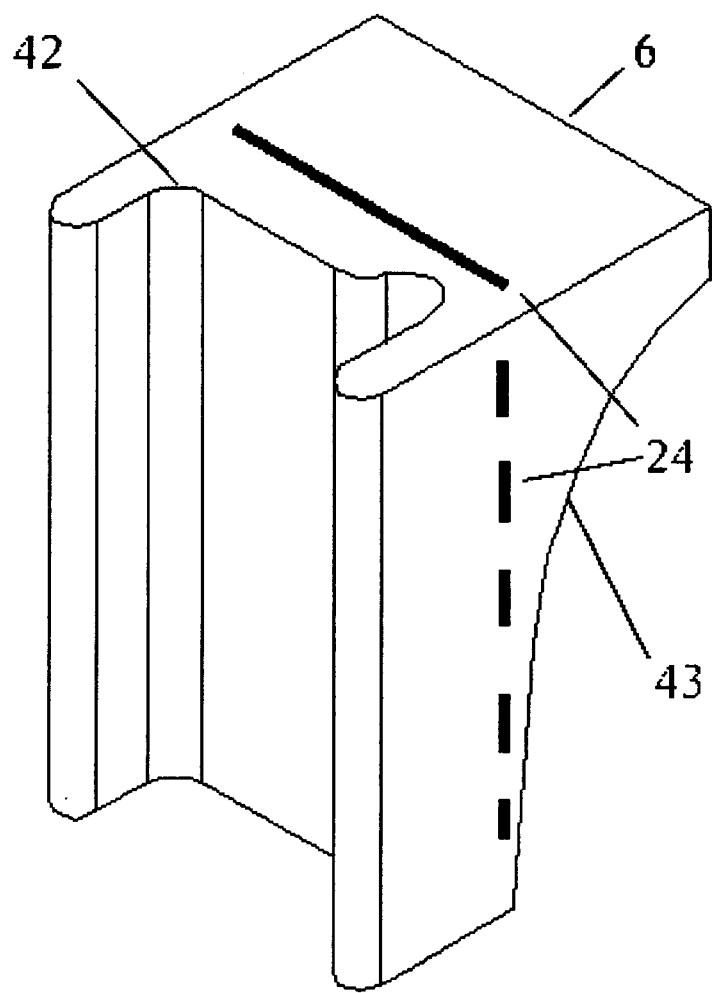

Figure 18
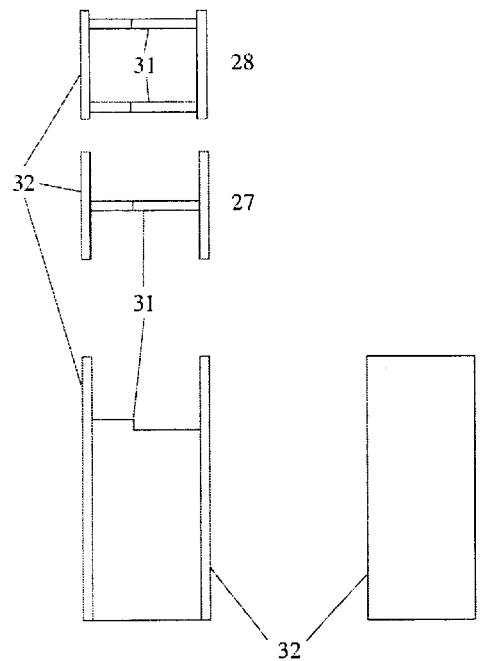
Figure 19 *(Prior Art)*
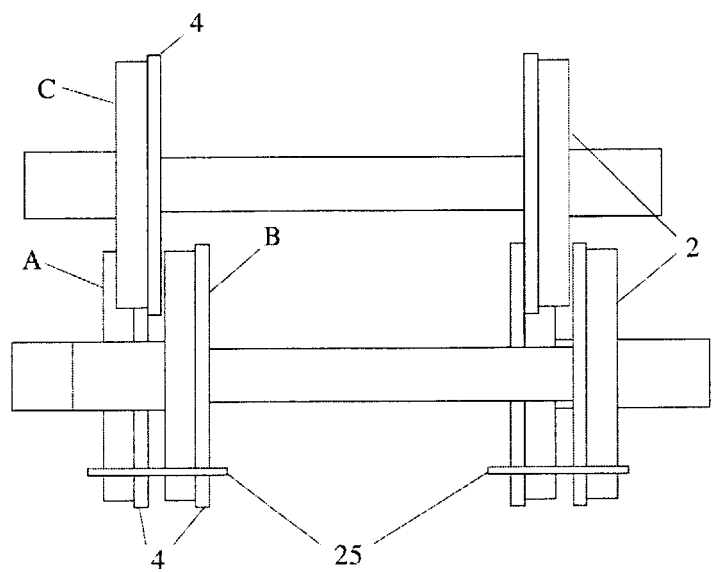

FREIGHT RAIL WHEELSET HANDLING AND STORAGE PROTECTION

REFERENCE TO RELATED APPLICATIONS

The present application claims priority from Provisional U.S. Patent Application Serial No. 60/217,405, filed Jul. 11, 2000, and Provisional U.S. Patent Application Serial No. 60/244,374, filed Oct. 30, 2000, and the teachings of said Provisional U.S. Patent Application are incorporated by reference in their entirety.

FIELD OF THE INVENTION

The present invention relates to the field of handling and storage of railway freight wheelsets. This is for use by North American (Canada, United States and Mexico) railroads, freight wheelsets suppliers, wheel shops and transport organizations that move the wheelsets across the North American continent.

BACKGROUND OF THE INVENTION

Reference: See Appendix FREIGHT WHEELSET ROLLER BEARING DAMAGE—TRANSPORTER AND STORAGE PROLBEM report actual AAR rules and regulations and diagrams of present situation.

Present Wheel Transporters

In the same way that automobiles go through tires, railroad cars go through wheelsets. Each year the seven biggest class 1 North American railroads replace about 300,000 freight wheelsets. A wheelset is composed of one axle and one wheel and roller bearing at each end of the axle. Equipment personnel at various line points across North America inspect wheelsets on trains and replace bad order (damaged) wheelsets with good order (new or reconditioned) wheelsets. A damaged wheelset could break apart while the train is in motion and derail the train. The bad ordered wheelsets are sent to wheel shops. The wheel shops recondition the wheelsets and then send them back for use at the line points.

Wheel transporters move wheelsets between the line points and the wheel shops. These are rail cars that were modified to carry only wheelsets. For example, in 1996 CN had a fleet of 150 wheel transporters for freight wheelsets. These wheel transporters carried up to 44 wheelsets at one time. The wheelsets are loaded in two rows on the transporters. The first row consists of 23 wheelsets placed directly on the wheel transporter. A second row of 21 wheelsets lies on top of the first row. Two interlocking tiers of wheelsets make up each row.

The wheelsets are not tied down to the wheel transporters. Steel clamps tie the last four wheelsets at both ends of the car together. The forces that the wheelsets experiences during switching (moving individual cars to form a train consist or to spot at a location) or while the train is in motion could cause them to displace if the four end wheelset were not tied together. Together they act as a unit to block the other wheelsets from moving.

The AAR Wheel and Axle Manual states the following:

Section 1

Rule 1J6 Wheels mounted with roller bearings in place must be arranged when stored so the wheel flanges cannot strike either the roller bearing housing or the body of the adjacent axle. FIG. 4.52 in the Appendix illustrates a track arrangement for wheel and axle assemblies having roller bearings. When this arrangement is not available, assemblies should be stored one behind the other on single tracks.

Rule 1J7 The same precautions must be used in placing mounted wheels on a car for shipment. In addition they shall be securely blocked to prevent rolling and end sliding. Details of approved methods are given in the current issue of AAR Loading Rules.

Section 3

Rule 3B5 Special wheel cars should be provided for the shipment of mounted wheels between wheel shops and repair points. AAR Loading Rules illustrate approved methods of loading. Such cars have proved to be more reliable than the use of blocking in preventing axles from becoming damaged in transit. Wheel rack arrangement for shipping mounted wheels is illustrated in the Manual of Standards and Recommended Practices.

Together rules 1J6 and 1J7 state that wheel flanges must not strike the roller bearing of an adjacent wheelset while they are being moved on wheel transporters. The CN wheel transporter design uses the four end wheelsets that are tied together to block the other wheelsets from displacing when the transporter experiences normal forces during switching or train movement. The parts of the wheelsets that come in contact when they are blocked by the four end wheelsets are wheel flanges to roller bearings. This goes against rules 1J6 and 1J7.

A loading arrangement on an open top rail car must pass a number of tests before it becomes an approved method in the AAR Open Top Loading Rules. One of the tests is an impact test. Impact tests are like automobile crash tests using crash test dummies. Automobile crash tests deals with the safety of passengers. AAR impact test determines proper loading methods to ensure that the load being transported is not damaged.

In an impact test a number of rail cars, with a gross total weight of 250,000 pounds, are coupled together. These cars are placed on one track with both their hand and air brakes filly applied. In effect these rail cars act like a wall. A locomotive pushes the rail car with the test loading arrangement toward this wall of parked rail cars. At a certain speed the locomotive releases the test car so it hits the wall on its own. The test car must hit this wall at 4 miles per hour. After the impact the load is inspected. If everything is okay the test car must impact the wall at 6 miles per hour. If the load passes this impact a third impact at 8 miles per hour is performed. The same end of the test car impacts the wall during the 4, 6 and 8 miles per hour impacts. This ensures that the impact forces on the load are in the same direction. If the test car passes these three impacts then one more impact is made. The test car is turned around and pushed toward the wall so that the opposite end of the car hits the wall at 8 miles per hour. The load now experiences high forces in the opposite direction to those experienced in the first three impacts.

If the present wheel transporters used by CN and other North American railroads were to under go such an impact test, they would fail the test because contact would be made between roller bearings and adjacent wheel flange. The result of impact tests done with wheel transporters loaded with bad order wheelsets clearly shows that if good order wheelsets had been used, they would have been damaged. A loading arrangement that cannot be tested with new or reconditioned wheelsets should not be used to transport new and reconditioned wheelsets.

Unlike a passenger train, the ride of a freight train is not a smooth ride. Therefore, it is likely that the wheel flanges will hit the roller bearing of an adjacent wheelset often during transportation between wheel shops and line points.

When the transporters are switched the flanges will contact the roller bearings with even greater force. This constant contact between wheel flange and roller bearing can damage the roller bearing internally. This damage could eventually lead to a hot box and a major derailment.

Wheelset Storage Racks

Constant replacement of bad order wheelsets requires the storage of wheelsets at line points and wheel shops. North American railroads store wheelsets in the same arrangement as on wheel transporters. Each row consists of two interlocking tiers of wheelsets. The wheelsets are piled several rows high depending on how busy the line point is. Unfortunately this is not the approved method of storing roller bearing wheelsets shown in FIG. 4.52 in Section 4 of the AAR Wheel and Axle Manual which ensures that the roller bearing is never in line with the wheel flange of an adjacent wheel (see appendix).

Rule 1J6 of the AAR Wheel and Axle Manual states that

"FIG. 4.52 in Section 4 of the AAR Wheel and Axle Manual illustrates a rack arrangement for wheel and axle assemblies having roller bearings."

Although wheel shops with overhead cranes would not have any problems stacking the wheelsets in the approved AAR manner, line points that only use forklifts would have problems. The flanges of the wheelsets, in the approved loading method for roller bearing wheelsets, are never in line with roller bearings and therefore contact is not made.

Rule 1J6 also states that

"When this arrangement is not available, assemblies should be stored one behind the other on single tracks."

This also ensures that wheel flanges are never in line with roller bearings since there is no tiers of interlocking wheelsets, but only some locations will use this method.

The actual method used to store wheelsets in many locations by North American railroads and wheel shops allows for direct contact between roller bearing and adjacent wheel flange. Wheelsets are placed or removed from storage sites using overhead cranes (at wheel shops) or by forklifts (at line points). Unless employees are extremely careful while placing or removing roller bearing wheelsets from storage, the roller bearing will be struck by wheel flanges and possibly damaged. Again rule 1J6 is violated and another concern for hot boxes.

Hot Boxes

Consider a freight car traveling across Canada from Halifax to Vancouver, a 6,050 kilometer distance. Also, this car is equipped with roller bearing wheelsets and 36" diameter wheels. Assume that the car's speed across Canada is 80 kilometers per hour (50 miles per hour). The wheels of this car would make over 2.1 million revolutions at a speed of 7.7 revolutions per second. This car could make up to 20 such trips in one year.

To sustain such use the internal components of the roller bearing must be in good condition. Internal grease must always be present to keep these components lubricated. Any damaged component would damage another component that it is in constant contact with. Damaged seals could let the grease leak out of the roller bearing or let particles enter. Running the bearings without grease is like running an automobile engine without oil. Foreign particles that may enter may damage internal components. Damaged internal components may break up very quickly after continuous use. The friction between damaged internal components or the loss of grease would eventually increase the internal temperature of the roller bearings tremendously during a typical trip causing a hot box. A hot box refers to a roller bearing that is overheating.

If a hot box goes undetected the internal temperature could rise to a point where the roller bearing literally melts away. Then the wheelset would collapse under the moving train and cause a derailment. This is such a serious problem that hot box detectors are located at numerous points across the rail system. The hot box detector is a device with a heat sensor. It is placed at the side of a track and at the same level of a moving train's wheels. When a train passes by a hot box detector and one of its wheels has a hot box a central location overseeing all lines receives a signal from the hot box detector. The operator at this location obtains a readout that indicates exactly which axle on the train has the hot box. He then radios the crew of the train with the information. The train stops and the crew investigates the suspect hot box. In case a train's route does not take it past a hot box detector the train crew routinely walk along the train to see that everything is in order. They usually have some device like a temperature indicating crayon to check for hot boxes.

Each year the major North American railroads experience anywhere between 200 to 350 hot boxes per year on each of their lines. With all the precautions taken some hot boxes are not detected and result in burnt out journals and derailments.

On Nov. 10, 1979, a train derailed in Mississauga, Ontario. The cause was a hot box. Some of the cars that derailed were carrying dangerous commodities. Cars loaded with propane exploded and one of the tank cars carrying the deadly gas chlorine suffered a 2½ foot diameter hole in its shell. The danger of deadly chlorine gas escaping caused the evacuation of nearly a quarter of a million people from their homes or businesses.

The constant contact between adjacent wheel flanges and roller bearings when good ordered wheelsets are placed or removed from storage racks or moved by wheel transporters can damage the internal components of the roller bearing. This could lead to a hot box and a potentially serious derailment. This is because contact between the wheel flange and the roller bearing is only at a single point and not over a large area. To fully understand the difference between single point contact and contact over a large area, consider the difference in pain felt by a foot stepped on by 200 pound person wearing high heel stiletto shoes (single point contact) or wearing flat running shoes (contact over a large area). Since blows at a single point are severe, the AAR conceived of rules 1J6 and 1J7 of the Wheel and Axle Manual. Rules not complied with by wheel transporters or storage racks.

One way to verify if a problem really exists is to gauge the roller bearing manufacturer's confidence in their product. Are they ready to say that their bearings can take the constant hitting from adjacent wheel flanges during delivery to line point on wheel transporters? They may be liable for another Mississauga derailment due to a hot box if they say yes.

SUMMARY OF THE INVENTION

The most important aspect in the AAR rules for the safe handling of wheelsets while they are being moved or stored is that the roller bearing or axle of a wheelset must not come in direct contact with the wheel flange of an adjacent wheelset. This is because contact is at a single point, which could result in unseen internal damage. If a damaged wheelset is applied under a rail car, this damage could lead to a hot box and an eventual derailment if not caught in time. Unfortunately, the method used to store and move wheelsets across North America by the railroads, wheel shops, wheelset suppliers and other transport companies allow for the direct contact between roller bearing and adjacent wheel flange. These forces on the roller bearing while the wheel transporter is moved, humped or flat switched can be considerable. Also, since there is direct contact between roller bearing and adjacent wheel flange the methods presently used are illegal.

This invention shows different ways that wheelsets may be transported so that there is no contact between roller bearing and an adjacent wheel flange. This is done by (a) applying roller bearing protectors, (b) applying axle protectors, (c) shifting the wheelsets on the wheel transporter so that roller bearing and adjacent wheel flange never come in contact, or (d) restricting the movement of adjacent wheelsets relative to one another while in transport with the use of wheelset stoppers or axle spacers.

This invention also shows that if a roller bearing or axle protector is used, then contact between roller bearing and adjacent wheel flange will never occur at the storage areas. The present stacking method used by the railroads, wheel shops and wheel suppliers, which does not use a roller bearing protector, is only approved for friction bearing wheelsets and therefore illegal for roller bearing wheelsets. The approved roller bearing stacking method is not used since it causes handling problems at storage areas that are not equipped with overhead cranes and use forklifts. With the simple addition of a roller bearing protector, the present stacking method could then be approved for roller bearing wheelsets.

BRIEF DESCRIPTION OF THE DRAWINGS

FIG. 6 (Prior Art) is a Pressure versus Contact Area graph.

FIG. 7 (Prior Art) is a diagram of a roller bearing adapter shown in use in rail car's side truck frame.

FIG. 8 (Prior Art) is an exploded view of a roller bearing side frame assembly.

FIG. 9 (Prior Art) is a diagram of a roller bearing adapter installed in rail car's side frame over the roller bearing.

FIG. 10 is a diagram of an example of a roller bearing/axle protector that is inserted between the roller bearing/axle and adjacent wheel flanges after wheelsets are loaded on wheel transporters.

FIG. 18 is a diagram of an example of a lateral stopper.

FIG. 19 (Prior Art) is an end view of a present wheel transporter. Flange of top wheelsets sandwiched between flanges of bottom wheelsets.

DETAILED DESCRIPTION OF THE PREFERRED EMBODIMENT

The problem with the present method of transporting and storing wheelsets is that the roller bearing is in direct contact with the flange of the adjacent wheel, which is prohibited by AAR rules. Manufacturers always package their products (e.g. televisions, stereos, glass . . . ) to protect them from damage that may occur between the time the product leaves the plant to when the final user receives the item. Similarly the new or reconditioned wheelsets should be properly packaged or protected to prevent any damage that may occur between the time the wheelset leaves the wheel shop to the time it is used and placed underneath a rail car. The following invention shows the different methods of protecting the wheelsets during shipment and storage.

Figure 1:
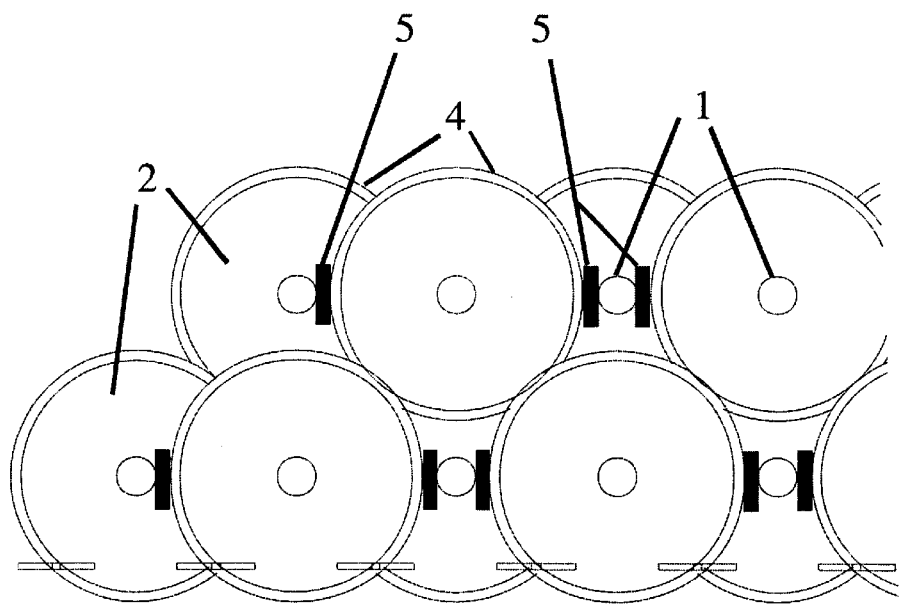
FIG. 1 is a diagram of block protectors placed between roller bearings and adjacent wheel flanges.

The first embodiment of this invention is the use of a roller bearing protector, which is placed between the roller bearing and the flange of an adjacent wheel. FIG. 1 shows wheels 2 as they are stacked on a wheel transporter or in storage. A simple block shaped roller bearing protector 5 is placed between the roller bearing 1 and the adjacent wheel flange 4. This block shaped protector 5 could be made of some type of rubber, plastic or even wood.

Figure 2:
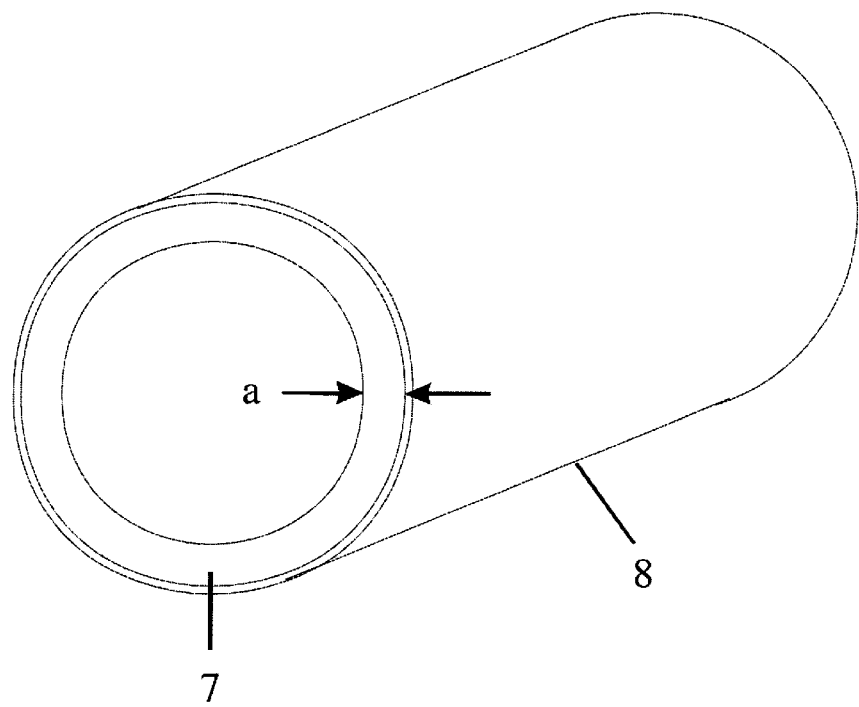
FIG. 2 is a diagram of a cylindrical roller bearing protector that can be slipped on the roller bearing.

FIG. 2 shows a cylindrical roller bearing protector that can be applied to the roller bearings in the wheel shop during the last step before the wheelset is placed in storage or on a transporter. The material used for the protection 7 should be thick enough (dimension "a") and made of a substance like rubber that is able to absorb the impact of the wheel flange in order to prevent damage to the roller bearing. Adding a hard exterior shell 8 (e.g. a metal or hard moulded plastic) to the protector will improve protection to the roller bearing, since it will distribute the force of the flange's blow over a larger surface area of the absorption material 7 (i.e. rubber material for example).

Figure 3:
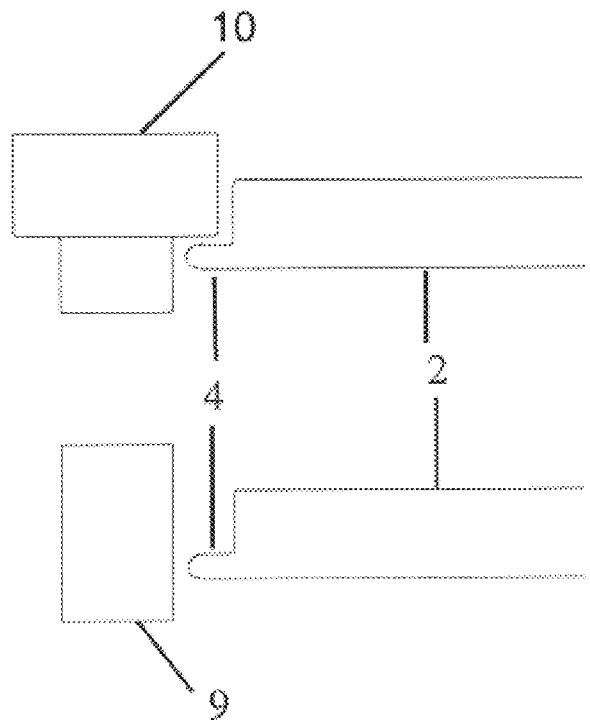
FIG. 3 is a diagram comparing a contoured roller bearing protector, which offers better protection, to a straight cylindrical protector.

Extra protection is possible if the outer profile of the roller bearing protector follows the contour of the adjacent wheel as shown in FIG. 3 item 10. This is because the force of the blow from the flange 4 of the wheel 2 is made over a larger area instead of the single point using a straight cylindrical roller bearing protector 9.

Figure 4:
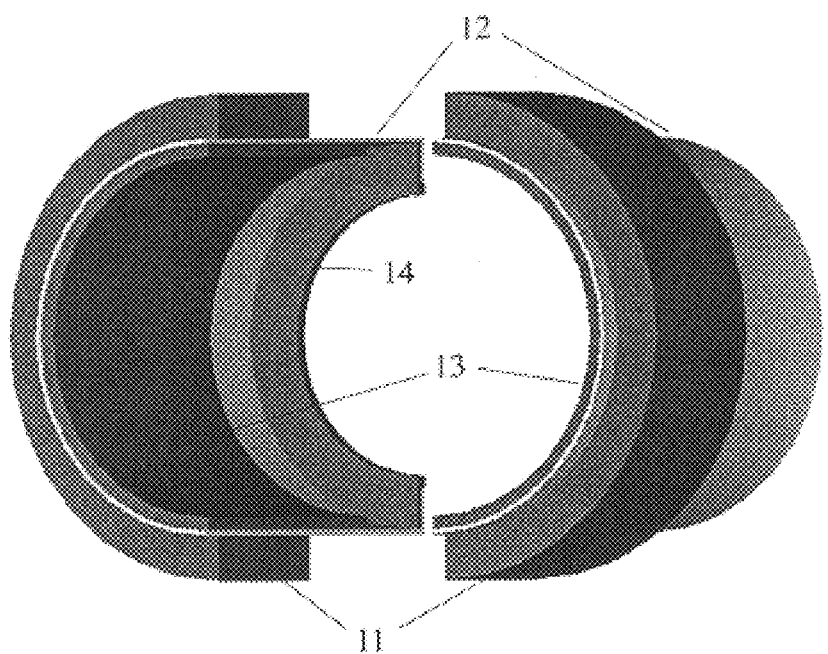
FIG. 4 is a diagram of a contoured roller bearing protector shown as two parts for application on roller bearings.
Figure 5:
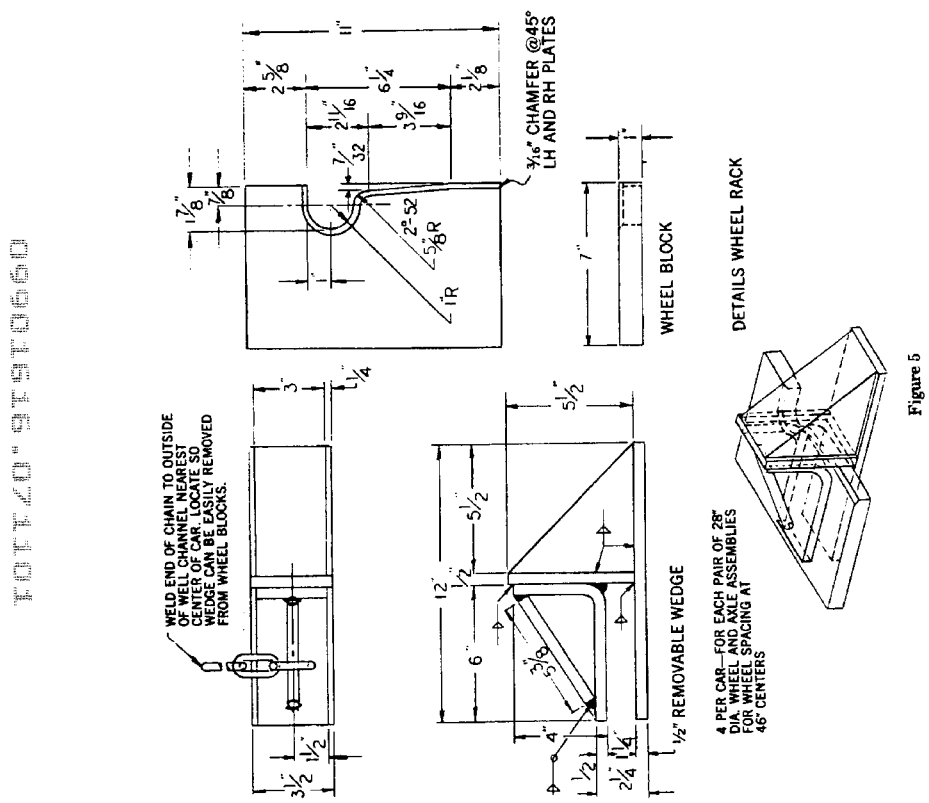
FIG. 5 is a diagram of a contoured roller bearing protector showing deformation while in use thereby increasing the contact area.

To understand what will make an effective protector for the roller bearings, the following design in FIG. 4 for the roller bearing protector will be examined. This protector consists of an outer cushion 11, a hard shell 12, an inner cushion 13 and an end cushion 14. The inner and outer cushions can be made of some energy absorbing material like rubber while the hard shell could be made of a metal or hard plastic. FIG. 5 shows the two halves of the roller bearing protector held in place by two rubber O rings 15, one at each end of the roller bearing protector. The two halves of the roller bearing protector may also be secured with tape or a clip system similar to that used on ski boots for example. The outer cushion (in use and deformed 16 and not in use 11) serves to increase the contact area and eliminate any gap between the adjacent wheel 2 and the roller bearing 1. Although the outer cushion should be able to deform slightly to eliminate this gap, it should also be stiff enough to transmit some of the adjacent wheel's force to the roller bearing protector's hard shell. In effect the area on the hard shell that experiences the force of the adjacent wheel is increased from the single point contact at the wheel's flange to include the area of the deformed outer cushion. The hard shell transmits the wheel's pressure to the inner cushion (item 13 in FIG. 4) over an even greater area, which is then transmitted to the roller bearing itself. It is the transmission of the adjacent wheel's force over a large area (versus single point contact between wheel flange and roller bearing) and filling the gap between the roller bearing and the adjacent wheel flange that protects the roller bearing. This can easily be understood by performing the following two experiments.

The first experiment requires two ordinary 500 ml glass jars with the lids, ½" steel ball, newspaper, protective glove, safety glasses and thick long sleeved shirt. Place the steel marble into the glass jar and close the lid. Put on the safety clothing. Now pick up the jar and shake it hard, like a baby's rattle. Before long the moving steel ball in the glass jar will break the jar. Now half fill the second glass jar with newspaper. Take the steel ball, place it in the second glass jar and tightly fill it with more newspaper. The steel ball should be placed against the wall of the glass jar. Enough newspaper should be placed in the jar so the steel ball cannot move and is in constant contact with the glass jar. Now close the jar with the lid and once again shake the jar hard. This time the jar will not break because the steel ball is not allowed to move with respect to the glass jar and continuously hit the jar. This is because the newspaper takes up all spaces or gaps within the jar. Similarly, the gap between roller bearings and adjacent wheel flanges allows them to constantly hit each other as a wheel transporter is jarred into motion (movement of a freight train is not smooth).

A pen, its' cover and a hard covered book is required for the second experiment. Place your hand on a table, with the palm of the hand touching the table. Hit the back of your hand with the covered nib of the pen a few times, ensuring that you do not injure yourself. Remember how this felt. Now place the hard covered book over the back of your hand that is still on the table, palm down. Now strike the book with the pen, in same manner as was done earlier, and feel the difference as the blow is transferred through the book to your hand. This time the blow is not as harsh because the book transfers the same force that was experienced earlier over a larger area. The first case (without the book) is like the direct single point blow on the roller bearing by the adjacent wheel flange. The second case (with the book between the hand and the striking pen) is like roller bearing experiencing the blow over a large contact area since the roller bearing protector is between the roller bearing and the striking adjacent wheel.

Where P represents pressure (what the hand or roller bearing feels after being struck), F represents force (the strength of the impact on the hand or roller bearing by the pen or wheel flange respectively) and A represents the contact area (contact area where hand or roller bearing is struck). if the force remains constant and the contact area approaches a single point, then pressure becomes extremely high. As the contact area increases, the pressure quickly drops as shown in the graph in FIG. 6 (Prior Art).

Therefore, an effective roller bearing protector must not only ensure no direct contact between roller bearing and adjacent wheel flange as required by rules 1J6 and 1J7 of The AAR Wheel and Axle Manual. An effective roller bearing protector should remove any gap between the roller bearing and adjacent wheels and transmit an adjacent wheel's force over a greater area than the present single point load. (Note: although not as effective, if the absorption material is sufficiently thick enough then a very small gap may be tolerated.) In essence an effective roller bearing protector must act like the roller bearing adapter does for the roller bearings of wheelsets in use on rail cars as shown in FIGS. 7 (Prior Art), 8 (Prior Art) and 9 (Prior Art). The roller bearing adapter 18 ensures that the roller bearing 1 fits properly in the side frame 17 of rail car's truck, leaving no gaps for the roller bearing 1 to move around and damage itself. The contour of the roller bearing adapter, like the roller bearing protector, ensures that any forces that the roller bearing experiences as the rail car moves along the rail is spread over a large area and not on a single point load.

Keeping this in mind consider the simple block protector 5 shown in FIG. 1 to that shown in FIG. 10. The simple block 6 now has one face 42 contoured to follow the profile of the wheel flange that it contacts while the opposite face 43 follows the profile of the roller bearing that contacts it. This roller bearing protector 6 could also have a hard plate 24 inserted into it to help transfer the force of the wheel over an even larger area (similar to the hard shell 12 in the roller bearing protector of FIG. 4).

Figure 11:
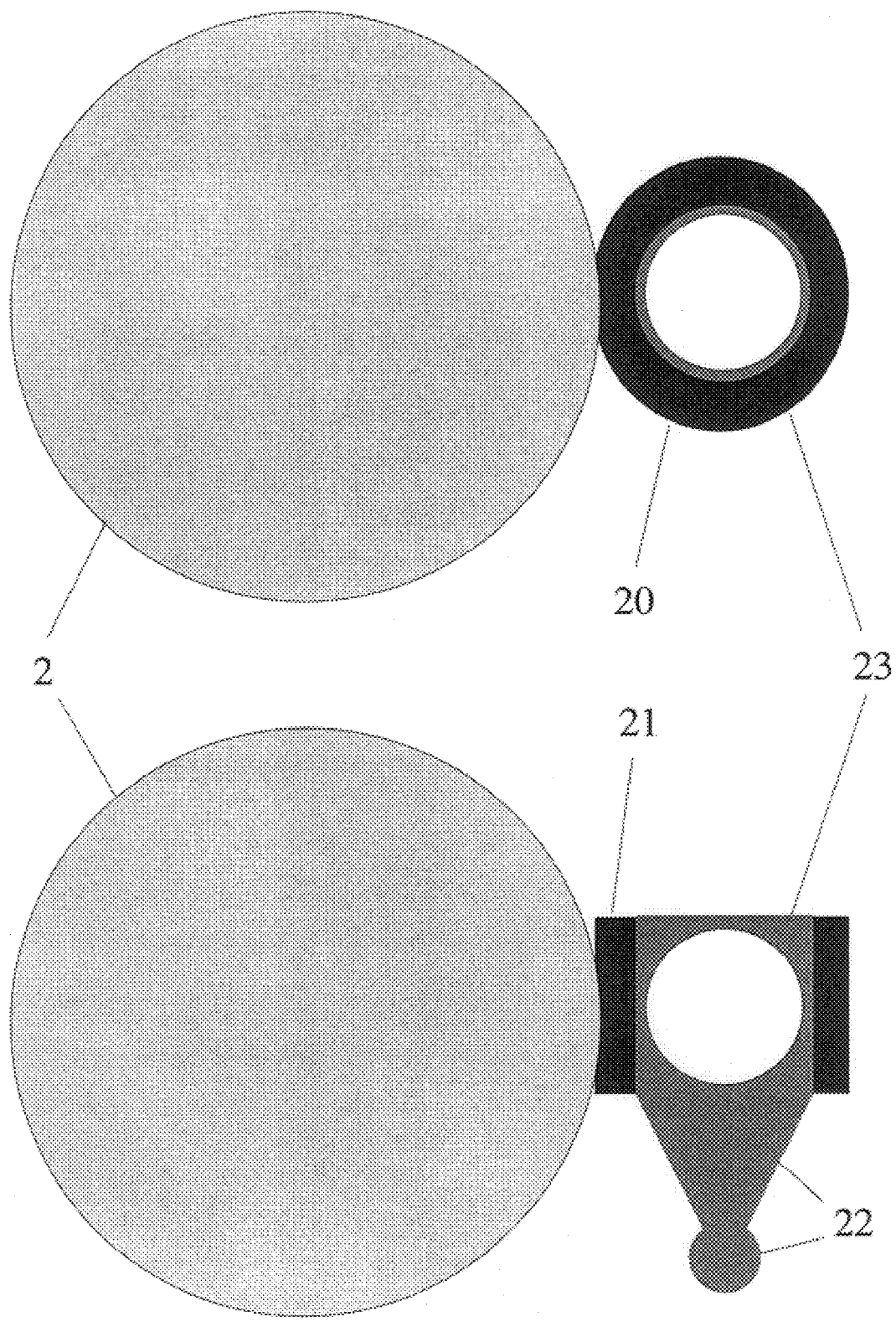
FIG. 11 is a diagram comparing the higher contact area to a wheel of a roller bearing protector with flat deformable section to that of a cylindrical roller bearing protector.

FIG. 11 compares two different roller bearing protectors 23 while in contact with a wheel 2. The first roller bearing protector has a circular outer cushion 20 while the other roller bearing protector has a flat outer cushion 21. The outer shape of the roller bearing protector also has an effect on the amount of protection it will offer. As the wheel makes contact with the deformable outer cushion of the roller bearing protector, the contact area between the wheel and the protector increases as that section of the protector deforms. A roller bearing protector whose outer cushion is flat 21 as opposed to circular 20 will have a higher contact area. As a result the force is transmitted to the roller bearing over an even larger area, thereby decreasing the pressure the roller bearing feels.

The orientation of a circular roller bearing protector is not critical as opposed to one with flat sides. Therefore, a method is required that will place a flat sided protector in the proper orientation. Gravity can be used to keep a flat sided roller bearing protector properly oriented by placing an off centered weight 22 on it. If the roller bearing protector is loosely fitted to the roller bearing, then gravity will rotate the protector with respect to the roller bearing to the proper orientation. If the roller bearing protector is tightly fitted to the outer casing of the roller bearing then the off centered weight must be heavy enough to allow gravity to turn the roller bearing outer casing as well.

It should be noted that a roller bearing protector does not have to have a hard outer shell but could be made of one molded material like rubber or plastic. This roller bearing protector could also be contoured to increase contact area.

A second embodiment for this invention involves the use of axle protectors instead of roller bearing protectors for the shipment and storage of the wheelsets. The axle protectors ensure that no contact is made between the axle and the flange of an adjacent wheel. The gap between axle and adjacent wheel flange is greater than between roller bearing and adjacent wheel flange. If the gap between axle and adjacent wheel flange was reduced to less than that between roller bearing and adjacent wheel flange with the insertion of an axle protector, then the roller bearings will never come in contact with an adjacent wheel flange.

Figure 12:
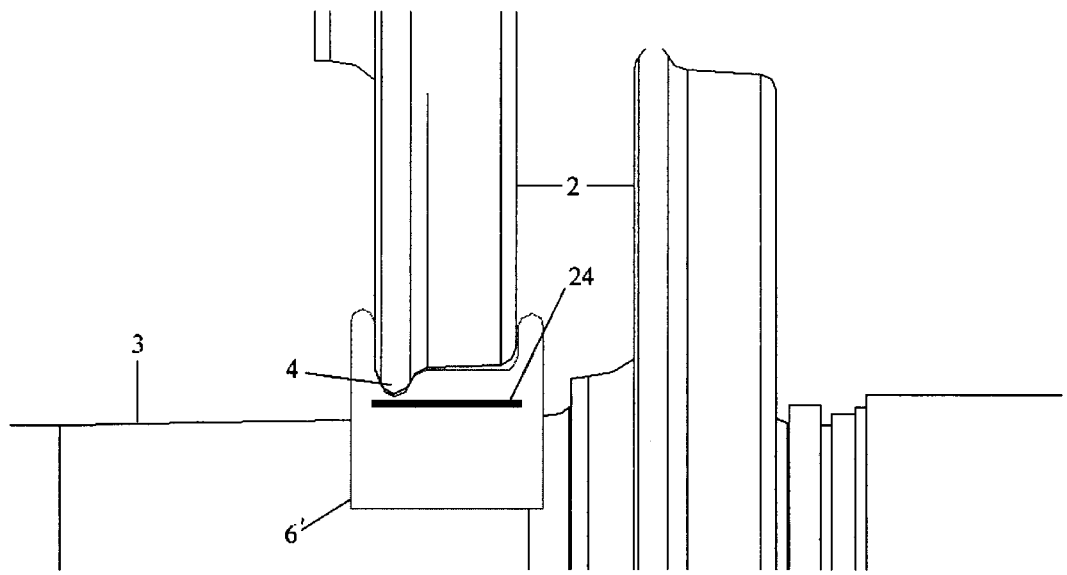
FIG. 12 is a top view of inserted axle protector between axle and adjacent wheel flange.
Figure 13:
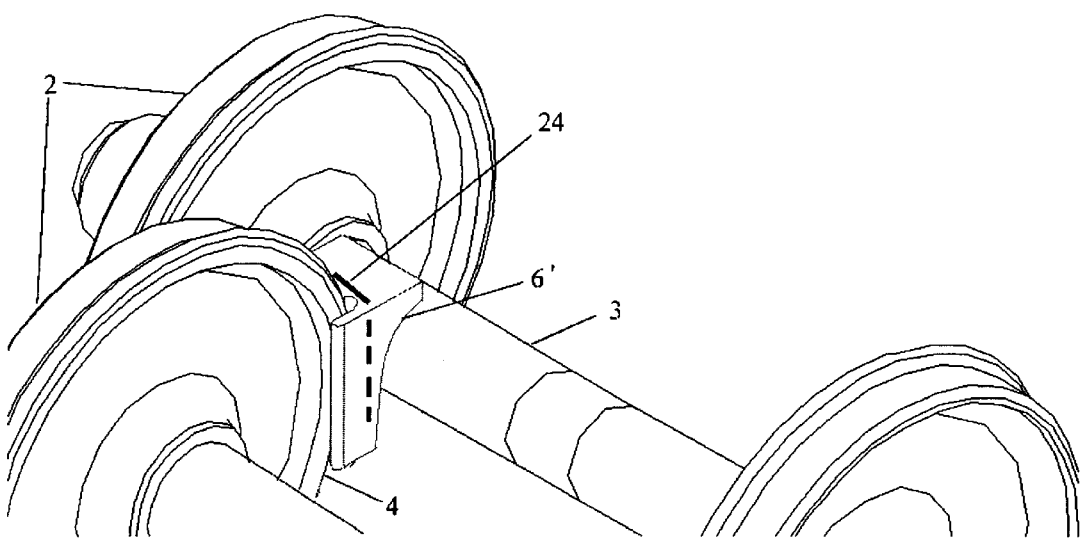
FIG. 13 is a perspective view of inserted axle protector between axle and adjacent wheel flange.

The design of axle protectors is similar to roller bearing protectors and based on the same principles discussed above. For example, by changing the contour of face 43 of the roller bearing protector in FIG. 10 to conform to the profile of an axle the protector becomes an axle protector. FIG. 12 is a top view of this axle protector 6' inserted between the axle 3 and the flange 4 of wheel 2. As with the roller bearing protector, the rigid bar 24 may be inserted within the axle protector to better distribute any forces over a larger area on the axle. FIG. 13 is a perspective view of the set up in FIG. 12.

Figure 14:
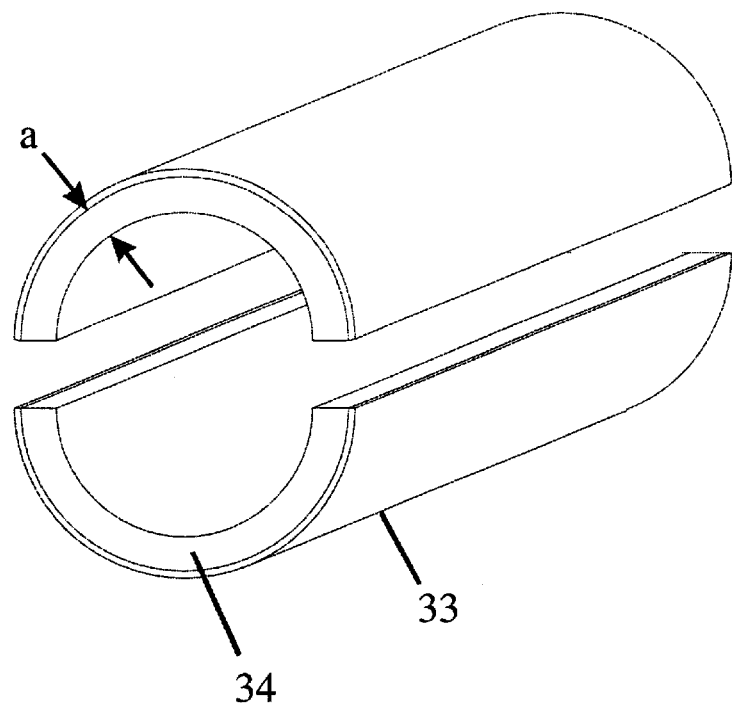
FIG. 14 is a diagram of an example of an axle protector that is taped, strapped or clipped to the axles.

FIG. 14 shows two halves of a cylindrical axle protector that is taped or strapped together on to the axle. Like similar roller bearing protectors, this axle protector has an inner cushion 34 and a hard shell 33. Since the diameter of an axle is smaller than that of a roller bearing, the dimension "a" shown of the inner cushion 34 could be greater than that of a roller bearing protector resulting in better protection. Although not shown in this Figure, the axle protector may be contoured with the addition of an outer cushion similar to the roller bearing protector in FIGS. 4 and 5 (item 11). The axle protector may vary in length so as to cover on the area near the adjacent wheel flange or the whole axle.

Figure 15:
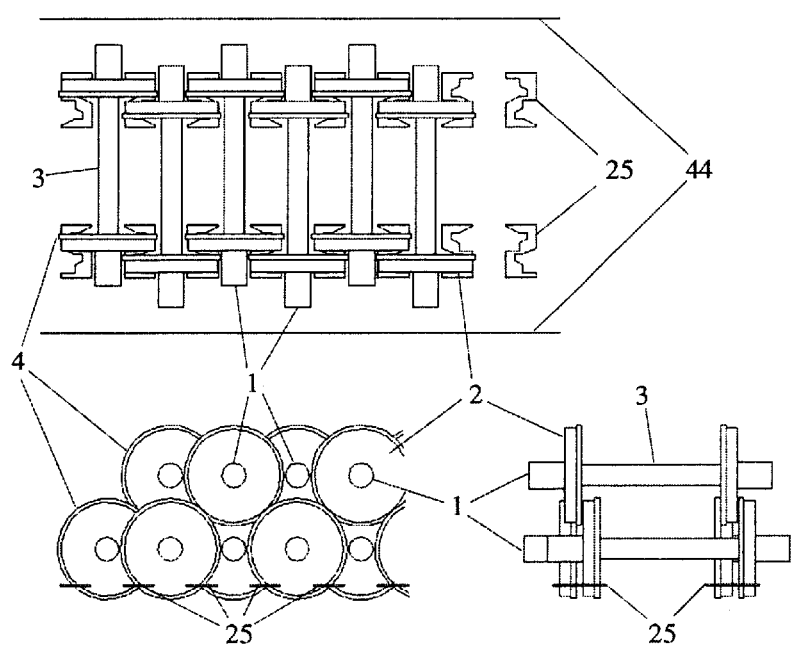
FIG. 15 (Prior Art) is a top, side and end view of a present wheel (transporter loading arrangement. Wheel flanges contact adjacent roller bearings.

The third embodiment for this invention involves changing the basic design of the wheel transporter so that the wheel flanges are never in line with a roller bearing. FIG. 15 (Prior Art) shows the top, side and end views of the basic layout of the present wheel transporters. Each wheelset is composed of one axle 3 with a wheel 2 and a roller bearing 1 at each end of the axle. The wheels of the first row are placed on the wheelset supports 25. A second row is placed on the first row of wheelsets. The top view shows only the bottom row of wheelsets to avoid confusion. The top view shows that one row of wheelsets is composed of two interlocking tiers of wheelsets. As a result the flange 4 of one wheel 2 of a wheelset is in line with a roller bearing 1 and the flange of the other wheel of the same wheelset is in line with axle 3 of an adjacent wheelset. Item 44 represents the sides of the wheel transporter.

Figure 16:
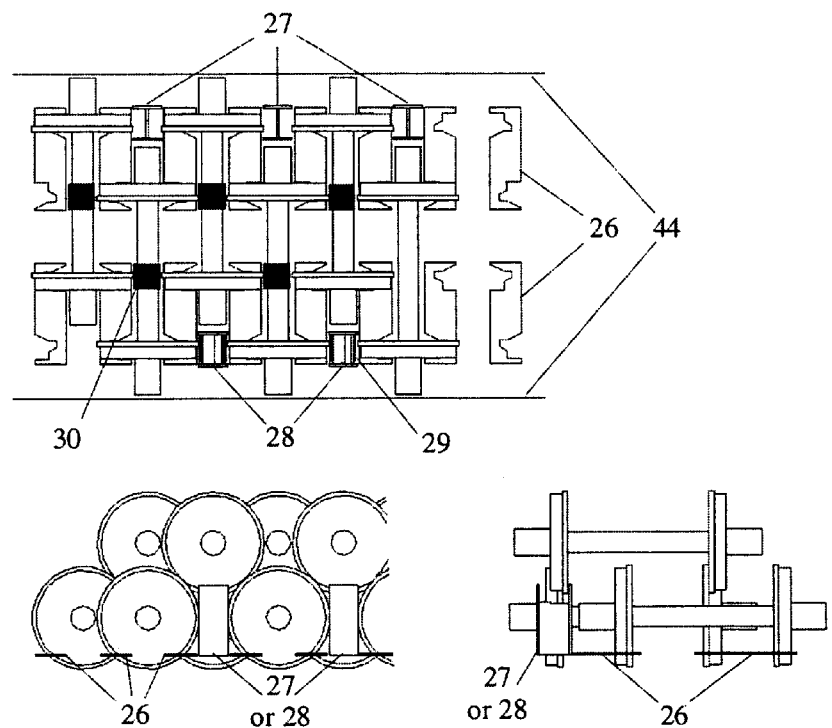
FIG. 16 is a top, side and end view of a shifted wheelsets loading arrangement. Wheel flanges cannot contact adjacent roller bearings.

FIG. 16 is the top, side and end view of the new wheel transporter layout arrangement. Here the two tiers of wheelsets are shifted apart and closer to the sides of the car 44. Now the wheel flanges are only in line with the axle of an adjacent wheelset and not with any roller bearings. To shift the wheelsets an altered wheelset support 26 is required. Axle protectors 30 are needed to prevent contact between wheel flanges and adjacent axles. Lateral stoppers 27 and 28 are now needed to prevent the wheelsets from the top row from falling off the wheelsets of the bottom row. The difference between lateral stopper 27 with lateral stopper 28 is that the latter helps prevent adjacent wheels from the bottom row from moving forward along the car. The shim 29 placed between the lateral stopper 28 and an adjacent wheel flange removes any gap between them and lock the wheels in place. The shim can be stored within the lateral stopper when not in use.

Figure 17:
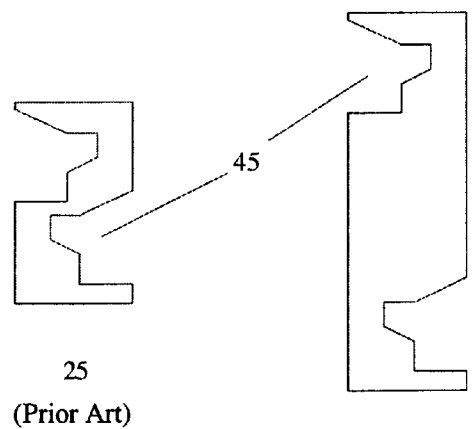
FIG. 17 is a diagram of present (Prior Art) and new wheelset supports. Center portion of new wheelset support is lengthened.

FIG. 17 shows the present 25 (Prior Art) and new 26 wheelset support that is based on the CN Rail design. There are other designs available in the railroad industry. What is important is that the wheel wells 45, which are common to all the different designs, are shifted apart for the new wheel transporter arrangement.

FIG. 18 shows two examples of lateral stoppers 27 and 28. The exact design of a lateral stopper depends on the wheel transporter itself, which will vary within the railroad industry, since it would become a permanent part of the wheel transporter. In this design a lateral stopper consists of metal sides 32 and webs 31. By adding an extra web to lateral stopper 28, the web is now closer to adjacent wheels of the first row. As a result, lateral stopper 28 also helps prevent wheels from the first row from moving forward.

FIGS. 19 (Prior Art), 20 and 21 help explain the need and the design of the lateral stopper. FIG. 19 (Prior Art) shows the end view of present wheel transporter with wheel support 25 loaded with two rows of wheelsets. This view shows that the flange 4 of wheel C in the top row is sandwiched between wheel B and the flange of wheel A in the bottom row. Therefore, wheelsets in the top row will not fall off the top row if they experience a side force.

Figure 20:
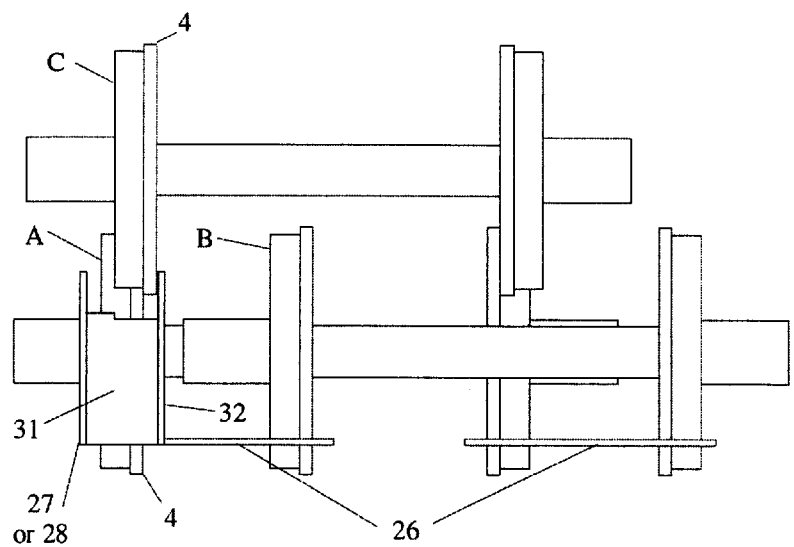
FIG. 20 is an end view of a shifted wheelsets loading arrangement. Top wheelset sitting to the right of bottom wheel's flange.
Figure 21:
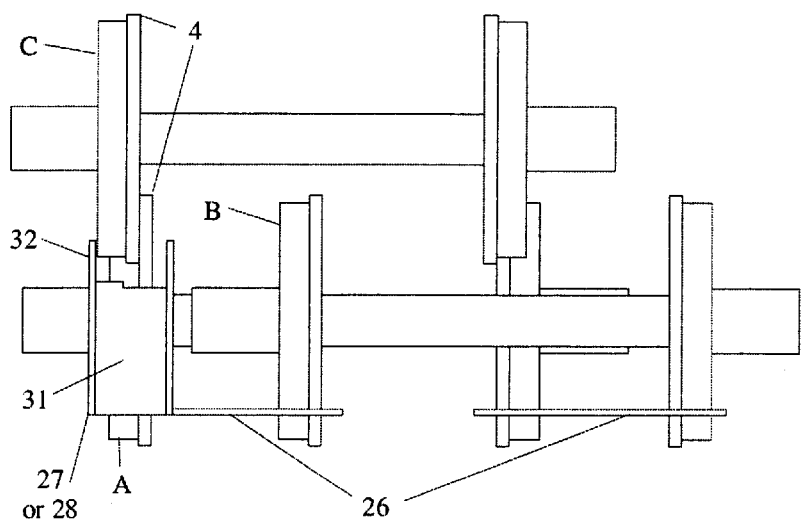
FIG. 21 is an end view of a shifted wheelsets loading arrangement. Top wheelset sitting to the left of bottom wheel's flange.

FIGS. 20 and 21 are end views of the new wheel transporter arrangement consisting of shifted wheelsets. Both Figures show the new wheelset supports 26 and lateral stopper 27 or 28. In this arrangement since wheel B and the flange 4 of wheel A are further apart, a side force would cause wheel C to fall off the top row if a lateral stopper 27 or 28 were not present. In FIG. 20, wheel C is sandwiched between the flange 4 of wheel A and the right side wall 32 of the lateral stopper 27 or 28. In FIG. 21, wheel C is sandwiched between the flange 4 of wheel A and the left side wall 32 of the lateral stopper 27 or 28. The web 31 of the lateral stopper should also be low enough to accommodate different wheel sizes. The smaller the wheel the lower the top wheelset will sit.

Figure 22:
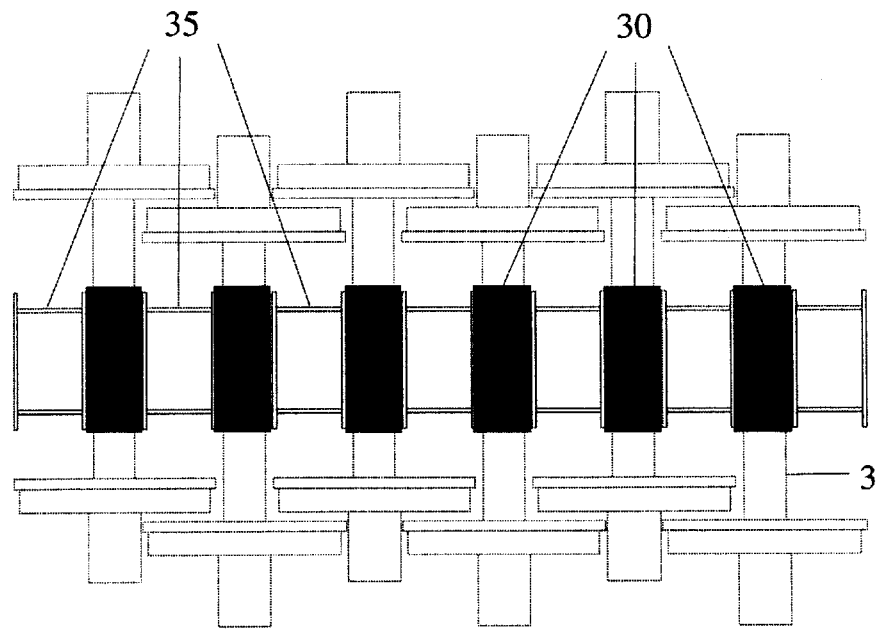
FIG. 22 is a top view of wheelsets loaded between wheelset stoppers.
Figure 23:
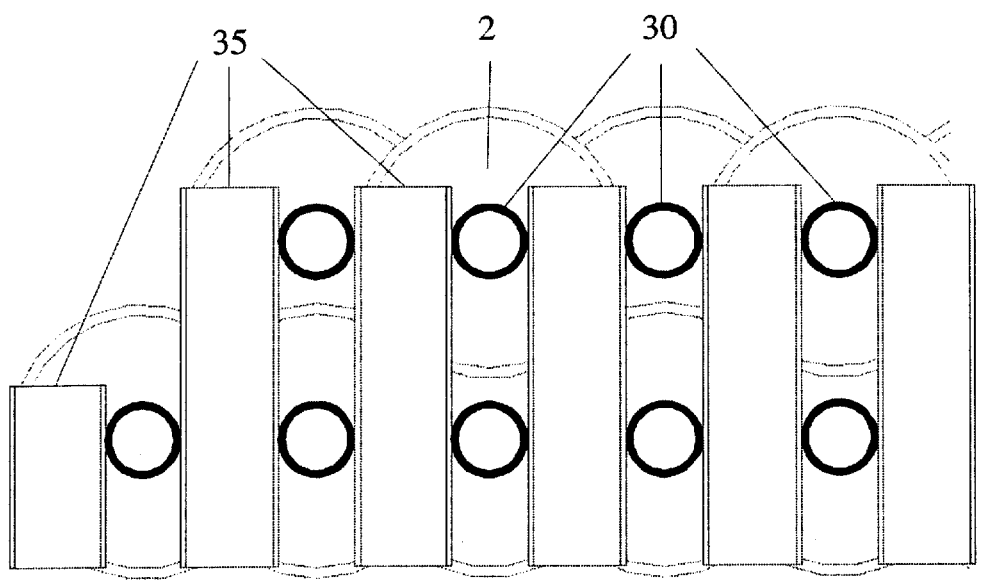
FIG. 23 is a side view of wheelsets loaded between wheelset stoppers.
Figure 24:
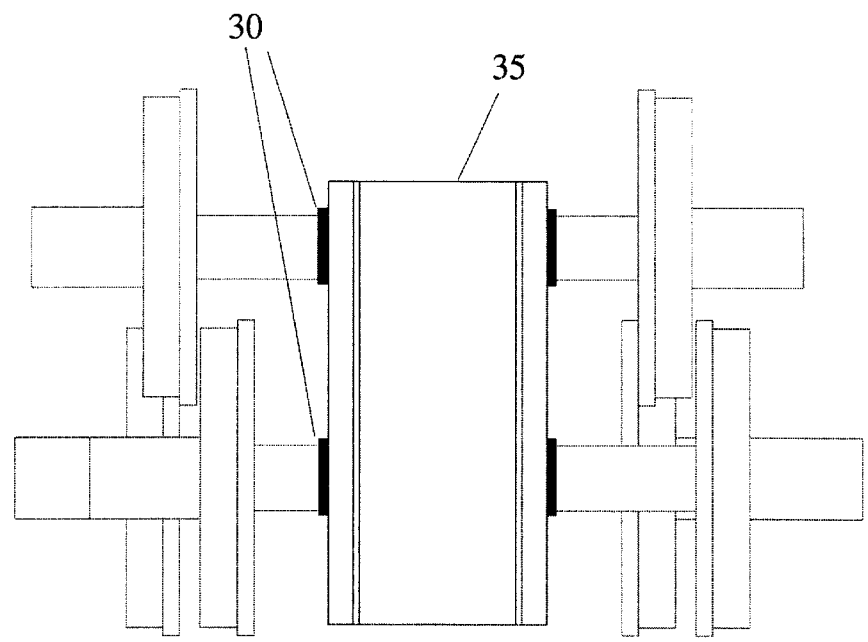
FIG. 24 is an end view of wheelsets loaded between wheelset stoppers.
Figure 25:
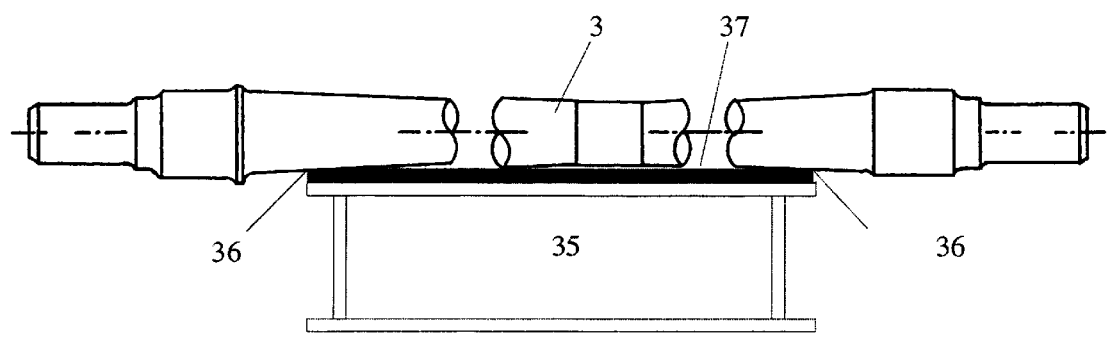
FIG. 25 is a diagram showing the contact two points between axle and wheelset stopper.

A fourth embodiment of this invention shown in FIG. 22 is to build wheelset stoppers 35 on the wheel transporters to form individual cradles for each wheelset. Since the diameter of the axle 3 may vary for different sizes of wheelset, but the space between wheelset stoppers 35 is constant, axle protectors 30 may be used to reduce any space between the axle 3 and the wheelset stopper 35. FIG. 22 is a top view of loaded wheel transporter. The side view and end view of the loaded wheel transporter is shown in FIGS. 23 and 24 respectively. FIG. 25 shows the contact points 36 between the axle 3 and the wheelset stopper 35. if the wheelset stopper is made of metal then the axle protector is needed to prevent any damage on the axle since contact is made at single points, if the contact surface of the wheelset stopper is lined with wood, plastic or rubber 37 then axle protectors may not be required. An AAR impact test on such an arrangement would be required to see if an axle protector is needed to eliminate the gap between the axle and wheelset stopper. As a result of an impact, all the wheelsets would move in unison in one direction before the wheelset stopper stops their motion. The impact test would confirm whether or not the flange of a wheel actually makes contact with an adjacent roller bearing as the wheelset settles back into place after the impact.

The wheelset stoppers are permanent fixtures on the wheel transporter whose final design depends on the particular wheel transporter used. FIGS. 22, 23 and 24 show single wheelset stoppers along the center of the wheel transporter. Wheelset stoppers could also come in pairs, one near each wheel of a wheelset (or even in triplets).

Figure 26:
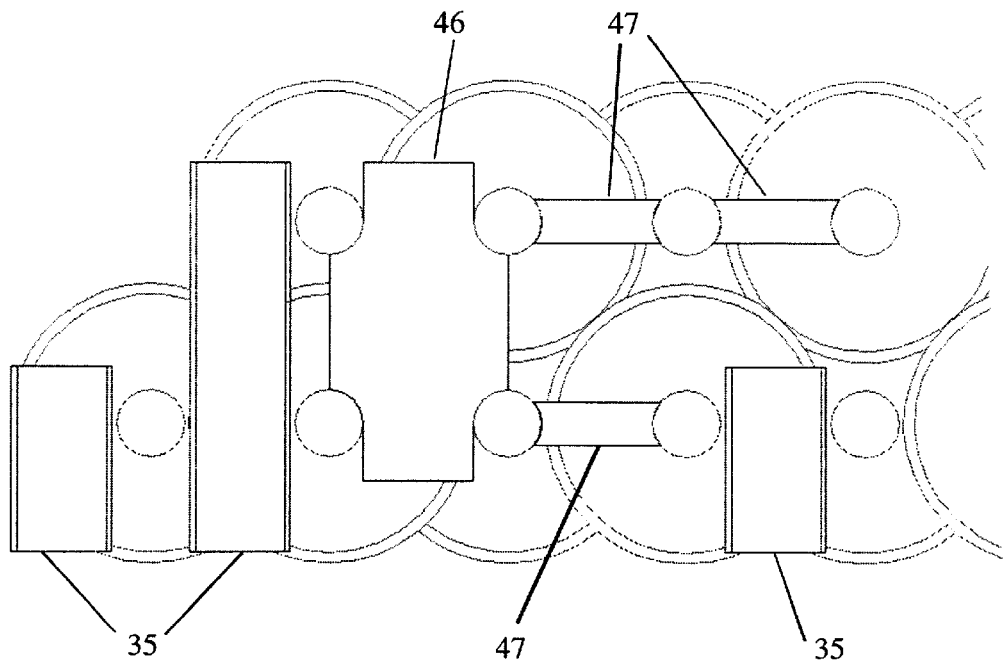
FIG. 26 is a side view of loaded wheelsets being restrained by wheelset stoppers and axle spacers.

A fifth embodiment for this invention is the use of axle spacers 46 or 47 as shown in FIG. 26, which is a side view of a loaded wheel transporter. The difference between a wheelset stopper 35 and an axle spacer is that the wheelset stopper is attached to the wheel transporter while the axle spacer 46 or 47 is separate from the transporter and must placed after the wheelsets are loaded. Axle spacer 46 is an example of an axle spacer that restrains four wheelsets from moving relative to each other. As shown in FIG. 26 axle spacers 47 could be inserted in both rows of wheelsets or just in the top row if a wheelset stopper 35 is present for the bottom row. Since the axle spacer is inserted between the axles of adjacent wheelsets, two wheelset stoppers 35 are required at each end of the wheel transporter to secure the last wheelsets. Also short wheelset stoppers could be used for the bottom row of wheelsets while axle spacers 47 are used in the top row.

Figure 27:
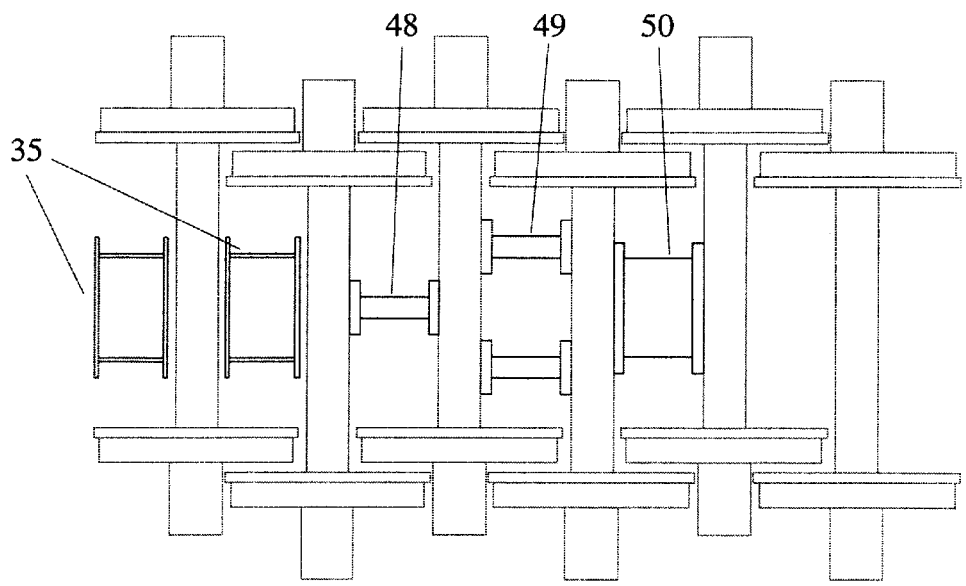
FIG. 27 is a top view of loaded wheelsets being restrained by wheelset stoppers and axle spacers.

FIG. 27 is a top view of a loaded wheel transporter showing different arrangements of axle spacers. A single axle spacer 48 could be inserted between axles or they may come in pairs 49 for added stability. Added stability may also be achieved with a single axle spacer between a pair of axles that has a larger contact area 50.

Figure 28:
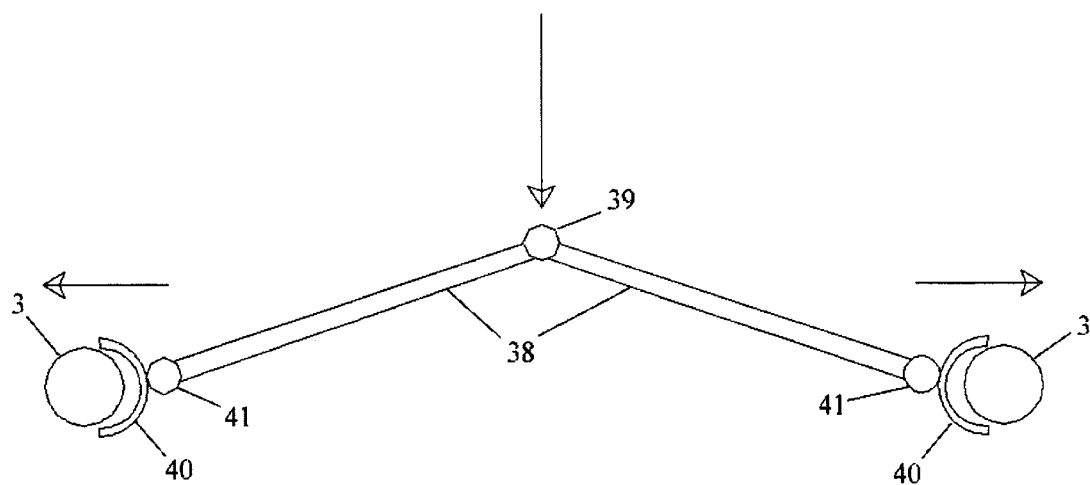
FIG. 28 is a diagram showing an example of an axle spacer. Spacer locks in place by pressing down.

The spacer could be of a fixed shape or include mechanical links or devices that allow it to be extended or snapped into place between axles like the example shown in FIG. 28. In this example the surface of the spacer 40 that contacts the axle 3 is contoured to maximize contact area and avoid single point contact. It is attached to the spacer arm 38 via a pivot pin 41. Both spacer arms 38 are in turn connected by a pivot pin 39 that locks itself after the axle spacer is pushed into position. In essence a spacer is a device that restrains the axles from moving closer together thereby preventing contact between roller bearing and adjacent wheel flange.

Figure 29:
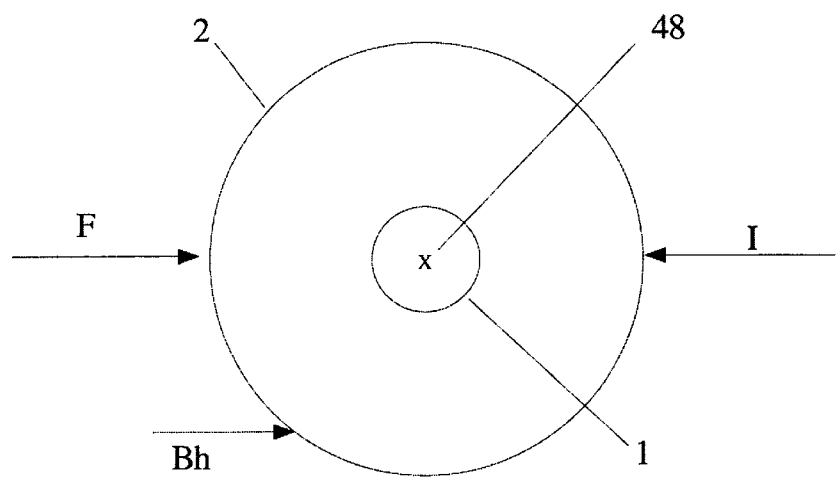
FIG. 29 is a side view of a wheelset comparing the effectiveness of resistive forces F and Bh on preventing the wheelset form rolling forward due to an impact force I.
Figure 1:
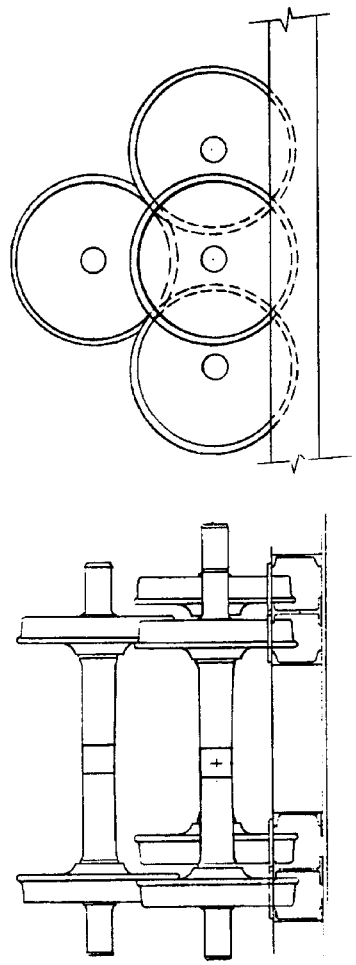
Figure 2:
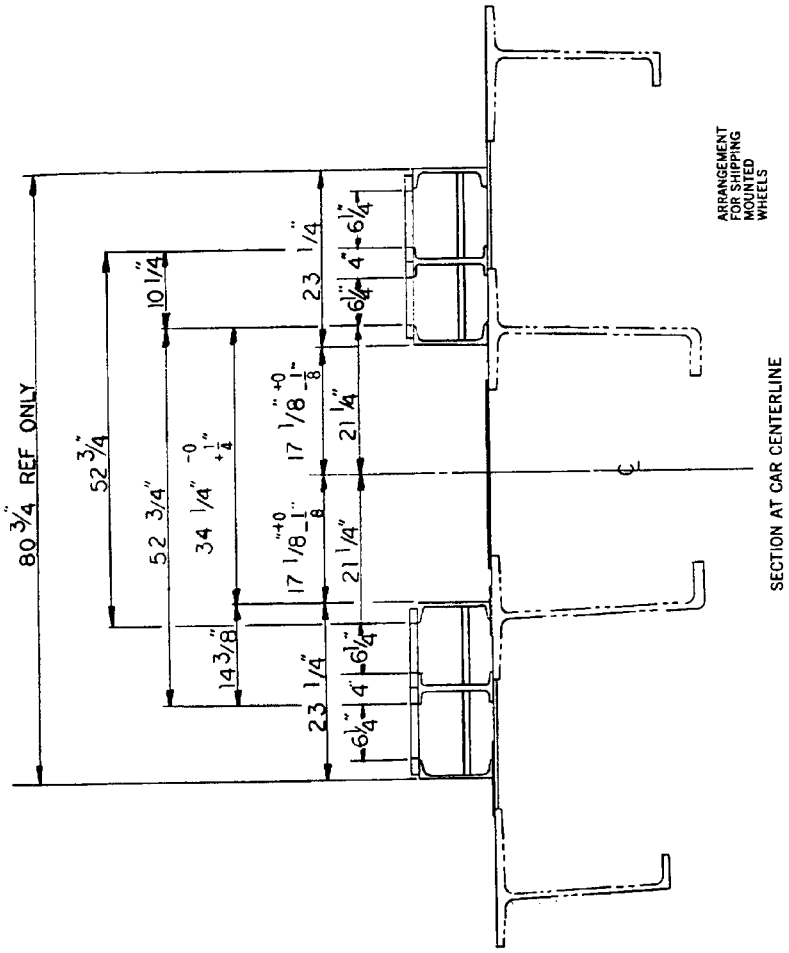
Figure 3:
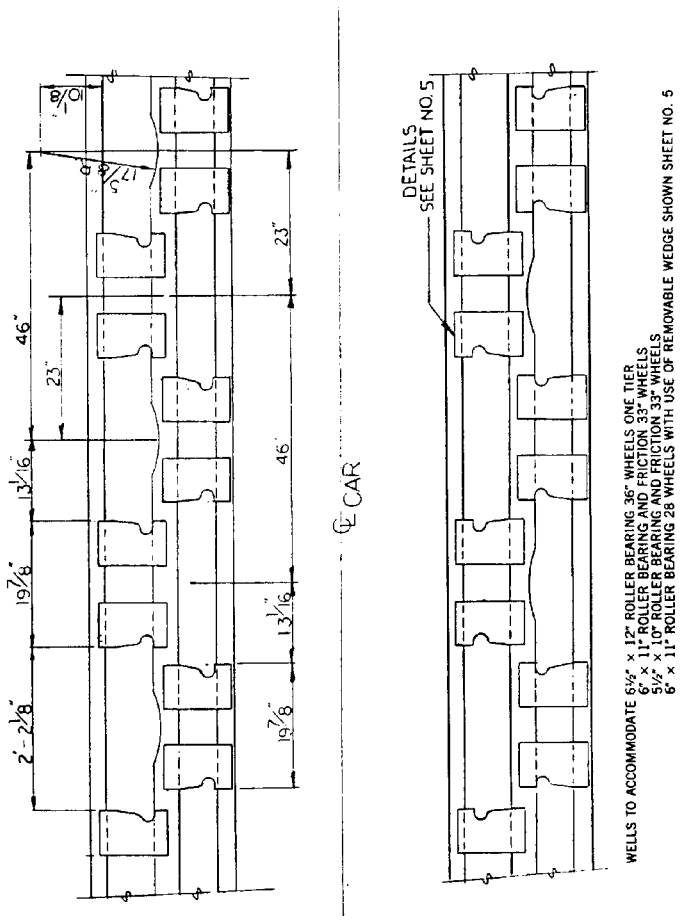
Figure 4:
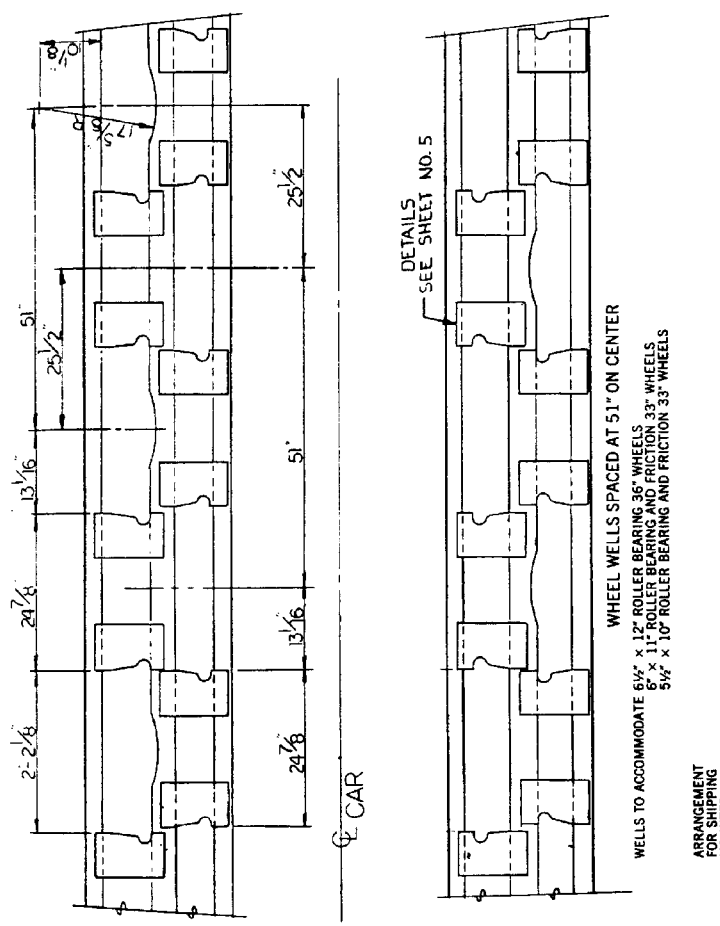

FIG. 29 is the side view of a wheelset showing the wheel 2 and roller bearing 1. Force I represents any impact force that acts through the wheelset's center of gravity 48 causing it to roll forward. The present wheel transporter arrangement provides a horizontal resistive force Bh, from the wheel transporter's wheel wells or blocking for wheelsets on the first row or from the wheels the wheelsets on the second row sit on. The problem with force Bh is that it acts below the wheelset's center of gravity and cannot guarantee that the wheelset will not roll forward and contact adjacent wheelsets if force I was large enough. A more effective means to ensure that the wheelset does not roll forward due to the impact force I is to provide blocking that creates a resistive force F acting along a horizontal plane that cuts through the wheelset's center of gravity 48. This would effectively ensure that the wheelset is properly blocked and will never roll as per AAR rule 1J7. Roller bearing protectors, axle protectors, wheelset stoppers and axle spacers all methods of blocking that provide such a resistive force F. On the present wheel transporters only the end wheelsets that are in direct contact with the wheel transporter's end walls or are held in place by the end braces or clamps experience such a resistive force F.

The present wheel transporter loading arrangement allows each wheelset to freely sit in place and act independently if the wheel transporter experiences any impact. This is because gaps exist between adjacent wheelsets that allows a wheelset to directly impact an adjacent wheelset. Reducing these gaps by applying roller bearing protectors, axle protectors, axle spacers, shims or any other item between adjacent wheelsets will improve the present situation. The most ideal situation is to totally remove these gaps between adjacent wheelsets by using appropriately sized roller bearing protectors, axle protectors, axle spacers, shims or any other item that completely fills in these gaps and contacts both adjacent wheelsets at the same time. As a result, each wheelset is no longer independent. All the wheelsets now act as one large mass that is held in place on the wheel transporter by bracing and bulkheads at each end of the load. Impacts between adjacent wheelsets are no longer an issue. Any movement relative to one another is due to compression any energy absorption material (rubber for example) found in the roller bearing protectors, axle protectors, axle spacers, shims or any other item used to eliminate the gaps between adjacent wheelsets.

While the preferred embodiment and various alternative embodiments of the invention have been disclosed and described in detail herein, it will be apparent to those skilled in the art that various changes in form and detail may be made therein without departing from the spirit and scope thereof.

Atty. Docket No.: 43163.010300

Appendix

Freight Wheelset Roller Bearing Damage Report
Transporter and Storage Problem

FREIGHT WHEELSET ROLLER BEARING DAMAGE

TRANSPORTER AND STORAGE PROBLEM

Joseph A. Porto, eng.

Revision 1

[PAGE LEFT INTENTIONALLY BLANK]

© Joseph A. Porto, eng., 2001, 2000

All rights reserved.

Table of Contents

| | |
|---|---|
| Introduction | iii |
| Fatality | 1 |
| Present Wheel Transporters | 4 |
| Wheelset Storage Racks | 20 |
| Hot Boxes | 23 |
| Roller Bearing Protectors | 28 |
| Axle Protectors | 38 |
| Shifting Each Wheelset Tier | 41 |
| Restrain Each Wheelset | 46 |
| Extra Cost for Minimum Risk Operation | 50 |
| AAR Regulations | 53 |
| Bulkhead on Wheel Transporter | 54 |
| Wheel Transporter End Bracing Arrangement | 58 |
| Alternatives | 61 |
| Summing Up | 62 |
| THE CONCEPT | 63 |
| The Transportation Safety Board of Canada Report | 65 |
| Photos | 68 |

[PAGE LEFT INTENTIONALLY BLANK]

*Introduction*

The *Freight Wheelset Roller Bearing Damage – Transporter and Storage Problem* report describes an existing problem in present North American railway operations that could lead to hot boxes and eventual derailments. This report reviews current North American railroad practices and the AAR (American Association of Railroads) regulations respecting the storage and transport of freight wheelsets. The freight wheelset storage problem and the transport problem are described in depth. The report offers several different solutions. Some solutions resolves only the transportation problem, while the other solutions resolves both storage and transportation problems. North American regulatory bodies and railroads need to review the report in order to assess which solution to adopt and develop to properly resolve the current wheelset handling problems.

*Fatality*

On Friday, October 19, 1990 conductor John Doe, an employee of a major North American railroad, died in a work related accident. At the time of the accident the work crew at the site began to load old rail on a CWR train for disposal. The old rail was laying on either side of the track that it had just come off of. To load the rail on the train a steel cable is attached to the end of the rail. As the train starts to move, the rail is pulled from the side of the leading cars onto the train. One of the leading cars has a side roller assembly attached to the side of the car that serves as a guide to the rail as it moves on the train. Four bolts fastened this roller assembly to the car. The bottom of the assembly is flat. The assembly's size could be about 15" x 7" x 6".

When loading starts, the front end of the rail that is pulled by the steel cable is ahead of the side roller assembly and the steel cable is beside the assembly. Somehow on October 19, 1990, at the beginning of the operation the steel cable got caught beneath the side roller assembly (Figure 1). As the train moved and the old rail began to move, the steel cable began to tighten against the underside of the side roller assembly the way the string of a bow tightens as the arrow is pulled back. As the pressure mounted the side roller assembly began to twist the four bolts and the steel cable began to fray. It became a question of which would break first; the steel cable or the four bolts.

Seeing this the work crew dived for cover, John Doe turned and started to run. The four bolts broke first. The side roller assembly became a steel projectile and hit him in the back

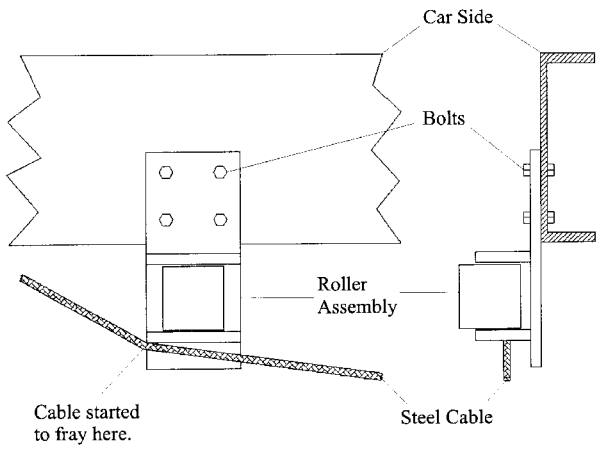

Figure 1   Cable caught under roller assembly.

1.

the way an arrow hits its target after it is released. When the crew got to John Doe, they found him alive. Since the accident happened in a remote area far from a road, Mr. Doe was placed on a flat car to bring him to a waiting ambulance at the nearest road. While on route one of the crew who was attending to Mr. Doe tried to apply pressure on the open wound to stop the bleeding and his hand sank into his back. Mr. Doe literally bled to death before he got to the hospital.

The design of the car with the side roller assembly had been in operation for twenty years and had undergone thousands of similar loading operations prior to this tragedy. An investigation found that there was a short instant just as the loading operation began when the tension in the steel cable disappeared and the cable began to sag and drop towards the ground. Then all of sudden the cable was under tension again and it sprang back up. The cable would fall below the side roller assembly and quickly snap back up again the instant before it started pulling the old rail.

For the previous twenty years the danger of the steel cable getting caught under the side roller assembly was always present, but no one was ever aware of the hidden danger. The railroad company could not be faulted because they could never have foreseen such an occurrence. The danger revealed itself in a one in a million series of events (the cable getting caught under the side roller bearing, Mr. Doe standing in the wrong place at the wrong time) with the death of Mr. Doe.

After the accident, the side roller bearing was redesigned to prevent such an occurrence. A quarter sphere was welded to the flat underside of the side roller assembly (Figure 2). The cable could never get caught under the assembly. The quarter sphere would guide it to its proper position.

The important points of this story to keep in mind are:

1. prevention was not required until the problem revealed itself, since no one was aware that a problem did exist until it was too late.
2. the chances that this type of accident would occur was extremely low but yet it did happen. The loading of old rail had taken place without incident for twenty years. The odds that someone would be standing in the direct path of an arbitrarily launched steel projectile are extremely high. Despite these two facts, it did happen and someone lost his life.

These two points must be remembered when reviewing the storage and movement of wheelsets for freight rail cars.

2.

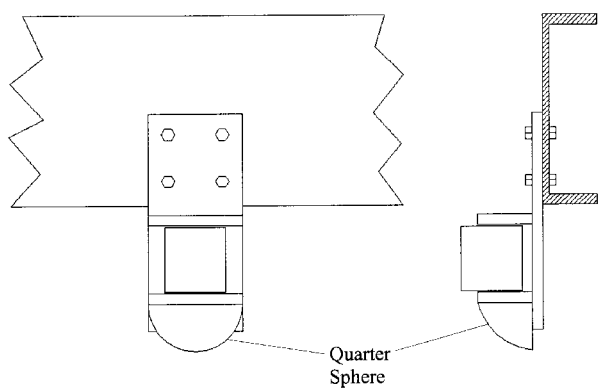
Figure 2    Redesigned roller assembly.

Present Wheel Transporters

In the same way that automobiles go through tires, railroad cars go through wheelsets. Each year the seven biggest class 1 North American railroads replace about 300,000 freight wheelsets. A wheelset is composed of one axle and one wheel and roller bearing at each end of the axle. Equipment personnel at various line points across Canada inspect wheelsets on trains and replace bad order (damaged) wheelsets with good order wheelsets. A damaged wheelset could break apart while the train is in motion and derail the train. The bad ordered wheelsets are sent to wheel shops. The wheel shops recondition the wheelsets and then send them back for use at the line points.

Wheel transporters move wheelsets between the line points and the wheel shops. These are rail cars that were modified to carry only wheelsets (containers and trucks could also act as wheel transporters). For example, in 1996 CN had a fleet of 160 wheel transporters for freight wheelsets. These wheel transporters carry up to 44 wheelsets at one time. The wheelsets are loaded in two rows on the transporters. The first row consists 23 wheelsets placed directly on the wheel transporter. A second row of 21 wheelsets lies on top of the first row. Two interlocking tiers of wheelsets make up each row (Figure 3).

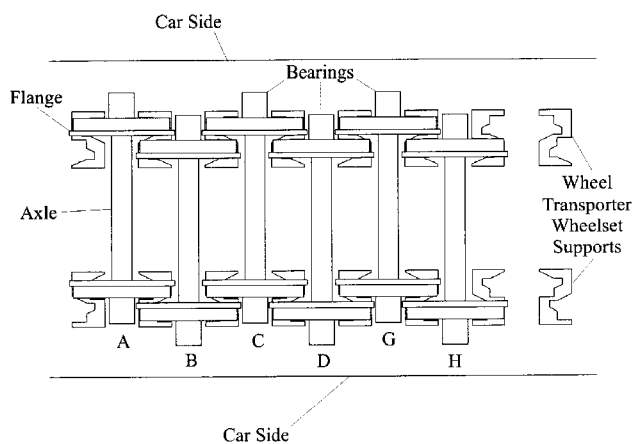

Figure 3  Top view of first row of wheelsets on wheel transporter. First tier consist of wheelsets A, C and G. Second tier consists of wheelsets B, D and H.

The wheelsets are not tied down to the wheel transporters. Steel clamps tie the last four wheelsets at both ends of the car together (Figure 4). Wheelsets A and B are tied together. Wheelsets C and E are also tied together. The forces that the wheelsets experiences during switching or while the train

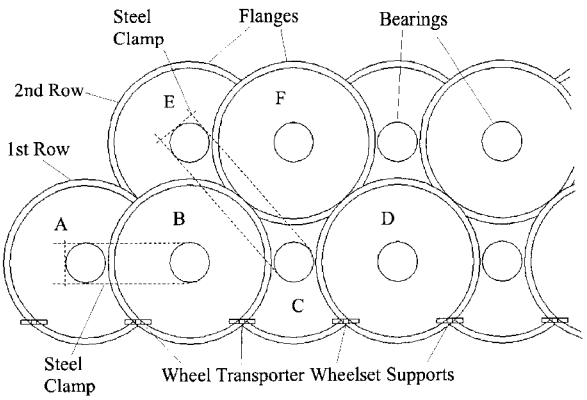

Figure 4   Side view of first and second rows of wheelsets on wheel transporter.

is in motion could cause them to displace if the four end wheelset were not tied together. Together they act as a unit to block the other wheelsets from moving (see figures 43, 44 and 47 to 50).

The AAR Wheel and Axle Manual states the following:

Section 1

Rule 1J6   Wheels mounted with roller bearings in place must be arranged when stored so the wheel flanges cannot strike either the roller bearing housing or the body of the adjacent axle. Figure 4.52 illustrates a track arrangement for wheel and axle assemblies having roller bearings. When this arrangement is not available, assemblies should be stored one behind the other on single tracks.

Rule 1J7   The same precautions must be used in placing mounted wheels on a car for shipment. In addition they shall be securely blocked to prevent rolling and end sliding. Details of approved methods are given in the current issue of AAR Loading Rules.

Section 3

Rule 3B5   Special wheel cars should be provided for the shipment of mounted wheels between wheel shops and repair points. *AAR Loading Rules illustrate approved methods of loading.* Such cars have proved to be more reliable than the use of blocking in preventing axles from becoming damaged in transit. *Wheel rack arrangement for shipping mounted wheels is illustrated in the Manual of Standards and Recommended Practices.*

Together rules 1J6 and 1J7 state that wheel flanges must not strike the roller bearing of an adjacent wheelset while they are being moved on wheel transporters. The CN wheel transporter design uses the four end wheelsets that are tied together to block the other wheelsets from displacing when the transporter experiences normal forces during switching or train movement. The parts of the wheelsets that come in contact when they are blocked by the four end wheelsets are wheel flanges to roller bearings. This goes against rules 1J6 and 1J7.

Rule 3B5 states that the AAR Loading Rules governs the loading arrangement of wheel transporters and the Manual of Standards and Recommended Practices only illustrates a wheel rack arrangement. The AAR Loading Rules (section 2 - figures 83 and 84) shows only one row per car as being the approved loading arrangement. A close inspection of the diagrams in the loading rules shows that the wheelsets are friction bearing wheelsets and there is only one row of wheelsets per car load. Also, these rules date back to 1960 (pages 7 & 8) when only friction bearing wheelsets were in use. Since 1994 friction bearing wheelsets have been banned and only roller bearing wheelsets are allowed in interchange service. The revisions made in the 1994 AAR Loading Rules (pages 9 & 10) are basically minor and rules still reflect the friction bearing loading pattern with friction bearing wheels. The difference considered in storing friction bearing and roller bearing wheelsets (discussed in next chapter) has been forgotten in the loading rules.

Rule 3B5 also states that The Manual of Standards and Recommended Practices (AAR Book A-II Wheel Transport Racks RP-011-81) shows a wheel rack arrangement for wheel transporters (pages 14 to 19). This rack arrangement (figures 2 to 4 of RP-0011) is somewhat similar in concept to that used by CN. The arrangement of the wheelsets in the racks in RP-011 is similar for the arrangement of friction bearing wheelsets shown in the AAR Loading Rules. RP-011 differs from the AAR Loading Rules by showing a second row on top of the first row (figure 1 of RP-011). What is important is that AAR Rules require different arrangements for storing roller bearing and friction bearing wheelsets (discussed in next chapter), yet no such differentiation was made for the transport of roller bearing and friction bearing wheelsets.

A second problem concerns the wheel wells spacing on transporters as dictated by RP-011 figures 3 and 4. Figure 4 states that wheel wells spacing of 51" on centres will accommodate 6 ½" x 12" roller bearing wheelsets with 36" wheels. At this spacing the distance between adjacent wheel flange and roller bearing is 1 ¼" (for tape 246 wheels). Figure 3 shows wheel wells spacing of 46" and states that 6 ½" x 12" roller bearing wheelsets with 36" wheel may be loaded on one tier only. Presently wheel transporters with wheel wells spacings of 48 ½" on centre are being used to carry 6 ½" x 12" wheelsets with 36" wheels in both tiers. At this spacing the distance between adjacent wheel flanges and roller bearing is only ½" (for tape 246 wheels). At this spacing contact between adjacent wheel flanges and roller bearings is more likely while the wheel transporter is moved and switched.

Figure 5 is the side view of a wheelset showing the wheel and roller bearing. Force I represents any impact force that acts through the wheelset's center of gravity causing it to roll or move forward. The present wheel transporter arrangement provides a horizontal resistive force Bh, from the wheel transporter's wheel wells or blocking for wheelsets on the first row or from the wheels the wheelsets on the second row sit on. The problem with force Bh is that it acts below the wheelset's centre of gravity and cannot gaurentee that the wheelset would not roll forward if force I was large

6.

Sec. 2—Fig. 83

MOUNTED WHEELS—GONDOLA CARS

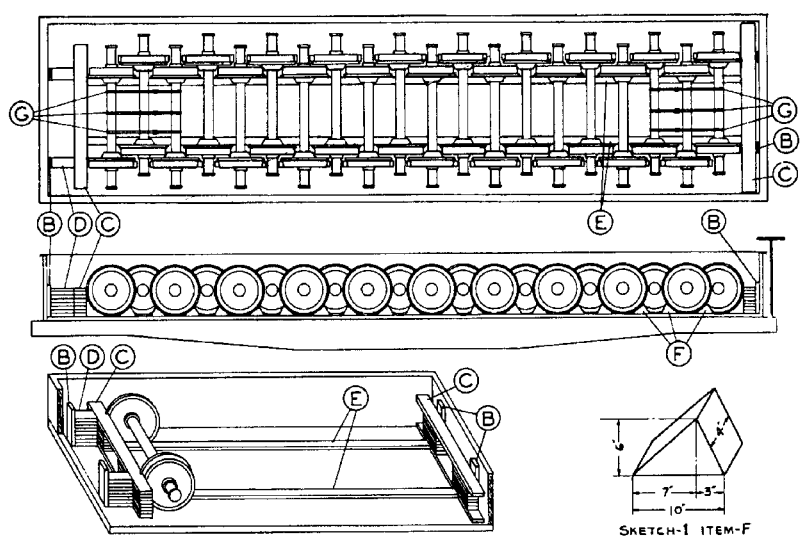

SKETCH-1 ITEM-F

| Item | No. of Pcs. | Description |
|---|---|---|
| A | | Brake wheel clearance. See Fig. 2. |
| B | 2 ea. end of load | 1¾ in. x 6 in. x 18 in., hardwood, securely wedged between Items "D" or "C" and end of car. |
| C | As required | 1¾ in. x 7 in., hardwood, long enough to extend 12 in. beyond outside face of wheels, height equal to ½ the dia. of wheels or a maximum of 16 in. Nail to floor and to each other with ten 20-D nails in each. Toe-nail top piece to Items "B" with two 20-D nails at each location where Items "D" are not used. Pieces contacting flanges must be cut to fit flange so as to provide full bearing on wheel tread. Substitute, if desired, the intermediate pieces with 1¾ in. x 7 in. x 24 in. pieces, centered against wheel. Nail to bottom Item "C" and to each other with three 30-D nails in each. |
| D | As required 1 end only | 1¾ in. x 6 in., hardwood, long enough to completely fill space between Items "B" and "C", height equal to Items "C". Locate against Items "C" at center of wheel and nail to floor and to each other with three 20-D nails in each. Top piece must be toe-nailed to Items "B". |
| E | 2 per load | 2 in. x 8 in., hardwood, full length of load. Locate against inside faces of inside wheels and nail each to floor with 20-D nails spaced about 18 in. apart. |
| F | 2 ea. outside wheel | 4 in. x 6 in. x 10 in., hardwood, per Sketch 1. Locate against tread of wheel and nail each to floor with three 40-D nails. |
| G | 3 ea. end of load | 1¼ in. x .035 in. high tension bands, equally spaced, encircling 3 end axles. Substitute, if desired, two ¾ in. dia. rods, long enough to tie three pair of wheels together, and two ½ in. x 2½ in. x 10 in. clamps. |

See General Rules 4, 5, 9, 14 and 15 for further details.

Sec. 2—Fig. 84 (Rev.—10-1960)

MOUNTED WHEELS LESS THAN 42 IN. IN DIAMETER—FLAT OR GONDOLA CARS

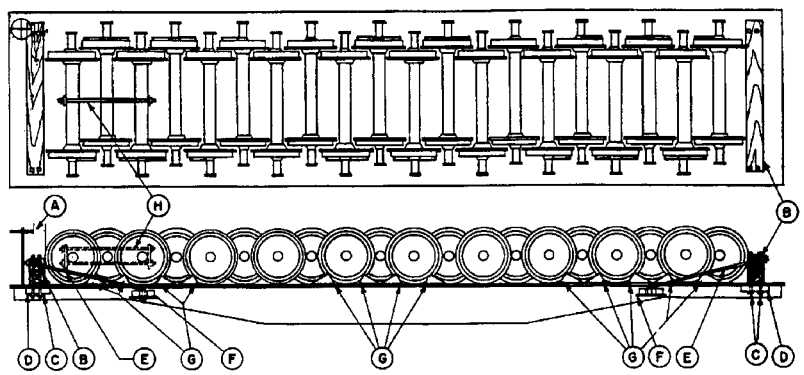

| Item | No. of Pcs. | Description |
|---|---|---|
| A | | Brake wheel clearance. See Fig. 2. |
| B | 1 ea. end of load | Flat cars.—8 in. wide, 16 in. high, hardwood. Gondola cars.—6 in. wide, 16 in. high, hardwood. Must be long enough to extend 6 in. beyond outside face of wheels. |
| C | 4 ea. Item "B" | ¼ in. dia. bolts, through Item "B", floor and Item "D". |
| D | 2 ea. end of load | 4 in. x 4 in. x 18 in., hardwood, or ½ in. x 4 in. x 18 in. plate. |
| E | 2 ea. Item "B" | ⅜ in. dia. rods, with washers, through upper portions of Items "B", near each end and Item "F" under stake pocket at a suitable angle. Not required for gondola cars. |
| F | 1 ea. Item "E" | ½ in. x 4 in. x 10 in. plate. Not required for gondola cars. |
| G | As required | 4 in. x 5 in. x 8 in., hardwood, each secured with three 20-D nails. |
| H | 3 ea. end of load. | 1¼ in. x .035 in. high tension bands, equally spaced, encircling 3 end axles. Substitute, if desired, two ¾ in. dia. rods, long enough to tie three pair of wheels together, and two ½ in. x 2½ in. x 10 in. clamps. |

See General Rules 4, 5, 9, 14 and 15 for further details.

1960

168            Sec. 2—Fig. 83 (Rev.—9-1994)
(2-1960)

MOUNTED WHEELS—GONDOLA CARS

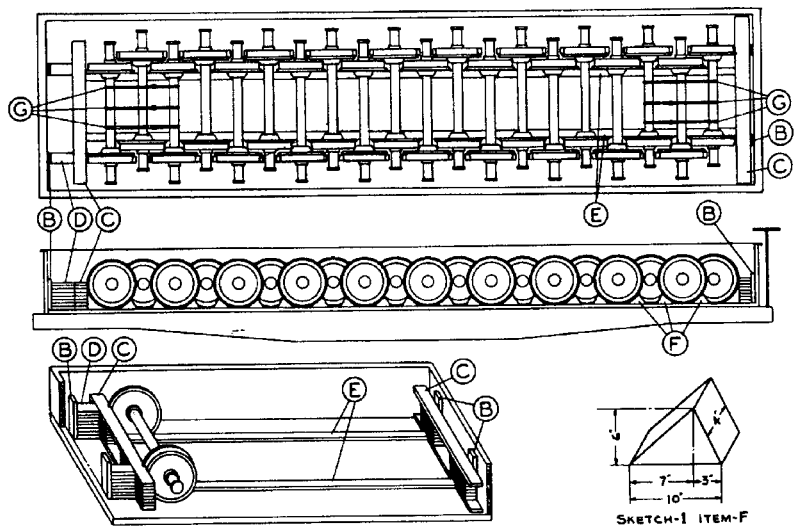

SKETCH-1 ITEM-F

| Item | No. of Pcs. | Description |
|---|---|---|
| A | | Brake wheel clearance. See Fig. 2. |
| B | 2 ea. end of load | 1¾ in. x 6 in. x 18 in., hardwood, securely wedged between Items "D" or "C" and end of car. |
| C | As required | 1¾ in. x 7 in., hardwood, long enough to extend 12 in. beyond outside face of wheels, height equal to ½ the dia. of wheels or a maximum of 16 in. Nail to floor and to each other with ten 20-D nails in each. Toe-nail top piece to Items "B" with two 20-D nails at each location where Items "D" are not used. Pieces contacting flanges must be cut to fit flange so as to provide full bearing on wheel tread. Substitute, if desired, the intermediate pieces with 1¾ in. x 7 in. x 24 in. pieces, centered against wheel. Nail to bottom Item "C" and to each other with three 30-D nails in each. |
| D | As required 1 end only | 1¾ in. x 6 in., hardwood, long enough to completely fill space between Items "B" and "C", height equal to Items "C". Locate against Items "C" at center of wheel and nail to floor and to each other with three 20-D nails in each. Top piece must be toe-nailed to Items "B". |
| E | 2 per load | 2 in. x 3 in., hardwood, full length of load. Locate against inside faces of inside wheels and nail each to floor with 20-D nails spaced about 18 in. apart. |
| F | 2 ea. outside wheel | 4 in. x 6 in. x 10 in., hardwood, per Sketch 1. Locate against tread of wheel and nail each to floor with three 40-D nails. |
| G | 3 ea. end of load | 1¼ in. x .029 in. high tension bands, equally spaced, encircling 3 end axles. Substitute, if desired, two ½ in. dia. rods, long enough to tie three pair of wheels together, and two ½ in. x 2½ in. x 10 in. clamps. |

See General Rules 1, 2, 3, 4, 5, 9, 14 and 15 for further details.

1994

Sec. 2—Fig. 84 (Rev.—9-1994)

MOUNTED WHEELS LESS THAN 42 IN. IN DIAMETER—FLAT OR GONDOLA CARS

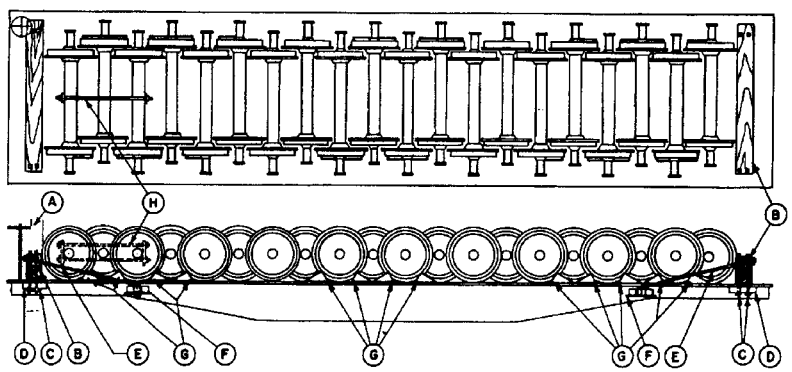

| Item | No. of Pcs. | Description |
|---|---|---|
| A | | Brake wheel clearance. See Fig. 2. |
| B | 1 ea. end of load | Flat cars.—8 in. wide, 16 in. high, hardwood. Gondola cars.—6 in. wide, 16 in. high, hardwood. Must be long enough to extend 6 in. beyond outside face of wheels. |
| C | 4 ea. Item "B" | ¾ in. dia. bolts, through Item "B", floor and Item "D". |
| D | 2 ea. end of load | 4 in. x 4 in. x 18 in., hardwood, or ½ in. x 4 in. x 18 in. plate. |
| E | 2 ea. Item "B" | ½ in. dia. rods, with washers, through upper portions of Items "B", near each end and Item "F" under stake pocket at a suitable angle. Not required for gondola cars. |
| F | 1 ea. Item "E" | ½ in. x 4 in. x 10 in. plate. Not required for gondola cars. |
| G | As required | 4 in. x 5 in. x 8 in., hardwood, each secured with three 20-D nails. |
| H | 3 ea. end of load | 1¼ in. x .029 in. high tension bands, equally spaced, encircling 3 end axles. Substitute, if desired, two ¾ in. dia. rods, long enough to tie three pair of wheels together, and two ½ in. x 2½ in. x 10 in. clamps. |

See General Rules 1, 2, 3, 4, 5, 9, 14 and 15 for further details.

1994 enough. A more effective means to ensure that the wheelset does not roll forward due to the impact force I is to have a resistive force F acting along a horizontal plane that cuts through the wheelset's centre of gravity. This would effectively ensure that the wheelset is properly blocked and will never roll as per AAR rule 1J7. On the present wheel transporters only the end wheelsets that are in direct contact with the wheel transporter's end walls or are held in place by the end braces or clamps experience such a resistive force F.

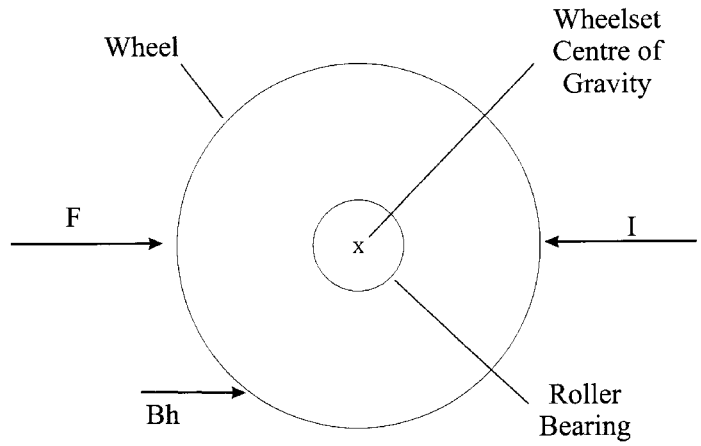

Figure 5 Raising the resistive force Bh so that it acts along a horizontal plane that cuts through the wheelset's centre of gravity (force F above) will ensure that it will not roll forward when the wheelset experiences an impact force I.

A loading arrangement on an open top rail car must pass a number of tests before it becomes an approved method in the AAR Open Top Loading Rules. One of the tests is an impact test. Impact tests are like automobile crash tests using crash test dummies. Automobile crash tests deals with the safety of passengers. AAR impact test determines proper loading methods to ensure that the load being transported is not damaged.

In an impact test a number of rail cars, with a gross total weight of 250,000 pounds, are coupled together. These cars are placed on one track with both their hand and air brakes fully applied. In effect these rail cars act like a wall. A locomotive pushes the rail car with the test loading arrangement toward this wall of parked rail cars. At a certain speed the locomotive releases the test car so it hits the wall on its own. The test car must hit this wall at 4 miles per hour. After the impact the load is inspected. If everything is okay the test car must impact the wall at 6 miles per hour. If the load passes this impact a third impact at 8 miles per hour is performed. The same end of the test car impacts the wall during the 4, 6 and 8 miles per hour impacts. This ensures that the impact forces on the load are in the same direction. If the test car passes these three impacts then one more impact is made. The test car is turned around and pushed toward the wall so that the opposite end of the car hits the wall at 8 miles per hour. The load now experiences high forces in the opposite direction to those experienced in the first three impacts.

11.

The loading arrangement in the Manual of Standards and Recommended Practices (Book A-II Wheel Transport Racks RP-011-81) for the movement of roller bearing wheelsets must pass the above impact test for approval in the AAR Loading Rules. Marking the edges of the wheel flanges with lipstick would leave a mark on the roller bearing if contact is made. If the impact test shows that the wheel flanges do touch the roller bearings of the adjacent wheelsets then RP-011 fails rules 1J6 and 1J7. Therefore, the loading arrangement in RP-011 must not be used to move roller bearing wheelsets. It should be noted that when impact tests were performed on loaded wheel transporters, they were loaded with bad order wheelsets as opposed to new or reconditioned wheelsets. This was done to ensure that new or reconditioned wheelsets were not damaged during the test. A loading arrangement that cannot be tested with new or reconditioned wheelsets should not be used to transport new and reconditioned wheelsets.

In 1997 a new wheel transporter design was developed. What was new about this design was that larger flat cars would be converted to wheel transporters in order to carry greater quantities of wheelsets per load. The problem of the point load situation (see Hot Boxes chapter) was not investigated. Therefore, the two tier, two row method of carrying wheelsets used on the old wheel transporters was also adopted. The distance between wheel centres was kept at 48 ½ inches and not increased to the 51 inches, as per figure 4 of RP-011-81of the AAR recommended practice. The steel clamps and end bulkheads were kept. Figure 6 illustrates the arrangement used by CN for the old and new wheel transporters. The following analysis will show how the problem has been worsened with the new wheel transporters.

For this analysis we assume that a fully loaded wheel transporter with 100 ton roller bearing wheelsets is moving toward the left and suddenly stopped. As a result, all the wheelsets would be jolted toward the left. The end bulkhead would prevent the first wheelset in the bottom row (wheelset A) from moving forward. The steel clamp between wheelsets A1 and C would prevent wheelset A1 from moving forward. Since wheelset A1 is held in place, it would prevent wheelset B1 from moving forward. Wheelset B1 would in turn prevent the wheelset next to it from moving forward. Therefore, each wheelset in the top row prevents the wheelset to its immediate right from moving to the left. The same holds true for the wheelsets in the bottom row.

The force that the first wheelset of each row experiences is based on the total weight of all the wheelsets to its right and not just the adjacent wheelset. If the top row consists of four wheelsets (A1 through D1), then the force from the combined mass of wheelsets B1, C1 and D1 is felt by wheelset A1. The more wheelsets that are on the top row, the higher the force wheelset A1 experiences. This total force is concentrated on a single point on each bearing of wheelset A1. The same applies for the bottom row and wheelset A.

The old CN wheel transporter carries 21 wheelsets on the top row and 23 wheelsets on the bottom row. Wheelset A1 would then experience the force of the total mass of the 20 wheelsets to its right. Each 100 ton roller bearing wheelset weighs approximately 2,700 pounds. Wheelset A1 is stopping a total mass of 54,000 pounds, which is transmitted to wheelset A1's roller bearings. Each roller bearing on wheelset A1 is stopping half of this mass (27,000 pounds) on a single point.

The new CN wheel transporters can carry over sixty 100 ton roller bearing wheelsets. If there are 30 wheelsets on the top row, then the total mass wheelset A1 is stopping is 78,300 pounds. Each

12.

bearing on A1 is now stopping a mass of 39,150 pounds on a single point, a 45% increase from the above 27,000 pounds.

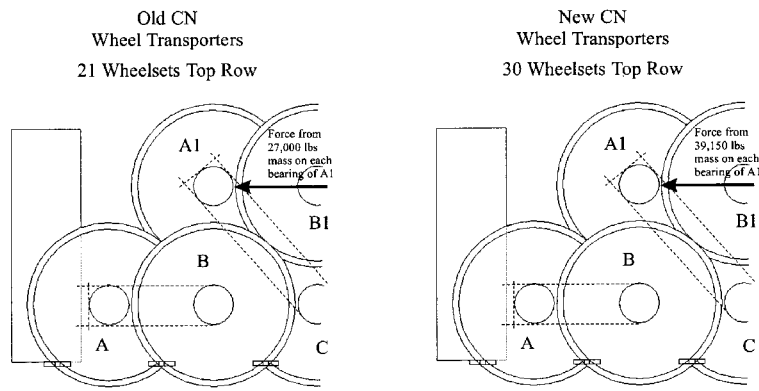

Figure 6 Comparison of impact forces on roller bearing between low and high capacity wheel transporters.

Unlike a passenger train, the ride of a freight train is not a smooth ride. Therefore, it is likely that the wheel flanges will hit the roller bearing of an adjacent wheelset often during transportation between wheel shops and line points. When the transporters are switched the flanges will contact the roller bearings with even greater force. This constant contact between wheel flange and roller bearing can damage the roller bearing internally. This damage could eventually lead to a hot box and a major derailment.

Association of American Railroads
Mechanical Division
Manual of Standards and Recommended Practices (Former L-69A)
RP-011

WHEEL TRANSPORT RACKS
Recommended Practice
RP-011-81
Adopted 1952, Revised 1981

SCOPE

This Recommended Practice provides a typical loading arrangement for mounted wheel sets. Design details of loading rack sections are included in five drawings which show spacing of wheel wells, dimensions of rack section at centerline of car, wheel block, wheel rack and removable wedge.

Details of this recommended practice are as Figures 1-5 and provided for use by the individual railroad in the design of a rack applicable to flat car meeting AAR requirements.

12-1-81
A-II-7

14.

A-II-9

18.

*Wheelset Storage Racks*

Constant replacement of bad order wheelsets requires the storage of wheelsets at line points and wheel shops. Wheelsets are stored in the same arrangement as on wheel transporters. Each row consists of two interlocking tiers of wheelsets. The wheelsets are piled several rows high depending on how busy the line point is. Figure 4.51 in Section 4 of the AAR Wheel and Axle Manual (page 21) shows wheelset storage that is similar to the method of storage that railroads use across North America. As in the wheel transporters, the flanges of the wheels are in line with adjacent bearings because it uses a double track system. Unfortunately figure 4.51 applies only to plain bearing wheelsets and North American railroads store roller bearing wheelsets in this manner.

Rule 1J6 of the AAR Wheel and Axle Manual states that

"Figure 4.52 illustrates a rack arrangement for wheel and axle assemblies having roller bearings."

The flanges of the wheelsets in this arrangement (page 22) are never in line with roller bearings. The wheelsets may be stacked for several rows, since the wheelsets would not be able to move laterally and fall on the wheelset just below it. Locations that have an overhead crane over the storage sites will not have any difficulty placing and removing wheelsets from the stack. Locations that use forklifts will experience difficulties if the wheelsets are stacked. It is important to note roller bearing wheelsets require a different storage arrangement (page 22) than those of friction bearing wheelsets (page 21), but the transporter racks of RP-011-81 (previous chapter) correspond only to the storage of friction bearing wheelsets (see figures 45, 46 and 59 to 62).

Rule 1J6 also states that

"When this arrangement is not available, assemblies should be stored one behind the other on single tracks."

Again the wheel flanges are never in line with roller bearings since there is only one tier (see figures 63 and 64). Since there is only one tier, the wheelsets could not be stacked because nothing would prevent them from falling if moved laterally.

Wheelsets are placed or removed from storage sites using overhead cranes (at wheel shops) or by forklifts (at line points). Unless employees are extremely careful while placing or removing roller bearing wheelsets from storage, the roller bearing will be struck by wheel flanges and possibly damaged. Again rule 1J6 is violated and another concern for hot boxes.

Note: Wheelsets could only be stacked if each wheelset of the bottom row is properly blocked and not able to roll along the track. AAR figures 4.51 and 4.52 does not show any blocking.

20.

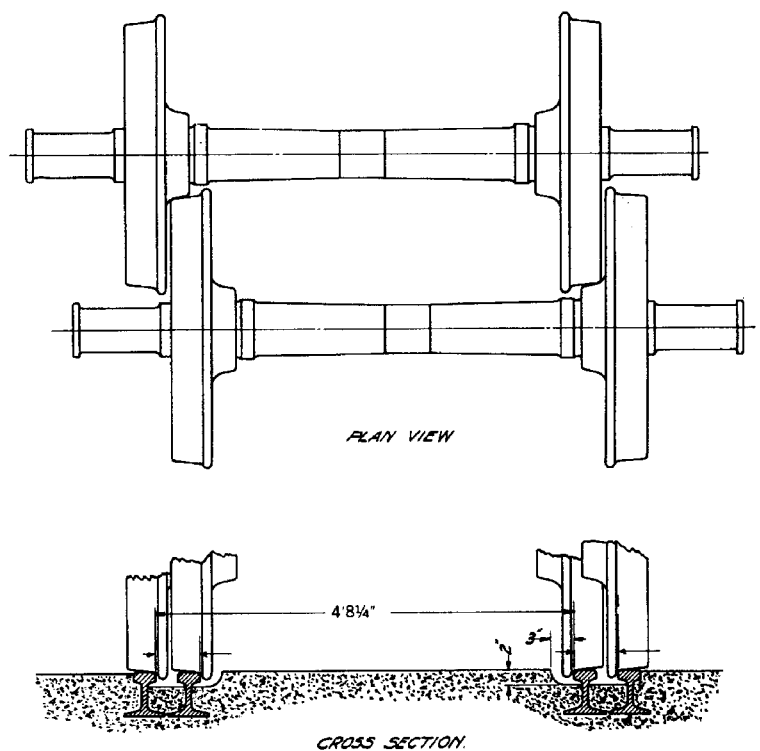
Spacing of Mounted Wheels with Plain Bearing Axles on Storage Track
Figure 4.51
G-II-102

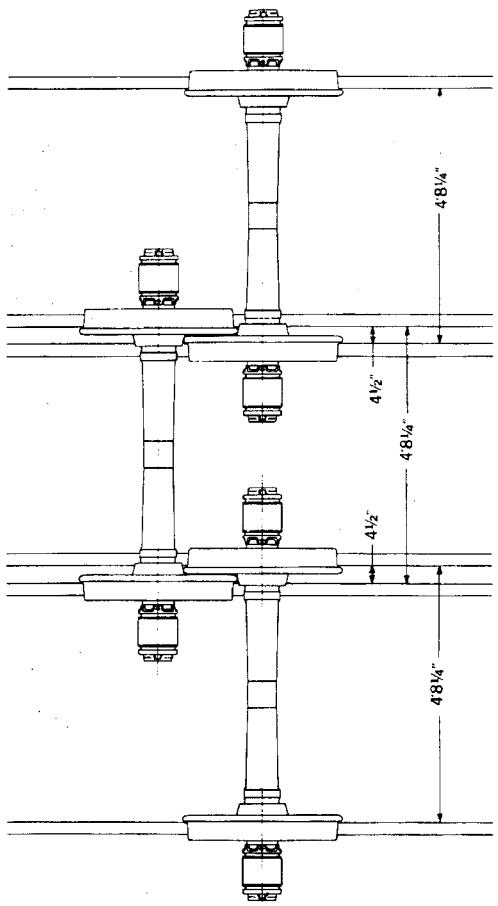
Storage Track Arrangement for Wheel and Axle Assemblies Having Applied Roller Bearings with Housing End Covers That Rotate
Figure 4.52
G-II-103

*Hot Boxes*

Consider a freight car traveling across Canada from Halifax to Vancouver, a 6,050 kilometer distance. Also, this car is equipped with roller bearing wheelsets and 36" diameter wheels. Assume that the car's speed across Canada is 80 kilometers per hour (50 miles per hour). The wheels of this car would make over 2.1 million revolutions at a speed of 7.7 revolutions per second. This car could make up to 20 such trips in one year.

To sustain such use the internal components of the roller bearing (Figure below and page 22) must be in good condition. Internal grease must always be present to keep these components lubricated. Any damaged component would damage another component that it is in constant contact with. Damaged seals could let the grease leak out of the roller bearing or let particles enter. Running the bearings without grease is like running an automobile engine without oil. Foreign particles that may enter may damage internal components. Damaged internal components may break up very quickly after continuous use. The friction between damaged internal components or the loss of grease would eventually increase the internal temperature of the roller bearings tremendously during a typical trip causing a hot box. A hot box refers to a roller bearing that is overheating.

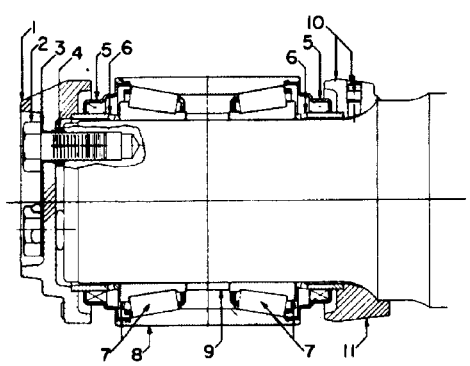

1. End Cap
2. Cap Screws*
3. Locking Plate
4. Cap Screw Seal Rings
5. Seal
6. Seal Wear Ring
7. Roller Assembly (Includes Rollers, Cage, and Inner Ring.)
8. Outer Ring
9. Spacer
10. Backing Ring (With Vent Fitting.) Inboard seal wear ring and backing ring are one piece on bearings of some manufacturers.
11. Fitted Backing Ring - Extension press fitted over axle dust guard seat. Otherwise same as 10.

Figure 7 Parts of Tapered Roller Bearing with rotating end cap.
From AAR Roller Bearing Manual - Section 1- figure 1.2 page (H-II-8).

If a hot box goes undetected the internal temperature could rise to a point where the roller bearing literally melts away. Then the wheelset would collapse under the moving train and cause a derailment. This is such a serious problem that hot box detectors are located at numerous points across the rail system. The hot box detector is a device with a heat sensor. It is placed at the side of a track and at the same level of a moving train's wheels. When a train passes by a hot box detector and one of its wheels has a hot box a central location overseeing all lines receives a signal from the hot box detector. The operator at this location obtains a readout that indicates exactly which axle on the train has the hot box. He then radios the crew of the train with the information. The train stops and Association of American Railroads
Roller Bearing Manual
SECTION 1
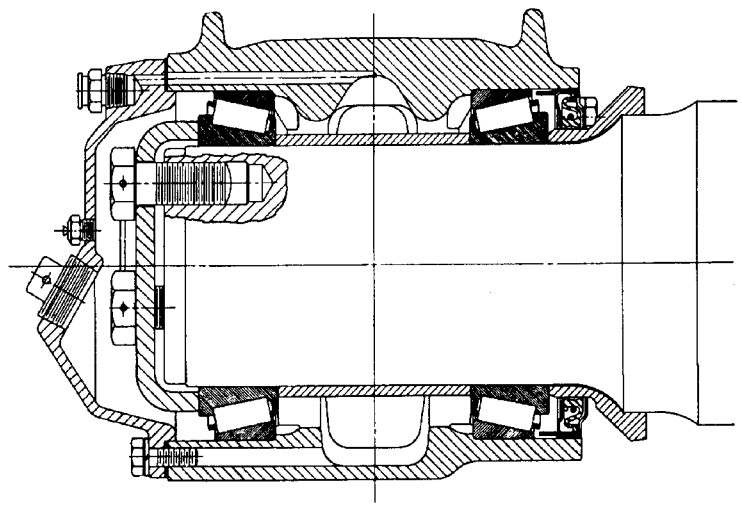
Housing type may have tapered or cylindrical rollers, tapered shown.
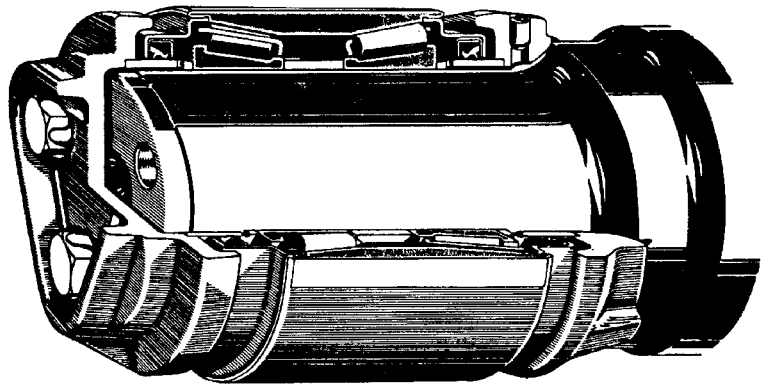
Rotating end cap type may have tapered or cylindrical rollers, tapered shown.
Fig. 1.1 General Arrangements of Roller Bearings
H-II-7 the crew investigates the suspect hot box. In case a train's route does not take it past a hot box detector the train crew routinely walk along the train to see that everything is in order. They usually have some device like a temperature indicating crayon to check for hot boxes.

Each year the major North American railroads experience anywhere between 200 to 350 hot boxes per year on each of their lines. With all the precautions taken some hot boxes are not detected and result in burnt out journals and derailments.

On November 10, 1979, a train derailed in Mississauga, Ontario. The cause was a hot box. Some of the cars that derailed were carrying dangerous commodities. Cars loaded with propane exploded and one of the tank cars carrying the deadly gas chlorine suffered a 2 ½ foot diameter hole in its shell. The danger of deadly chlorine gas escaping caused the evacuation of nearly a quarter of a million people from their homes or businesses.

The constant contact between adjacent wheel flanges and roller bearings when good ordered wheelsets are placed or removed from storage racks or moved by wheel transporters (as depicted by RP-011-81) can damage the internal components of the roller bearing. This could lead to a hot box and a potentially serious derailment. This is because contact between the wheel flange and the roller bearing is only at a single point and not over a large area (Figures 8 to 10). To fully understand the difference between single point contact and contact over a large area, consider the difference in pain felt by a foot stepped on by 200 pound person (Figure 11) wearing high heel stiletto shoes (single point contact) or wearing flat running shoes (contact over a large area). Since blows at a single point are severe, the AAR conceived of rules 1J6 and 1J7 of the Wheel and Axle Manual. Rules not complied with by wheel transporters or storage racks.

One way to verify if a problem really exists is to gage the bearing manufacturer's confidence in their product. Are they ready to say that their bearings can take the constant hitting from adjacent wheel flanges during delivery to line point on wheel transporters? They may be liable for another Mississauga derailment due to a hot box if they said yes. (Also see *A Special Study Of Main Track Derailments - Report Number SR9401 Section 4.3.2 Roller Bearing Failures* by The Transportation Safety Board of Canada - page 65).

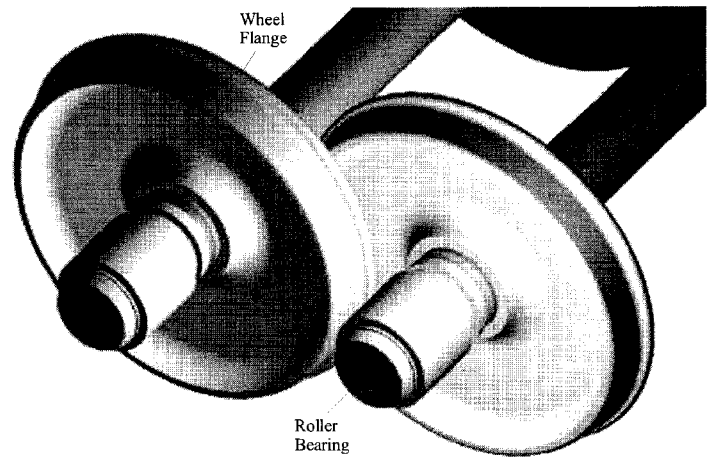
Figure 8  Adjacent wheelsets contact between wheel flange and roller bearing.
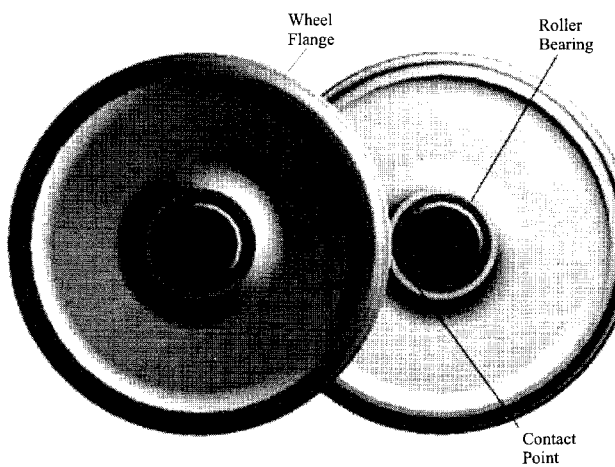
Figure 9  Side view of adjacent wheelsets showing single point contact.

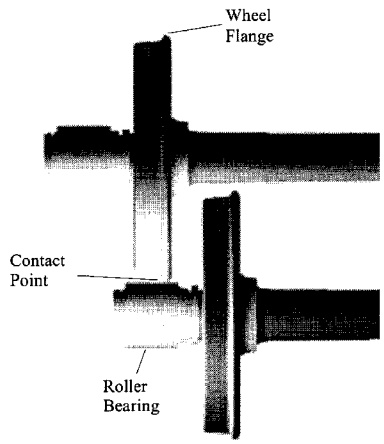

Figure 10 Top view of adjacent wheelsets showing single point contact.

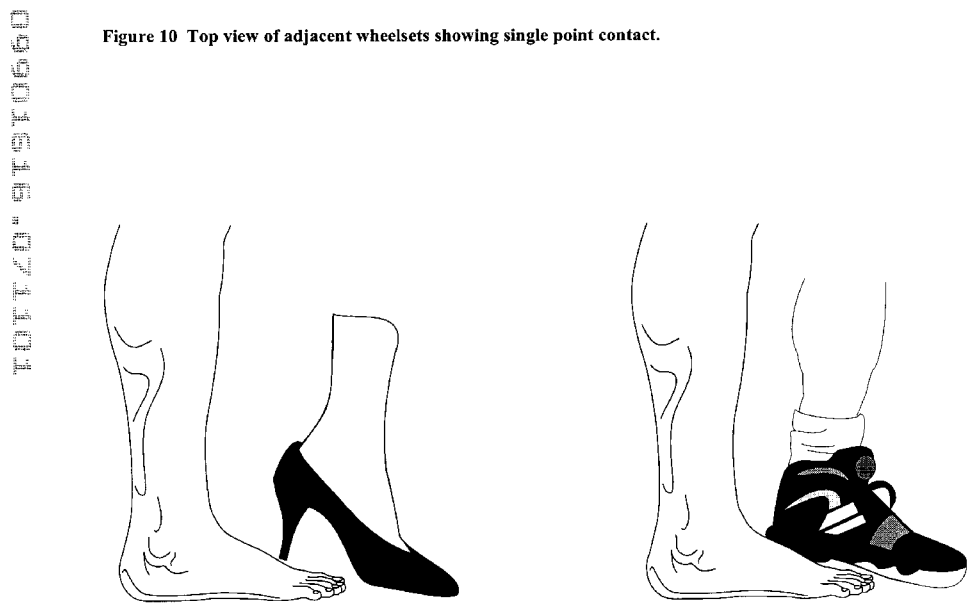

Figure 11 Contact between wheel flange and roller bearing at a single point versus a large area is similar to a foot being stepped on by a high heeled shoe (single point contact) versus a running shoe (large area). Damage to the roller bearing is greater in the same way that injury to the foot is greater for a blow at a single point.

*Roller Bearing Protectors*

Manufacturers always package their products (e.g. televisions, stereos, glass....) to protect them from damage that may occur between the time the product leaves the plant to when the final user receives the item. Similarly the roller bearings on new or reconditioned wheelsets should be properly packaged or protected to prevent any damage that may occur between the time the wheelset leaves the wheel shop to the time it is used and placed underneath a rail car. In this case the roller bearings must be protected from the blow of adjacent wheelsets' flanges. By encasing the roller bearing with a protector and properly protecting it from damage from the single point impacts with the flanges of adjacent wheelsets, the present wheel transporters and storage system may be kept as is. This protection may vary in shape from a simple block shaped material squeezed between the roller bearing and an adjacent wheel flange (Figure 12), to a more practical collar or cap shape that encircles the roller bearing (Figure 13). The material used for the protection should absorb the impact of the wheel flange from damaging the roller bearing (e.g. rubber). This material should also be thick enough (dimension "a" in Figure 13), to ensure sufficient protection for the roller bearing. Adding a hard exterior shell (e.g. Steel or hard molded plastic) to the protector will improve protection to the roller bearing, since it will distribute the force of the flange's blow over a larger surface area of the absorption material (i.e. rubber material). Extra protection is possible if the outer profile of the protector follows the contour of the adjacent wheel (Figure 14). This is because the force of the blow is made over a larger area instead of a single point where only the wheel's flange contacts the protector.

Block Protectors

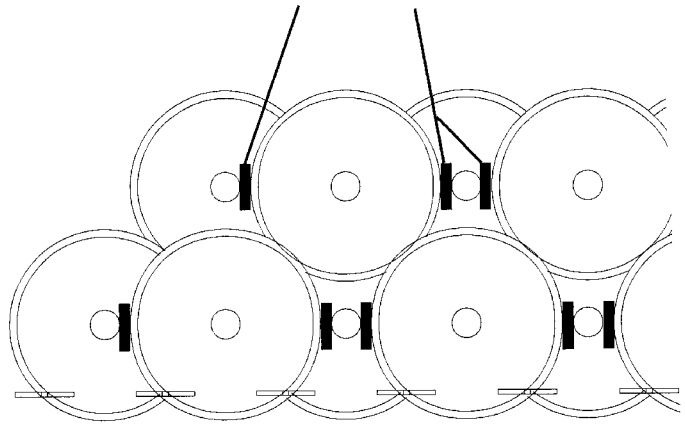

Figure 12 Block shaped protectors placed between roller bearings and adjacent wheel flanges.

To understand what will make an effective protector for the roller bearings, the following design for the roller bearing protector will be examined. This protector consists of an outer cushion, a hard

28.

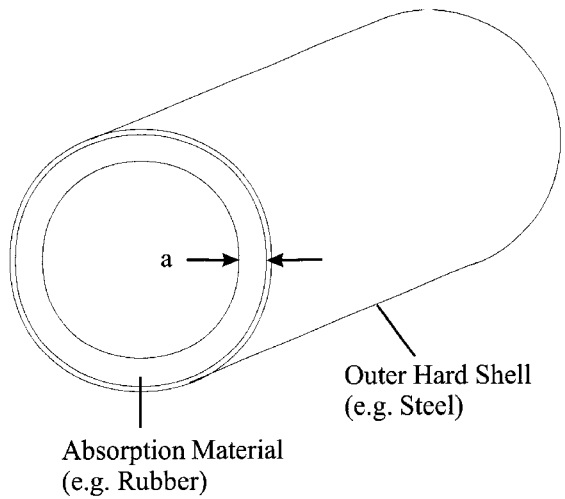

Figure 13 Cylindrical or Cap Protector. Slipped onto each roller bearing. A hard outer shell (if used) adds to the protection of the roller bearing.

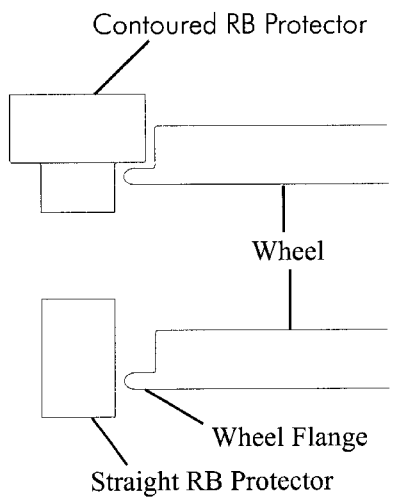

Figure 14 Contoured roller bearing protector offers better protection to the roller bearing than the straight roller bearing protector because of the larger contact area between the wheel and the roller bearing protector.

29.

shell, an inner cushion and an end cushion (Figure 15). The two halves are held in place by two rubber O rings, one at each end of the protector (Figure 16). The outer cushion serves to eliminate any gap between adjacent wheel and the bearing (Figure 16). Although the outer cushion should be able to deform slightly to eliminate this gap, it should also be stiff enough to transmit some of the adjacent wheel's force to the protector's hard shell. In effect the area on the hard shell that experiences the force of the adjacent wheel is increased from the single point contact at the wheel's flange to include the area of the deformed outer cushion. The hard shell transmits the wheel's pressure to the inner cushion over an even greater area, which is then transmitted to the roller bearing itself. It is the transmission of the adjacent wheel's force over a large area (versus single point contact between wheel flange and roller bearing) and filling the gap between the roller bearing and the adjacent wheel flange that protects the roller bearing. This can easily be understood by performing the following two experiments.

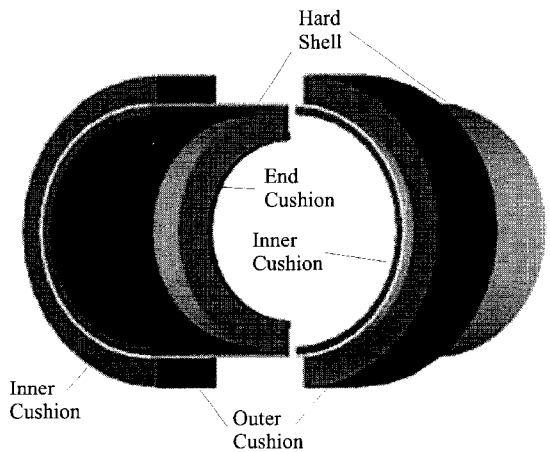

Figure 15 Two halves of roller bearing protector that is applied to each roller bearing.

The first experiment requires two ordinary 500 ml glass jars with the lids, ½" steel ball, newspaper, protective glove, safety glasses and thick long sleeved shirt. Place the steel marble into the glass jar and close the lid. Put on the safety clothing. Now pick up the jar and shake it hard, like a babies rattle. Before long the moving steel ball in the glass jar will break the jar. Now half fill the second glass jar with newspaper. Take the steel ball, place it in the second glass jar and tightly fill it with more newspaper. The steel ball should be placed against the wall of the glass jar. Enough newspaper should be placed in the jar so the steel ball cannot move and is in constant contact with the glass jar. Now close the jar with the lid and once again shake the jar hard. This time the jar will not break because the steel ball is not allowed to move with respect to the glass jar and continuously hit the jar. This is because all spaces or gaps within the jar is taken up by the newspaper. Similarly,

30.

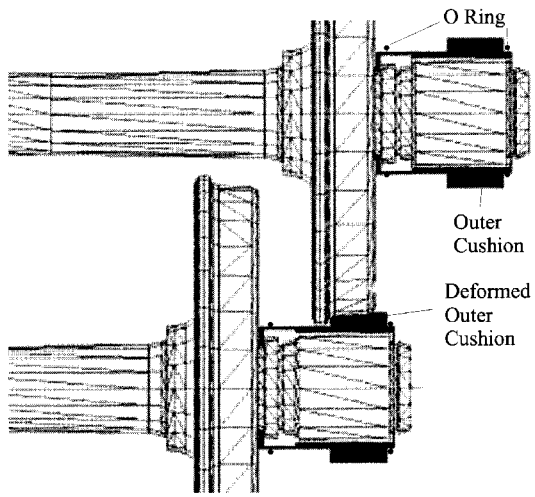

Figure 16 Deformation of roller bearing protector's outer cushion and removal any gap between roller bearing and adjacent wheel. Force of adjacent wheel is transmitted to the roller bearing over a greater area as compared to a point load from the wheel flange (when no protectors are used).

the gap between roller bearings and adjacent wheel flanges allows them to constantly hit each other as a wheel transporter is jarred into motion (movement of a freight train is not smooth).

A pen, its' cover and a hard covered book is required for the second experiment. Place your hand on a table, with the palm of the hand touching the table. Hit the back of your hand with the covered nib of the pen a few times, ensuring that you do not injure yourself. Remember how this felt. Now place the hard covered book over the back of your hand that is still on the table, palm down. Now strike the book with the pen, in same manner as was done earlier, and feel the difference as the blow is transferred through the book to your hand. This time the blow is not as harsh because the book transfers the same force that was experience earlier over a larger area. The first case (without the book) is like the direct single point blow on the roller bearing by the adjacent wheel flange. The second case (with the book between the hand and the striking pen) is like roller bearing experiencing the blow over a large contact area since the roller bearing protector is between the roller bearing and the striking adjacent wheel.

The second experiment can be modelled mathematically using the following formula:

$$P = F/A$$

Where $P$ represents pressure (what the hand or roller bearing feels after being struck), $F$ represents force (the strength of the impact on the hand or roller bearing by the pen or wheel flange respectively) and $A$ represents the contact area (contact area where hand or roller bearing is struck). If the force remains constant and the contact area approaches single point contact, the pressure becomes extremely high. As the contact area increases, the pressure quickly drops as shown in the graph below.

31.

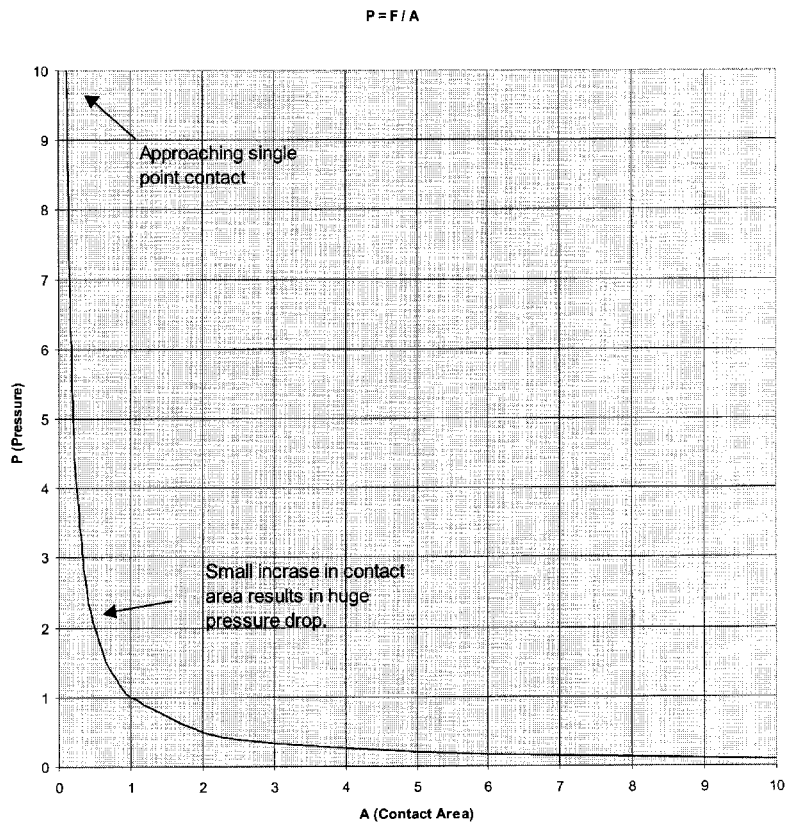

Therefore, an effective roller bearing protector must not only ensure no direct contact between roller bearing and adjacent wheel flange as required by rules 1J6 and 1J7 of The AAR Wheel and Axle Manual. An effective roller bearing protector should remove any gap between the roller bearing and adjacent wheels and transmit an adjacent wheel's force over a greater area than the present single point load. (Note: although not as effective, if the absorption material is sufficiently thick enough then a very small gap may be tolerated.) In essence an effective roller bearing protector must act like the roller bearing adapter (Figures 17 to 19) does for the roller bearings of wheelsets in use on rail cars. The roller bearing adapter ensures that the roller fits properly in the side frame of rail car's truck, leaving no gaps for the roller bearing to move around and damage itself. The contour of the roller bearing adapter, like the roller bearing protector, ensures that any

32.

forces that the roller bearing experiences as the rail car moves along the rail is spread over a large area and not on a single point load.
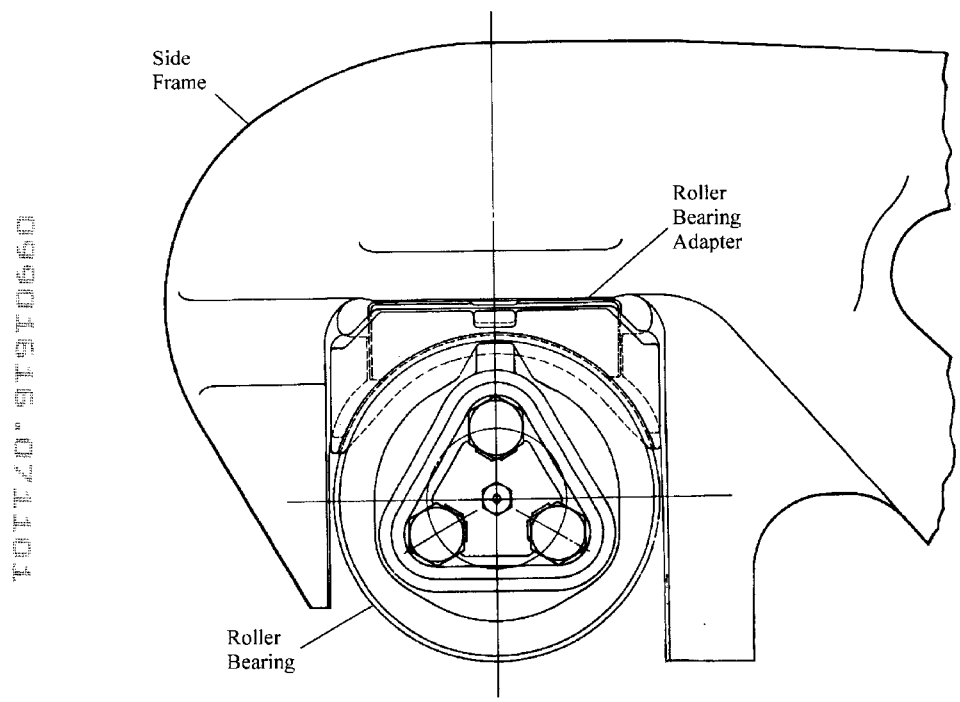
Figure 17 Roller bearing in rail car's side frame.

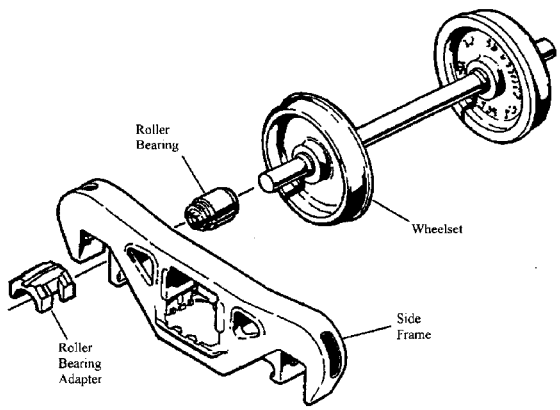
Figure 18 Roller bearing placement in rail car's side frame.
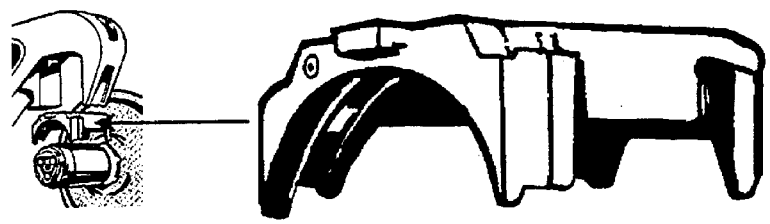
Figure 19 Roller bearing adapter installed in rail car's side frame over roller bearing.

Keeping this in mind consider the simple block protector shown in figure 12 to that shown in figure 20. The simple block now has one face contoured to follow the profile of the wheel flange that it contacts while the opposite face follows the profile of the roller bearing that contacts it. This roller bearing protector could also have a hard plate inserted into it to help transfer the force of the wheel over an even larger area (similar to the hard shell in the roller bearing protector of figure 15).

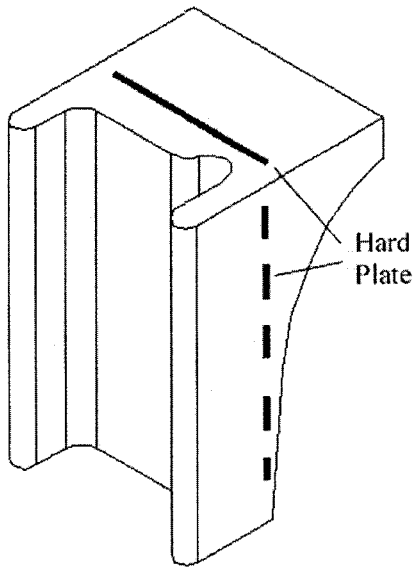

Figure 20 Contoured roller bearing block protector is inserted between roller bearing and adjacent wheel flange after wheelsets are loaded on the wheel transporter.

The outer shape of the roller bearing protector also has an effect on the amount of protection it will offer. As the wheel makes contact with the deformable section of the protector, the contact area between the wheel and the protector increases as that section of the protector deforms. A protector whose deformable section is flat as opposed to circular will have a higher contact area (Figure 22). As a result the force is transmitted to the roller bearing over an even larger area, thereby deceasing the pressure it feels.

The orientation of a circular protector is not critical as opposed to one with flat sides. Therefore, a method is required that will place a flat sided protector in the proper orientation. To resolve this

35.

problem consider the straps found on the hubs of bicycle wheels (Figure 21) that keep the hubs from getting dirty while the bicycle is in use. The shape of the strap is such that gravity always keeps it in one orientation even though the bicycle wheel is turning. Gravity can be used to keep a flat sided roller bearing protector properly oriented by placing an off centered weight on it (Figure 22). If the protector is loosely fitted to the roller bearing, like the strap on a bicycle hub, then gravity will rotate the protector with respect to the roller bearing to the proper orientation. If the protector is tightly fitted to the outer casing of the roller bearing then the off centered weight must be heavy enough to allow gravity to turn the roller bearing outer casing as well.

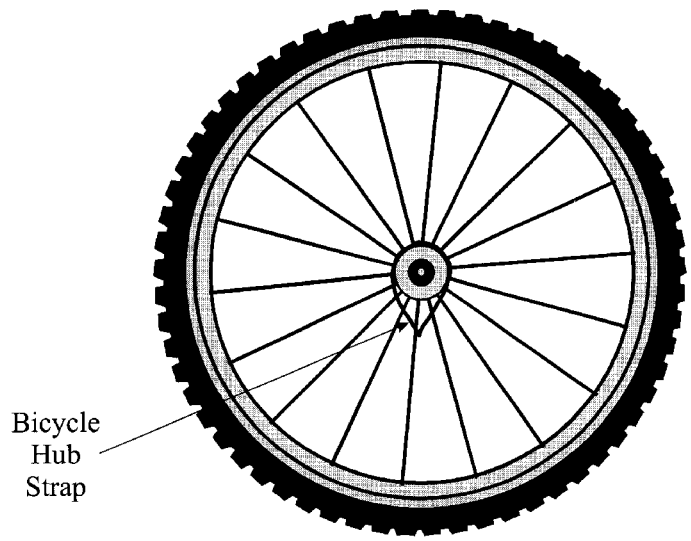

Figure 21 Hub strap on a bicycle wheel always stays in one orientation due to gravity.

For sample models of different roller bearing protectors see Figures 65 to 74.

36.

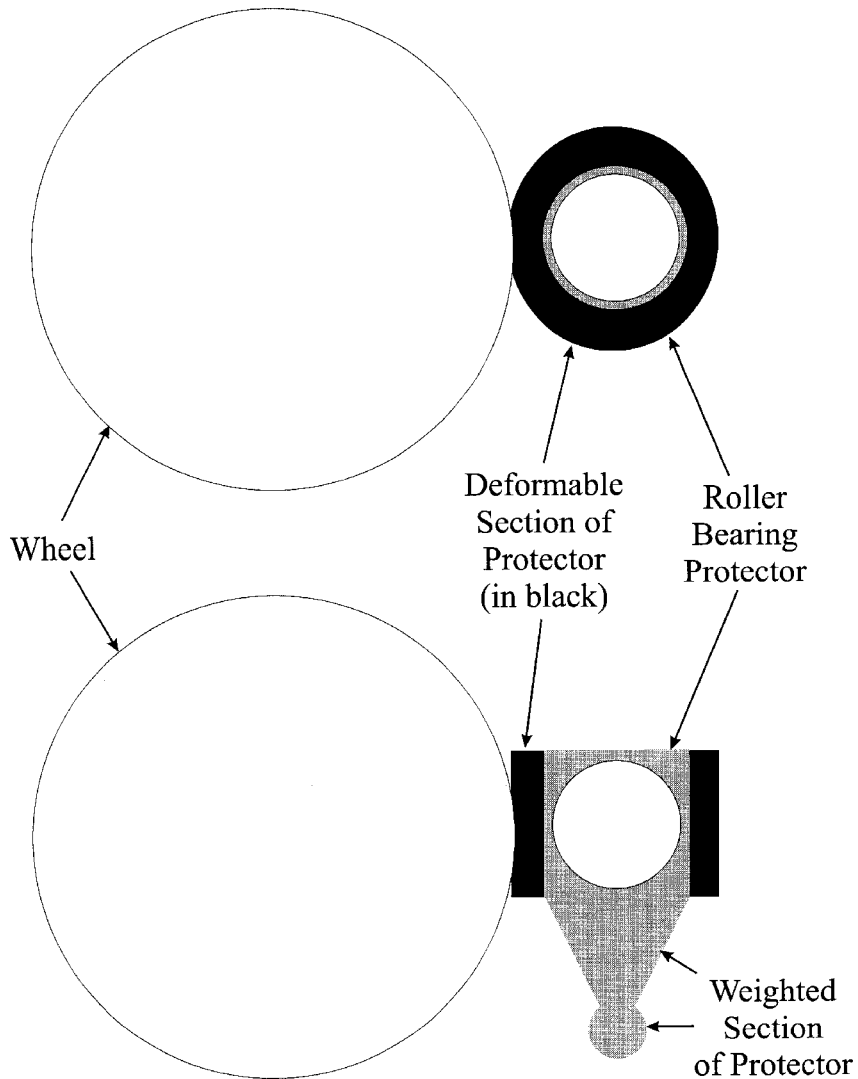
Figure 22 Roller Bearing protector with flat deformable section offers higher contact area with the wheel than one with a circular deformable section. Weighted section allows gravity to keep flat sided protector in the proper orientation.

*Axle Protectors*

The axle protectors ensure that no contact is made between the axle and the flange of an adjacent wheel. The gap between axle and adjacent wheel flange is greater than between roller bearing and adjacent wheel flange. If the gap between axle and adjacent wheel flange was reduced to less than that between roller bearing and adjacent wheel flange with the insertion of an axle protector, then the roller bearings will never come in contact with an adjacent wheel flange.

The design of axle protectors is similar to roller bearing protectors and based on the same principles discussed above. For example, if the contour of the face that contacts the roller bearing of the roller bearing protector in figure 20 is changed to conform to the profile of an axle then the protector becomes an axle protector. Figure 23 is a top view of this axle protector inserted between the axle and the flange of wheel. As with the roller bearing protector, the rigid bar may be inserted within the axle protector to better distribute any forces over a larger area on the axle. Figure 24 is a perspective view of the set up in figure 23.

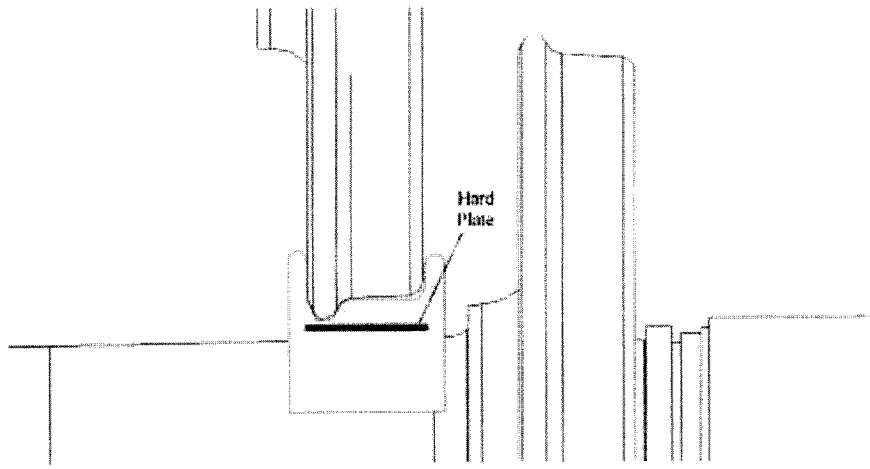

Figure 23 Top view of contoured block axle protector inserted between an axle and an adjacent wheel flange. An optional hard plate may be inserted within the axle protector to improve force distribution.

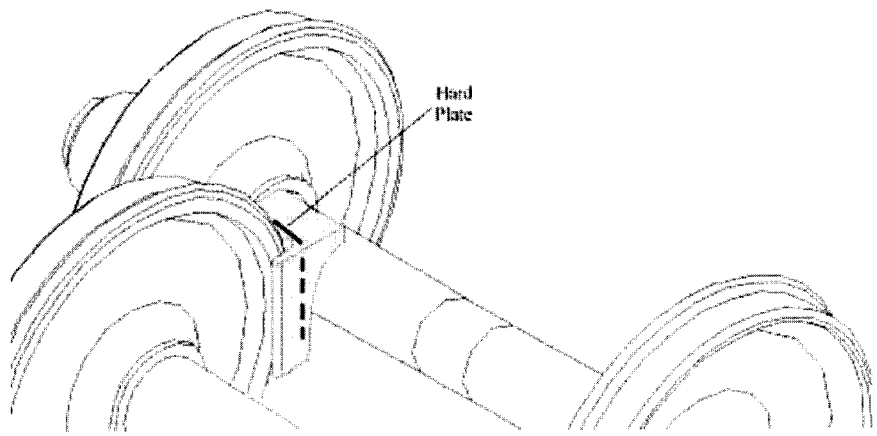

Figure 24 Perspective view of block contoured axle protector inserted between an axle and an adjacent wheel flange.

Figure 25 shows two halves of a cylindrical axle protector that is taped or strapped together on to the axle. Like similar roller bearing protectors, this axle protector has an inner cushion and a hard shell. Since the diameter of an axle is smaller than that of a roller bearing, the dimension "a" shown of the inner cushion could be greater than that of a roller bearing protector resulting in better protection. Although not shown in this figure, the axle protector may be contoured with the addition of an outer cushion similar to the roller bearing protector in figures 15 and 16. The axle protector may vary in length so as to cover only the area near the adjacent wheel flange or the whole axle. The axle protector may be left on the axle after the wheelset is placed under a freight car if it does not interfere with any of the mechanisms in the trucks or it may be removed for reuse.

39.

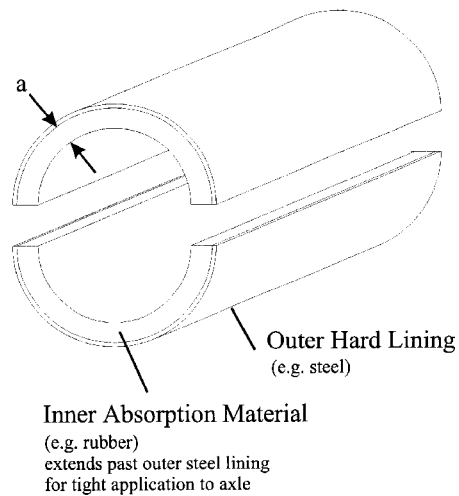
Figure 25 Axle Protector - may be clipped or strapped together on the axle. Similar type of design as used to protect the roller bearings.
40.

Shifting Each Wheelset Tier

The main problem with the present wheel transporters is contact between wheel flanges and adjacent roller bearings (Figure 26). Shifting the two tiers apart (Figures 27 and 55 to 58) so that the wheel flanges are not in line with adjacent roller bearings solves this problem. Lengthening the wheel supports' centre portion (Figure 28) shifts the two tiers apart. These wheel supports are based on the CN design. There are other designs available in the railroad industry. What is important is that the wheel wells, which are common to all the different designs, are shifted apart for the new wheel transporter arrangement.

The present loading arrangement prevents the top wheelset from falling off the bottom wheelsets if it moves sideways because it is sandwiched between wheel A's flange and wheel B (Figure 29) of the bottom wheelsets. Now a lateral stopper is required to prevent the top wheelset from falling off the bottom wheelsets if it moves sideways. The lateral stopper's web should be fashioned so that the flange of the top wheelset may be put on either side of the bottom wheelset flanges (Figures 30 and 31). The web of the lateral stopper (Figure 32) should also be low enough to accommodate different wheelsets sizes. The smaller the wheelset the lower the top wheelset will sit. Each transporter requires twenty-one lateral stoppers to carry 44 wheelsets. Item 2b (Figure 27) shows a box type lateral stopper that will also act as a stopper for adjacent wheelsets. Since wheels come in different sizes, shims can be used to remove any gap between the wheel and the lateral stopper and lock the wheel in place. These shims can be stored within the lateral stopper when not in use.

Rules 1J6 and 1J7 also specify that wheel flanges cannot strike the body of adjacent axles. Contact between wheel flanges and adjacent axles is not possible in the present design. In this solution contact between wheel flanges and adjacent axle is possible but not with adjacent roller bearings. Therefore, axle protectors are required.

This suggestion must pass the standard tests for inclusion in the AAR Open Top Loading Rules as an approved loading arrangement before it is used. If it passes the tests then this design allows CN to move 44 wheelsets per car, especially during the winter when wheelsets are in demand. Impact tests will also determine if the present arrangement of clamping the last wheelsets at each end of the car is adequate or if a change is required for this design.

The line points use a fork lift to load or unload a wheelset from the side of the wheel transporter. The lateral stopper might be in the way when it reaches for the wheelset behind the lateral stopper. Also, the wheelset is closer to the opposite side of the car. Could the extra five to eight inches that the forklift has to reach behind the lateral stopper be a problem? If there is a problem then a new attachment must be designed as a solution.

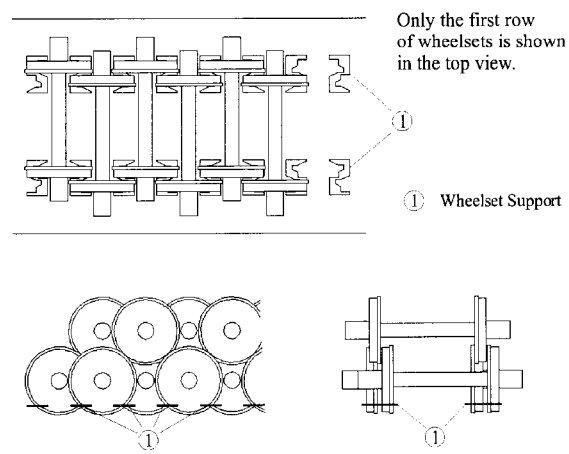
Figure 26  Present wheelset loading arrangement. Wheel flanges contact adjacent roller bearings.
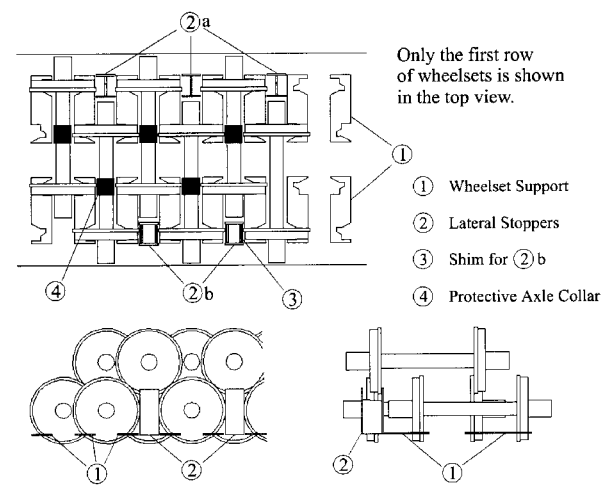
Figure 27  Shifted wheelset loading arrangement. The two tiers are shifted apart and toward the car sides.
42.

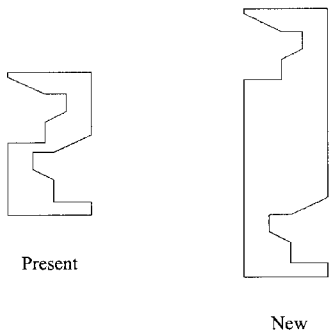
Figure 28  Present and new wheelset support. Centre portion of the new support is lengthened.
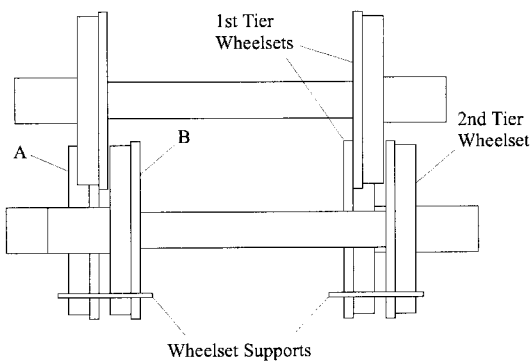
Figure 29  Front view of present loading arrangement. Flange of top wheel is sandwiched between wheel A's flange and wheel B.

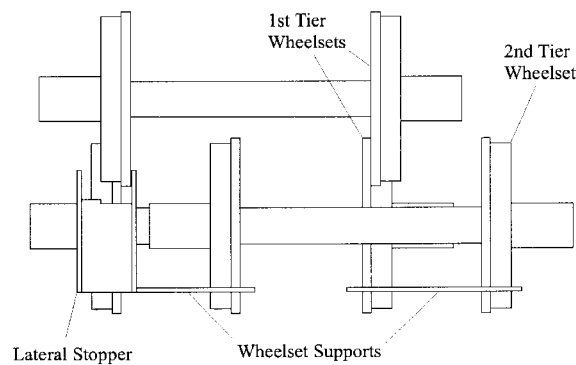
Figure 30  Front view of shifted loading arrangement. Top wheel sitting to the right of bottom wheel's flange.
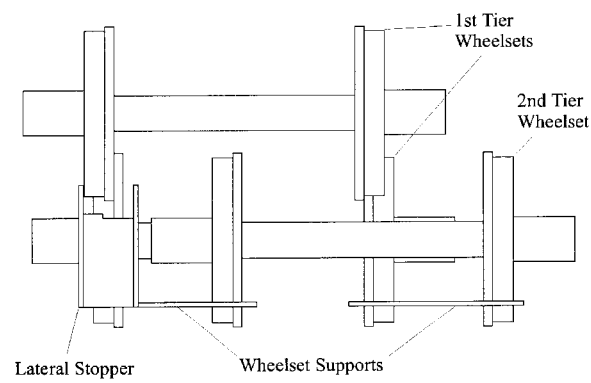
Figure 31  Front view of shifted loading arrangement. Top wheel sitting to the left of bottom wheel's flange.

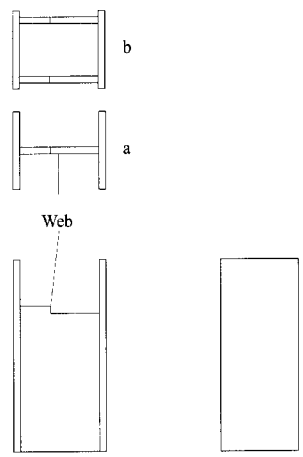
Figure 32  Lateral Stopper - the exact design of a lateral stopper depends on the wheel transporter itself, which vary within the railroad industry, since it would become a permanent part of the wheel transporter.

Restrain Each Wheelset

The main problem with the wheel transporters is that the wheelsets move and as a result their flanges contact adjacent roller bearings. One way to solve this is to prevent each wheelset from moving by restraining every wheelset. Tying down each wheelset would solve the problem, but this would be too labour intensive when loading or unloading. Another way is to build bulkheads or wheelset stoppers between each wheelset (see figures 33 to 35 and 51 to 54). The wheelset stoppers would be placed at a fixed and constant distance from one another. The axles have a contour that would cause single point contact between the axle and the wheelset stoppers. A protective wood or rubber lining may be placed on the faces of the wheelset stoppers, but a gap would remain since axles come in different sizes. An AAR impact test on such an arrangement would be required to see if an axle protector is needed to eliminate the gap between the wheel stopper and wheelset stopper. As a result of an impact, all the wheelsets would move in unison in one direction before the wheelset stopper stops their motion. The impact test would confirm whether or not the flange of a wheel actually makes contact with an adjacent roller bearing as the wheelset settles back into place after the impact. An axle protector would remove any gap between axle and the wheelset stoppers, thereby rendering the wheelset immobile. An axle protector would also distribute the single point contact (see figure 36) over a larger area. If the wheelset stopper did not have a protective lining and is made of metal, then an axle protector is required.

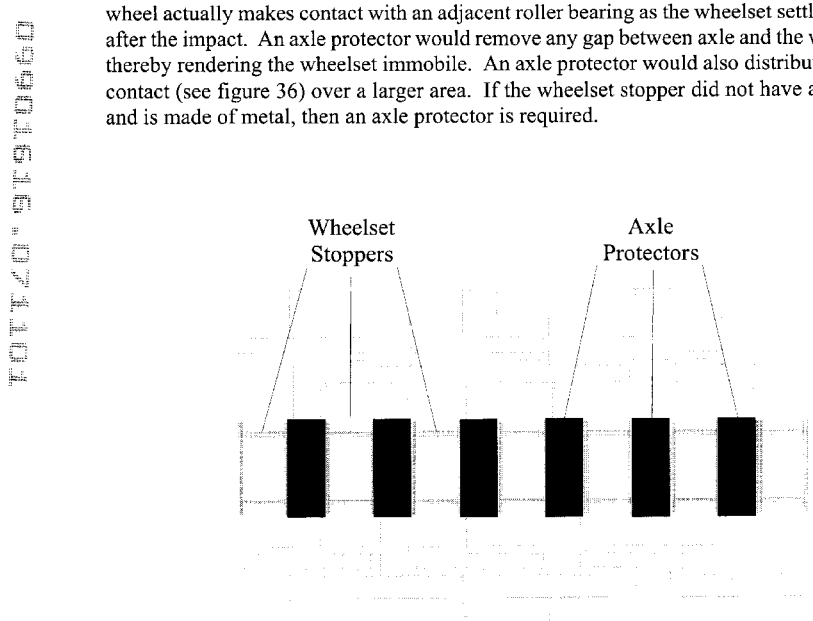

Figure 33 Top view. Wheelset fitted with proper sized axle protectors are immobilized between the wheelset stoppers. Size of axle protectors is large enough to eliminate any gaps between the wheelset axle and the wheelset stoppers.

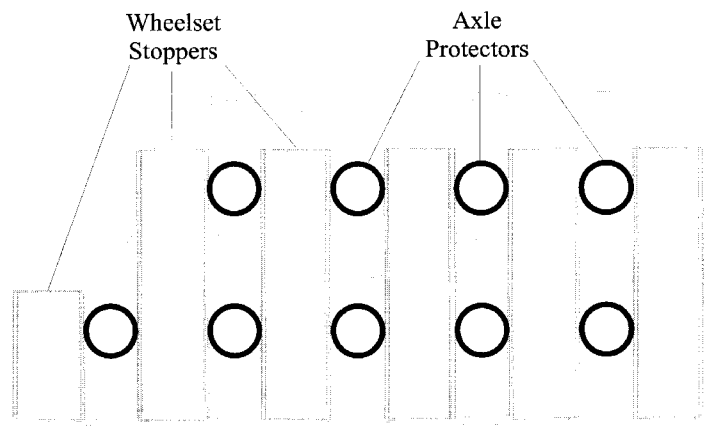
Figure 34 Side view. Wheelsets cannot move since they are slotted between the wheelset stoppers. Axle Protectors eliminates any gaps between axle and wheelset stoppers.
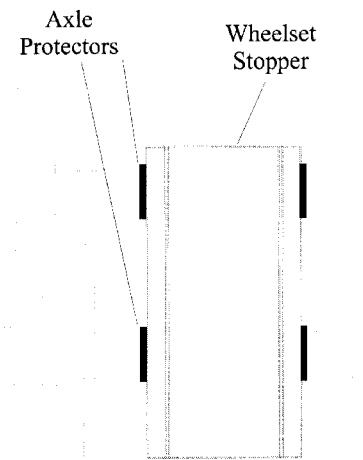
Figure 35 End view. Wheelset stoppers only sightly higher than axles of the second row. They could be extended to cover the whole axle.
47.

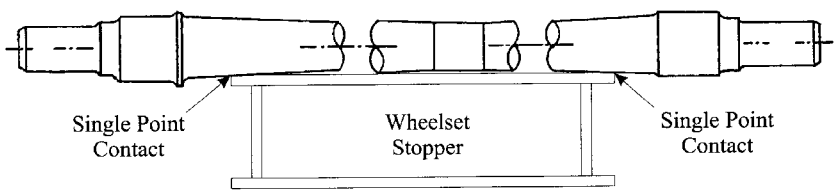

Figure 36 The profile of the axle will contact the wheelset stopper at two single points that could cause damage to the axle. An axle protector would be required to increase the contact area or the wheelset stopper could be lined with a protective lining (i.e. Wood, rubber....).

The wheel stoppers are permanent fixtures on the wheel transporter whose final design depends on the particular wheel transporter used. Figures 33, 34 and 35 show single stoppers along the center of the wheel transporter. Wheel stoppers could also come in pairs, one near each wheel of a wheelset (or even in triplets).

The wheelsets may also be restrained in place by inserting axle spacers between the axles of adjacent wheelsets, as shown in figures 37 and 38. The difference between a wheelset stopper and an axle spacer is that the wheelset stopper is attached to the wheel transporter while the axle spacer is separate from the transporter and must be placed after the wheelsets are loaded. The surface of the spacer that contacts the axle should be contoured to maximize contact area and avoid single point contact. If the material of the spacer is hard and could damage the steel axle then the spacer could be equipped with a protecting lining at the contact area. The spacer could be of a fixed shape or include mechanical links or devices that allow it to be extended or snapped into place between axles. In essence a spacer is a device that restrains the axles from moving closer together thereby preventing contact between roller bearing and adjacent wheel flange. Axle spacers could be inserted in both rows of wheelsets or just in the top row if a short wheel stopper is present for the bottom row. Since the axle spacer is inserted between the axles of adjacent wheelsets, two wheel stoppers are required at each end of the wheel transporter to secure the last wheelsets.

In essence an axle spacer is a device that restrains the axles from moving closer together thereby preventing contact between roller bearing and adjacent wheel flange. Although the wheel transporter problem is resolved, the storage issue still remains.

48.

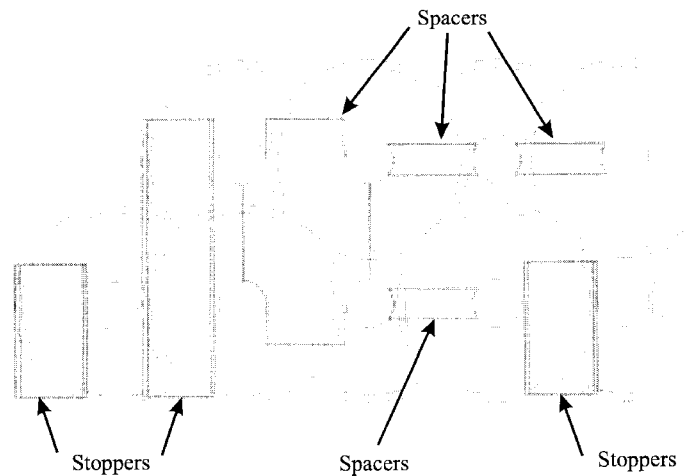

Figure 37 Examples of axle spacer arrangements. Wheelset stoppers could be used to restrain bottom row while spacers are used for top row.

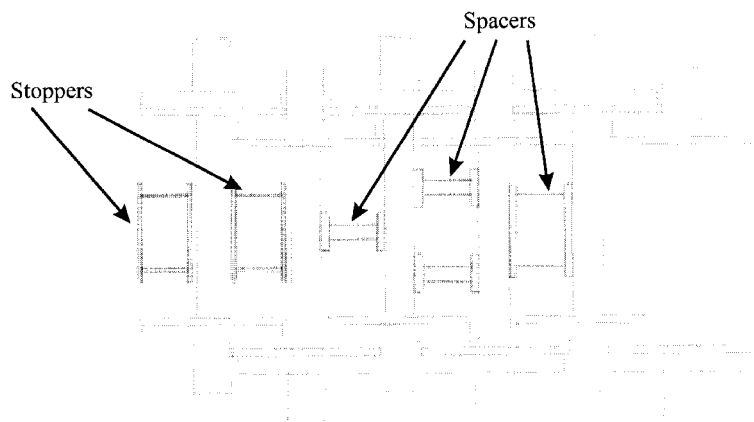

Figure 38 A single spacer centered could be used between a pair of adjacent axles to restrain the wheelsets. Using two spacers between pairs of adjacent axles increases stability. Increased stability could also be obtained if the spacer is wider as shown above.

49.

*Extra Cost for Minimum Risk Operation*

The following is an analysis of the extra costs that would be incurred if the railroads were to adopt a legal operation and not use any of the proposals. The CN operation is used as a basis for this analysis. The extra costs that railroads would incur if none of the proposals for the storage and movement of wheelsets are adopted will be realized from four different sources. Costs are in US dollars.

1. Increased trips required to move 55,000 wheelsets annually.
2. Modification costs for increased number of wheel transporters for extra trips.
3. Value of extra rail cars required for modification to wheel transporters.
4. Costs related to new roller bearing wheelset storage racks.

As of 1996, CN used 160 wheel transporters that carried 44 wheelsets maximum to transport 55,000 new or reconditioned wheelsets. Only 12 wheelsets maximum could be moved legally. Therefore, an extra 425 wheel transporters would be required to transport the 55,000 wheelsets. Shipping cost of $500 US was used. Modification and repair costs and the value of the extra cars required is estimated at $9,000 US and $5,000 US per car respectively.

|  | CN Design | Proposed Design |
| --- | --- | --- |
| Wheelsets per Trip | 12 | 44 |
| Extra Cars Required | 425 | — |
| Loaded Trips | 4,580 | 1,250 |
| Return Trips | 4,580 | 1,250 |
| Total Trips | 9,160 | 2,500 |
| Shipping Costs | $4,583,000 | $1,250,000 |
| Annual Extra Shipping Costs | $3,333,000 | — |
| Extra Cars Modification and Repair Costs | $3,825,000 | — |
| Extra Cars Value | $2,125,000 | — |

The fourth source of savings is only realized by using roller bearing or axle protectors for storage. The cost for building new wheelset storage racks across all of the CN system has not been determined. These new storage racks would also require much more space. The value of the extra space required was also not quantified.

The extra costs that CN would incur if they operated in a legal fashion and did not use one of the proposals is:

50.

1. Annual shipping $3,333,000
2. Modification & Repair Cost (one time) $3,825,000
3. Value of Extra Cars (one time) $2,125,000
4. New Storage Areas (one time - for proposal 2 only) Not Determined The next table show the extra costs that all seven major North American Railroads are expected to incur using the above analysis. The Route Miles Operated, Carloads and Freight Cars data was obtained from *RAILROAD FACTS - 1997 Edition* by the AAR. The Annual Wheelset Changeouts estimates were based on the number of freight cars that the individual railroads owned compared to CN or Union Pacific. Since winter affects the number of wheelset changeouts, CP was compared to CN and the United States railroads were compared to Union Pacific. The extra costs estimates for each railroad is based on their individual annual wheelset changeouts and using the CN costs as a base.

1996 RAILROAD STATS (SOURCE: RAILROAD FACTS - 1997 edition by AAR)

|  | BNSF | CSXT | CR | CN | CP | NS | UP |
|---|---|---|---|---|---|---|---|
| Route Miles Operated | 35,208 | 18,504 | 10,543 | 18,355 | 17,399 | 14,282 | 36,670 |
| Carloads | 5,863,518 | 4,139,185 | 2,600,155 | 2,197,680 | 1,865,300 | 3,474,011 | 6,341,319 |
| Freight Cars | 106,085 | 97,887 | 51,710 | 68,755 | 54,000 | 98,593 | 159,455 |
| Annual Wheelset Changeouts | 86,489 | 79,805 | 42,158 | 55,000 | 43,197 | 80,381 | 130,000 |
| Extra Costs (US Dollars) |  |  |  |  |  |  |  |
| Annual Shipping | 5,241,213 | 4,836,184 | 2,554,773 | 3,333,000 | 2,617,730 | 4,871,065 | 7,878,000 |
| Modification & Repair Costs | 6,014,893 | 5,550,077 | 2,931,896 | 3,825,000 | 3,004,145 | 5,590,106 | 9,040,909 |
| Value of Extra Cars | 3,341,607 | 3,083,376 | 1,628,831 | 2,125,000 | 1,668,970 | 3,105,614 | 5,022,727 |

*AAR Regulations*

Although the method used to transport and store freight wheelsets is clearly illegal, the regulatory bodies such as the AAR must review and update these regulations. All the pertinent AAR regulations concerning the transport and storage of freight roller bearing wheelsets should conform and complement one another.

The AAR Wheel and Axle Manual Rules 1J6 and 1J7 are broken when freight wheelsets are loaded as per AAR Open Top Loading Rules' figures 83 and 84 (pages 9 to 10) or as per figure 1 of RP-011-81 (page 15) in The Manuel of Standards and Recommended Practices A-II. This is because the wheel flange will make contact with the roller bearings of adjacent wheelsets when the transporter experiences jolts while in motion. An impact test would show that the wheelsets will roll.

Figure 1 of RP-011-81 does not conform with AAR Open Top Loading Rules' figures 83 and 84. RP-011-81 shows two rows of wheelsets, while the Open Top Loading Rules show only one.

The AAR Open Top Loading Rules should reflect procedures for loading both friction bearing and roller bearing wheelsets, the way the storage rules (figures 4.51 and 4.52 in AAR Wheel and Axle Manual G-II (pages 21 and 22)) differentiates between roller bearing and friction bearing storage. No distinction is made in the loading rules, which reflects friction bearing wheelsets. This is especially important since the use of rail cars equipped with friction bearing trucks was banned in interchange service in 1994. Also, all the railroads have been eliminating friction bearing rail cars or converting them to roller bearing. Today there are very few friction bearing rail cars.

The solutions presented within this report should be examined for inclusion in the AAR Open Top Loading Rules, to ensure proper protection of the roller bearings while in transit.

The two tier/several rows stacked storage method as is presently used by CN and using a roller bearing or axle protector should be evaluated for inclusion in the AAR Wheel and Axle Manual G-II. This would provide roller bearing protection when placing/removing new or reconditioned freight wheelsets to/from storage. This method allows for greater storage capacity and easier access to the wheelsets at line points that do not have an overhead crane and rely on forklifts.

53.

*Bulkhead on Wheel Transporter*

According to the CN General Operating Rules:

Section 6.5 MARSHALLING

Unless otherwise provided by special instructions, the following marshalling restrictions apply:

( c ) Open Top Equipment

.......

The following open top loads must not be handled next to the engine, or to other open top loads such as piggyback trailers, containers, motor vehicles, mobile homes, camper trailers, agricultural implements and other similar machinery:

(1) Timbers, poles, pipes, rails, rods and similar commodities loaded lengthwise on open top cars without end bulkheads or on open top trailers on flat car.

(2) *Open top loads of rail car wheel sets loaded on cars without end bulkheads.*

Picture yourself driving your car on the highway, when all of a sudden there is an accident up ahead and you slam on the brakes hard. The only thing keeping you and your passengers from hitting the steering wheel or windshield are the seat belts (if they are used). In a similar fashion, loads on rail cars must be held in place to prevent them from flying into the rail car or locomotive ahead of it. If the loads are inside box cars, gondolas or bulkhead flat cars that have walls at each end of the car, then above does not present a problem. The above instructions concern certain loads ( items (1) and (2) ) that are loaded on flat cars and may shift off the car. These shifted loads may cause damage to open top loads (piggyback trailers, containers.....) or a locomotive if they are moved adjacent to them.

The above rule is observed by separating the wheel transporter and the locomotive with a buffer car (box car, gondola....). During switching the locomotive would lose time getting a buffer car if it only needed to move a wheel transporter. Many times a busy locomotive crew would not bother with the buffer car during switching operations in a yard. The rule specifically requires a wall (as in a gondola car) or a bulkhead at each end of the car if a buffer car is not used. I imagine the concern is that a large jolt the may cause wheelsets to fly off the transporter and hit someone holding onto the locomotive.

54.

A chimney like bulkhead (Figure 39) with triangular gussets at the bottom for reinforcement was developed. The height of this bulkhead is high enough to ensure that it would stop a wheelset from the top row. Also, to be considered as a bulkhead, the structure should be at least six feet tall. Wheel transporter CN 49270 was modified with this bulkhead at both ends of the car (Figure 40) and tested. The bulkheads withstood the impact test. (Contact between flanges and roller bearings was not investigated. The video showed that the first wheelset hit the bulkhead during the impact test. The video also showed that when the first wheelset hit the bulkhead the flanges of all the wheels definitely hit adjacent bearings.) The tests also showed that upper row of wheels did not move and strike the bulkhead.

Field tests began after the impact test. Actual usage of the test car would reveal any problems during normal operations. One problem surfaced at the Transcona Shops in Winnipeg, Canada. An overhead crane loads and unloads wheelsets on or off wheel transporters. Due to its' height, the bulkhead interfered with the crane. To get to the closest wheelset to the bulkhead, the bulkhead would have to be moved farther away from the load. There is enough room to relocate the bulkhead at the handbrake end of the car (Figure 40) but it is already at the edge of the car at the opposite end.

CP Rail's General Operating Instructions states the following:

Section 4

SWITCHING AND MARSHALLING FREIGHT TRAINS 1.5 Unless protected by end bulkheads extending to the top of lading, an open top car, open trailer moving in piggyback service, or open container in the end position on container flat car, which is loaded lengthwise with pipe, timber, poles, metal rods, rail *or other similar lading which has a tendency to shift*, must not be handled next to a locomotive, occupied caboose, occupied service equipment car, or occupied passenger car.

Where less than 2 cars intervene between such cars and an occupied caboose, occupied service equipment car or occupied passenger car, such intervening car must be a full sized steel box car or bulkhead type car or car loaded with one or more containers, the ends of which extend above the load being protected against.

When two or more cars of any type are between a car with lading which has a tendency to shift and occupied equipment, no steel box, bulkhead or other protective car is required.

In addition, these cars should not, if it can be avoided, be marshalled next to any loaded multilevel car, car containing livestock or as the rear car on a train equipped with a Sense and Braking Unit (SBU).

55.

The main difference between CN's and CP's instructions is that CP's instructions emphasizes *"lading which has a tendency to shift"* in the first paragraph. The types of lading in item (1) of CN's instructions are listed in CP's instructions, but CP's instructions does not specify anything concerning wheel transporters requiring bulkheads. According to CP's instruction, if a load does not shift then a buffer car is not a requirement.

The video of the impact test of test car CN 49270 showed that the test bulkhead was strong enough to withstand the impact of the wheelsets. It also showed that the top row of wheelsets remained in place and did not strike the test bulkhead. If this can be repeated again then this shows a high bulkhead is not required to prevent shifting. All that is required is a short stopper and rewording CN's instructions to emphasize *"lading which has a tendency to shift"*. A rubber padding should be placed on the stopper to prevent any damage to the wheelset's axle from the steel on steel contact between the stopper and the axle.

Stoppers that come in contact with the wheels instead of the axle may be better. Similar stoppers are used at the end of rail tracks to stop cars from rolling off the track. A triangular arrangement similar to the Alcan aluminium ingot cars, about 30 inches high only in front of each wheel of the leading wheelset at each end of the car would be enough. To ensure that the wheelsets do not move due to an impact the gap between the stopper or bulkhead and the wheelset should be as small as possible, preferably eliminated.

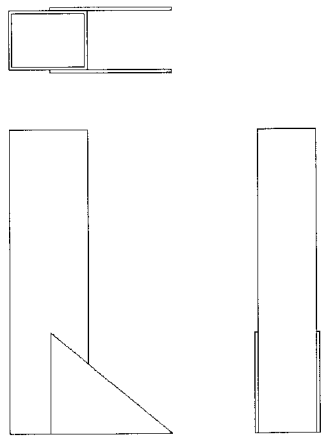

Figure 39   Original Test Bulkhead design on CN 049270.

56.

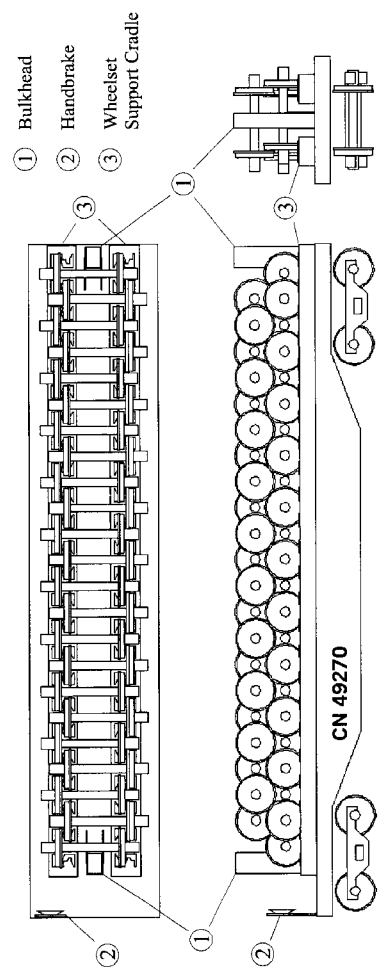
Figure 40 Normal loading arrangement with test bulkheads applied at both ends of wheel transporter CN 049270.

Wheel Transporter End Bracing Arrangement

Figure 41 illustrates the bracing arrangement used by CN wheel transporters. The steel clamps are applied on the axles half way between both wheels of the wheelsets.

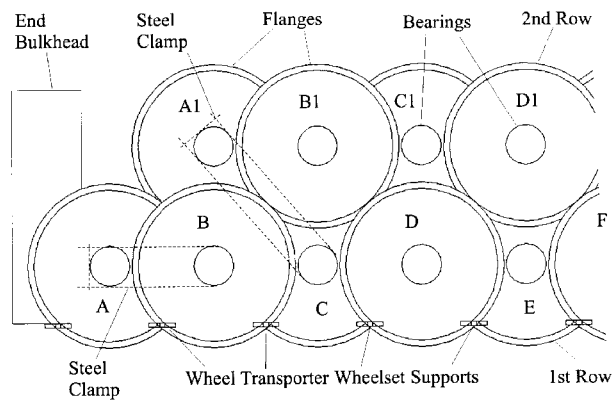

Figure 41 Present tie down arrangement on CN wheel transporters.

If the gap between the axle of wheelset A and the end bulkhead (or stopper as described in the report page 56) is removed, then the brace between wheelsets A and B would not be required. The removal of this gap with the use of wood shims or rubber spacers will also reduce the chance of damage to the axle of wheelset A.

If the axle of wheelset A1 is treated like a simply loaded beam as per the top diagram in figure 42, then a force F is exerted on one bearing and one wheel of wheelset A1 where wheelset B1 contacts A1. An opposing force, located where the steel clamp is attached to the axle of wheelset A1, equal to 2 times F prevents wheelset A1 from moving. The maximum moment experienced by the axle is $F \times L / 2$.

If two steel clamps were used on wheelset A1 instead of one as per the lower diagram in figure 42, then the maximum moment experienced by the axle is $F \times c$. This situation is better for the axle since the maximum moment has been decreased. The closer the steel clamps are placed to the wheels of wheelset A1 the smaller the maximum moment becomes.

58.

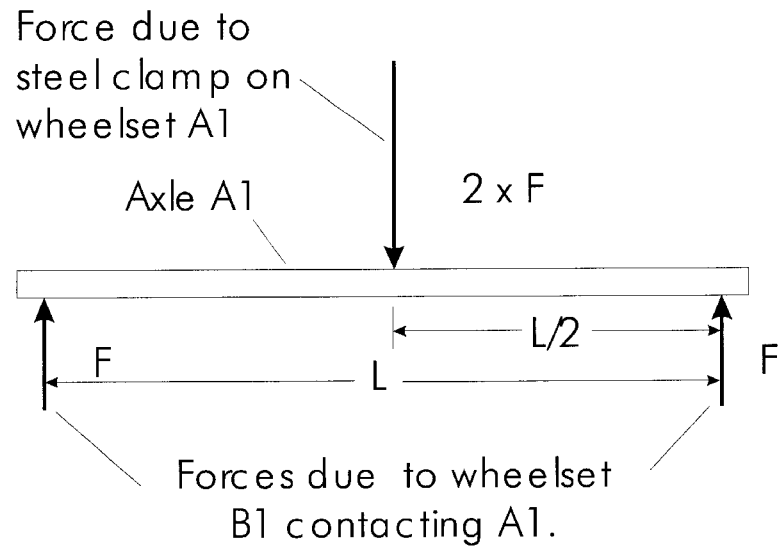
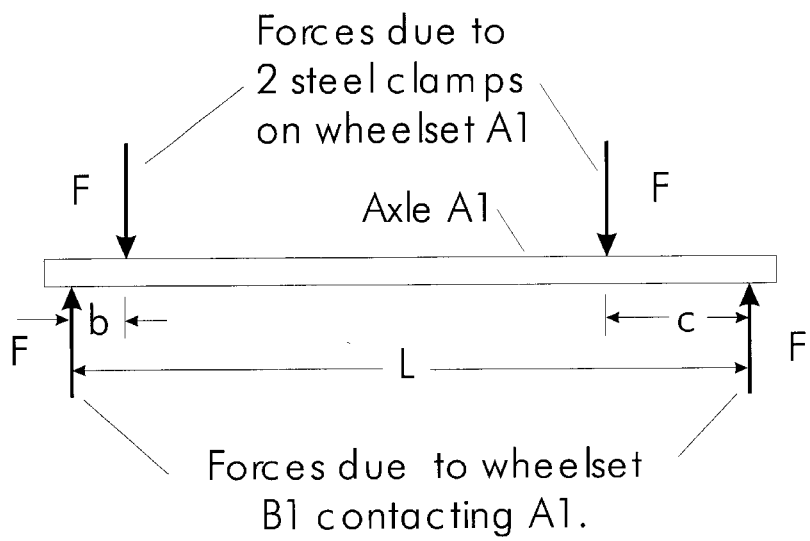
Figure 42 Upper diagram is force diagram of present situation involving one brace near the centre of the axle. The lower diagram is the force diagram for using two braces on the axle and closer to each wheel.
59.

Presently when the steel clamps are applied to the axle there is steel on steel contact. A ½ inch rubber or plastic separator placed between the steel clamp and the axle may offer further protection to the axle. This separator could be permanently fixed to the clamp.

Although the above are rough and not exact, it does show that the method used to brace the end wheelsets at CN should be reevaluated since improvements can be made that will better protect the tied down wheelsets at both ends of the wheel transporters as they are moved. It will reduce the chances of damage to the axle. The end bracing of every railroad's wheel transporter should be examined to evaluate the best method to tie down the end wheelsets.

60.

*Alternatives*

The following are possible alternatives that will rectify the present situation and rule contradictions for the storage and movement of roller bearing wheelsets.

1. Change rules 1J6 and 1J7 so that wheel flanges may contact adjacent roller bearings and wheelsets are allowed to roll. Show a second row in the loading arrangements in the AAR Open Top Loading Rules - Section 2 figures 83 and 84. Include a double tier stacked storage arrangement in the AAR Wheel and Axle Manual G-II. These changes would legitimize present loading arrangement on storage racks and wheel transporters. These changes would also allow a situation where the roller bearings may be damaged during transport and storage to continue.

2. Abide with rules 1J6 and 1J7 and do nothing. The number of wheelsets that present wheel transporters (using RP-011-81) may carry is only 27% of the maximum number of wheelsets per carload, therefore, more wheel transporters would be required to move the same number of wheelsets per year. Wheelsets may not be stacked in the present storage racks. Also, the wheelsets could only be stored in single file. New storage racks that conform to the present rules would be required. This would also require extra land space. This is important to CN and CP since wheelsets must be accumulated for the winter when good order wheelsets are in high demand.

3. Restrain all wheelsets from moving on the wheel transporter by tying each wheelset down, by applying wheelset stoppers or axle spacers between each wheelset. If a wheelset stopper is used then an axle protector or protective lining on the wheelset stoppers is required to prevent single point contact between the axle and the wheelset stopper. Storage problem still exists if axle protector is not used.

4. Redesign the wheel transporter with wheelsets shifted laterally so that roller bearings and adjacent wheel flanges are not in line and cannot contact each other. The new design should include bulkheads or stoppers at each end. Axle protectors are applied to the axle of each wheelset to protect the axle from contact from the adjacent wheel flanges. The number of wheelsets that a wheel transporter (using RP-011-81but shifted tiers) is maximized.

5. Keep the present wheel transporters in RP-011-81 and storage racks. Apply roller bearing protectors and/or axle protectors directly on the wheelsets so the wheel flange does not come in contact with the roller bearing and/or axle. The shock from the wheel flange is mainly absorbed by the protecting material. This protection may take the form from a simple block squeezed between adjacent wheel flange and roller bearing/axle to protective cap or collar applied to all roller bearings/axles. Both transporter and storage problem is resolved.

6. Use both new wheel transporter design (items 3 or 4 above) with roller bearing protector (item 5 above). Both transporter and storage problem is resolved.

61.

Summing Up

Why is a bulkhead required at each end of a wheel transporter? To prevent the first wheelset at each end of the bottom row of wheelsets from moving forward.

Why are the brackets that bind the three last wheelsets at each end of a fully loaded wheel transporter required? To prevent the last wheelset at each end of the top row from flying off the wheel transporter after it receives a jolt.

Will CN discontinue using the brackets, remove the bulkheads and allow a fully loaded wheel transporter to move across Canada without these restraints? Definitely not.

What stops the wheelsets located in the middle of the top and bottom row from moving forward after the wheel transporter receives a jolt? The roller bearings of an adjacent wheelset being struck by the moving wheelset's wheel flange.

The design of the present wheel transporters is such that the roller bearings act as stoppers. This clearly violates rules 1J6 and 1J7 (Section 1) of the AAR Wheel and Axle Manual, which is there to ensure that the new or reconditioned roller bearings of a wheelset are not damaged while in transit on a wheel transporter. Also the design of the present storage racks do not protect the roller bearings as wheelsets are placed or removed from storage by forklifts or overhead cranes. In the same way that the HIV virus is detected months or years after it has been contracted, a slightly damaged roller bearing of a new wheelset may not be detected when the wheelset is placed under a rail car. A slightly damaged roller bearing will be detected after the damage worsens through thousands of miles of use and later develops into a hot box. If it is not detected at that point, it will be discovered after the investigation into the cause of the derailment is complete.

The argument that disaster due to hot boxes is extremely unlikely may not be used. On November 10, 1979, a train derailed and a quarter of a million people from Mississauga, Ontario were evacuated for fear that poisonous gas may be released in the air. The cause was a burnt out journal or hot box. Leaked poisonous gas kills. The 3,000 people killed when toxic gas leaked from a Union Carbide plant in Bhopal, India in 1984 cannot be dismissed. To avoid harm to the public is the reason why evacuations took place at Mississauga, Ontario (derailment November 1979), Oakville, Manitoba (derailment December 1992) and London, Ontario (derailment August 1996). Also, the chance that Mr. John Doe would die in the manner that he did (see first chapter) was quite remote. The wheel transporter and storage problem must not be overlooked.

After 20 years of incident free operation, no one knew that a problem existed until Mr. Doe's death. Unlike this incident, the problem that exists with the transport and storage of freight roller bearing wheelsets is not unknown.

THE CONCEPT

The present wheel transporters and double tier high stacked storage method violate AAR rules 1J6 and 1J7 from section 1 of the AAR Wheel & Axle Manual. The roller bearings of wheelsets are presently in line with adjacent wheel flanges while in storage or on wheel transporters. An impact on a loaded wheel transporter or human error while stacking good wheelsets on the storage racks will cause wheel flanges to hit adjacent roller bearings (which is prohibited by the AAR rules). As a result, present practice of loading a wheel transporter with two rows and two interlocking tiers on the wheel transporter and similar style of loading in RP-011-81 storage racks is illegal. Such wheel transporters may legally carry only 27% of the wheelsets per carload actually shown in RP-011-81. The Concept solves this problem and will legalize two rows and two interlocking tiers of wheelsets on a wheel transporter. The Concept is composed of the following alternatives:

1. Applying a roller bearing protector to protect the roller bearing from being hit by an adjacent wheel flange. The roller bearings remain in line with adjacent wheel flanges on the wheel transporters and storage racks.

2. Applying a axle protector to protect the roller bearing from being hit by an adjacent wheel flange. The roller bearings remain in line with adjacent wheel flanges on the wheel transporters and storage racks.

3. Shifting the wheelsets of each tier laterally on the wheel transporters so that roller bearings are not in line with adjacent wheel flanges. Some type of lateral stopper is required to allow a second row of wheelsets on top of the first row. An axle protector on each wheelset is required to protect the axle from being hit from an adjacent wheel flange.

4. Restraining each wheelset from moving by tying every wheelset down or by using wheelset stoppers or axle spacers between each wheelset. A protective lining should cover the faces of the wheelset stoppers to prevent direct contact with the axles. An axle protector applied to the wheelsets, instead of the lining, would prevent direct contact and also remove any gaps between the axle and the wheelset stoppers. The storage problem still remains if the stacked double tier system is used.

The Concept is applicable for the movement of wheelsets by rail car, container or by truck (solution 3 may not be possible on a trailer if the width of the trailer is not large enough). The railroads, wheelshops and wheelset suppliers may use solution 1, 2, 3 or 4 of the concept on wheel transporters and solution 1 and 2 for the storage of wheelsets. The AAR may include any of these solutions in their regulations. The railroads, wheelshops, wheelset suppliers and regulatory bodies must recognize Joseph Porto as intellectual owner of these solutions and all the different design variations based on these solutions. Use of The Concept by the railroads, wheelset suppliers and regulatory bodies is permitted only after express written permission is obtained from Joseph Porto. These solutions are the basis for the final design that requires input from both the regulatory bodies and the railroads for completions. Details of the railroads wheel transporters and storage systems is required for final engineering and design. Final design of all parts (i.e. Lateral support, wheelset

63.

stoppers) described in the above solutions may vary depending on rail car used for wheel transporter and manufacturing process (i.e. Roller bearing, axle protector and axle spacers).

Lateral Stoppers are defined as an item that prevents wheelsets on the top (or second) row from moving laterally and falling off the first row of wheelsets.

Roller Bearing Protectors are defined as any item that is between roller bearings and adjacent wheelset flanges to prevent direct contact between them.

Axle Protectors are defined as any item that is between the axles and wheel flanges/wheelset stoppers to prevent direct contact between them.

Wheelset Stoppers are defined as permanent barriers on the wheel transporters that prevent the wheelsets from moving relative to one another and touching each other.

Axle Spacers are defined as separators placed between adjacent axles after the wheelset are loaded on wheel transporters that prevent the wheelsets from moving relative to one another and touching each other. They are not a fixed and permanent part of the wheel transporter.

The Transportation Safety Board of Canada Report

The following is an excerpt from *A Special Study Of Main Track Derailments - Report Number SR9401* by The Transportation Safety Board of Canada. This excerpt reflects the seriousness which the Canadian agency for safety on railroads puts on derailments caused by hot boxes or roller bearing failures. It also lists several major derailments that occurred as a direct result of roller bearing failures. The report does not look at the storage and transport of new or reconditioned wheelsets and the failure to conform to AAR rules 1J6 and 1J7. It focuses on detection of hot boxes and not on the prevention of hot boxes since it is assumed that wheelsets are being handle as per AAR guidelines. The terms HBD refers to Hot Box Detectors.

4.3.2 Roller Bearing Failures

As a result of the internationally publicized 1979 Mississauga derailment, there was considerable emphasis on the replacement of friction bearings with roller bearings on the Canadian railway fleet and on increasing the number of HBDs. As discussed in Chapter 3, the effect of this change was a reduced main track derailment rate. There are now very few friction bearings causing main track derailments in Canada because there are relatively few in the revenue car fleet.

However, at the time of the CTC hearings following Mississauga, the CTC expressed concern that "... at least a possibility exists that a hot box detector program based on spacings of 25 to 30 miles may be inadequate to detect overheating of roller bearings." This concern remains valid today as roller bearings, once in distress, can overheat and fail in much less than the standard HBD spacing[8].

HBDs measure the absolute bearing temperature, the relative temperature differential between the bearings on either end of an axle, and the average temperature on both sides of a car and the train. A differential above a specified value requires that the train be stopped and the suspect bearings be inspected. If the inspection reveals a hot bearing, the car is set out for repair and the train continues. This detection system and its spacing were designed for detecting failing friction bearings which take a relatively long distance to fail once they become overheated.

In 1992, the TSB recommended that the spacing of HBD devices be reviewed, and that the criteria for the temperature differential be reduced. The TSB also recommended that the development of new technologies be supported to improve the sensitivity in detecting roller bearings in distress. It was further recommended that more use be made of the information given by the changes in temperature differentials over time. In other words, rather than relying on one simple criterion, decisions should be based on all available information on bearing performance.

65.

TC responded that, in conjunction with the AAR, it was then undertaking a review of the criteria for the HBD spacing and the temperature differential for stopping trains. In addition, CN now monitors data from the Journal Advance Warning System (JAWS) to identify when the same bearing on a car records a high temperature differential at more than one HBD, where that differential was insufficient to require the car to be inspected immediately. Such suspect cars are then left at a convenient yard for bearing inspection.

Safety deficiencies regarding HBDs have been identified by both the NTA and the TSB. However, in 1993, there were at least six main track derailments in Canada caused by burnt-off journals which were not previously detected by HBDs prior to the point of derailment.

The cost of adding a sufficient number of HBDs to the system to ensure that no failing roller bearing would go undetected would require a significant investment. There are, however, ways to detect potential roller bearing failures other than by heat differentials. Research and development including field testing has been underway for about five years on acoustic wayside detectors which can evaluate the condition of roller bearings in distress that are not to the point of overheating. Similarly, testing has been carried out on what is referred to as a "Smart Bolt" which detects overheating and radios the defect notification to the locomotive cab. Neither system is ready for full-scale installation; in fact, recent research casts doubt of the potential of the acoustic system, and some industry representatives see little benefit in further pursuing the option.

The effectiveness of HBD systems has also been compromised by human error (e.g. HBD remote operator error, improper identification of suspected overheated bearings by train crew). Following a 1989 occurrence in which a train continued on after two detectors revealed high readings to the HBD operator, the NTA recommended to TC that CN be required to improve its response management with respect to HBDs. In 1993, the following occurrences reveal similar human performance problems. Specifically, they indicate failure in communication, interpretation, and follow-up action.

On 07 February 1993, a CP freight train derailed six cars near Tempest, Alberta, as a result of a burnt-off journal on the 16th car behind the engine. A HBD (with radio notification capabilities) registered an alarm which would have prevented the derailment; however, the detector's broadcasting ability had been disabled by a technician who had mistakenly left the audio transmit switch in the off position. This error was compounded by the fact that 17 trains had passed the detector in the interim and only three of those crews had reported an audio failure.

On 15 February 1993, a CP freight train derailed one car near White River, Ontario. The car was an empty boxcar with severely skidded wheels. The train had been stopped by a prior hot box and hot wheel detector because of sticking brakes on that car. A crew member cut out the air brakes on the car but failed to make a pull-by inspection as required by company instructions; thus, he did not realize that the wheels were not turning. The railway has issued instructions requiring that in response to hot wheel alarms the suspect car wheels must be seen to move properly before the train proceeds.

On 15 April 1993, a CN freight train derailed one car near International Boundary, Manitoba. The train was stopped after a HBD indication but the burnt-off journal dropped. An alarm had been

66.

received from the previous HBD (49 miles before) but inspection by the crew did not identify a hot bearing.

On 03 August 1990, a train derailed as a result of a failed roller bearing causing axle burn-off. The hot box and dragging equipment detector indicated an abnormally high reading on the 43rd car from the head-end of the train. The train was operating with a caboose, and the conductor calculated the position of the car from the tail-end by using the train journal. The conductor inspected the calculated car plus three cars on either side as per company instructions. The inspection revealed no abnormalities. Before the train left Calder Yard, four cars had been added to the train consist but were not indicated on the conductor's train journal. Therefore, by counting from the tail-end, the wrong cars were inspected.

Such human performance failures are fundamentally similar to human factors in many other aspects of the rail transportation system. The root causes of these failures are not well understood in this context, although there is a growing body of work on this subject in many other fields. Since human factors play a large role in operations-related derailments, this question will be addressed more fully in Section 4.4. It is, however, important to note that human factors can lead to accidents even when automatic detection systems are in use and working properly.

[8] HBD spacing is 20 miles in census metropolitan are as.

*Photos*
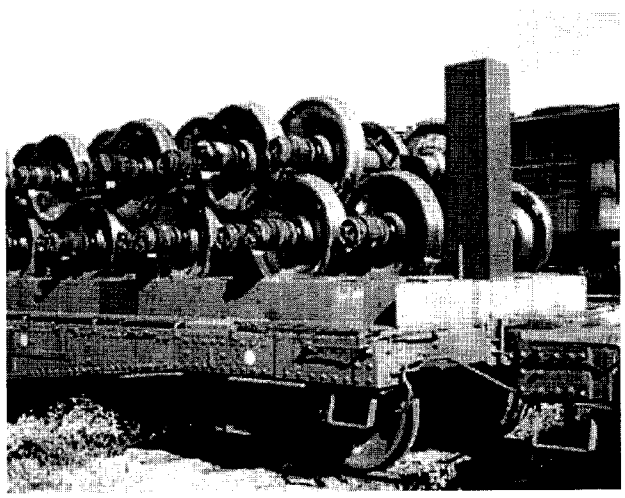
Figure 43 Roller bearing wheelsets loaded on wheel transporter. Wheel flanges are in line with adjacent roller bearings.
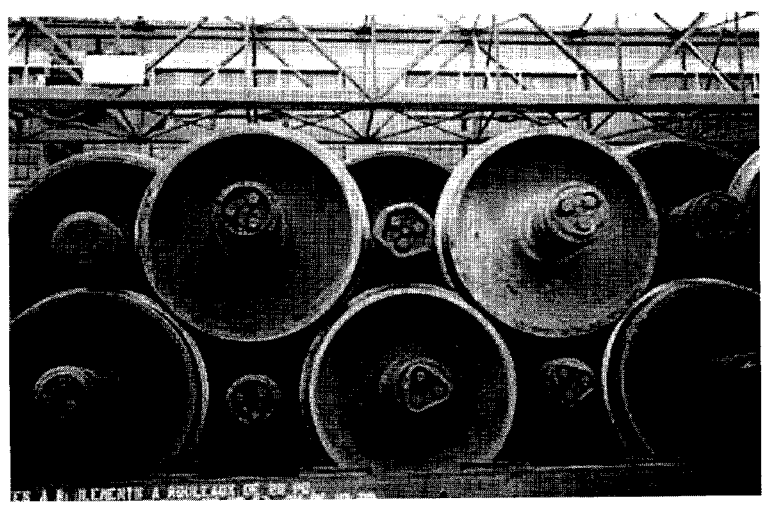
Figure 44 Wheel transporters loaded with 100 ton wheelsets with 36" wheels have very little space between wheel flange and adjacent roller bearing. Extreme care is required during loading to avoid contact.

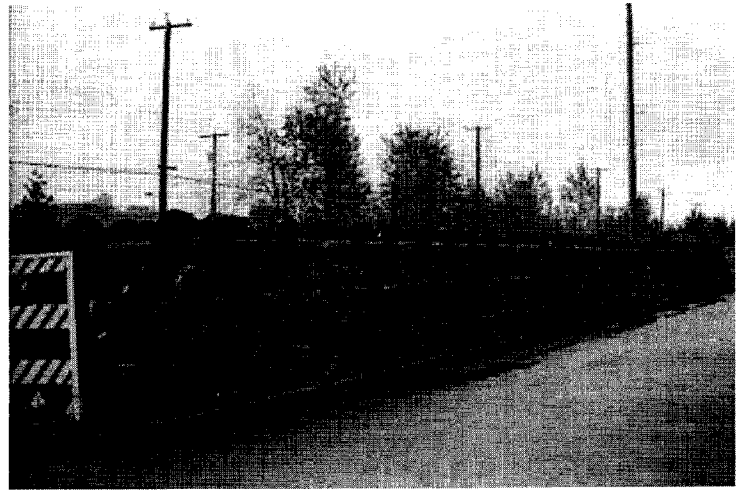
Figure 45 Wheelset storage area using non approved storage method for their roller bearing wheelsets. Wheel flanges are in line with roller bearings.
Figure 46 Wheelset storage using nonapproved storage of roller bearing wheelsets. Wheel flanges may contact adjacent roller bearings while placing or removing with a forklift.
69.

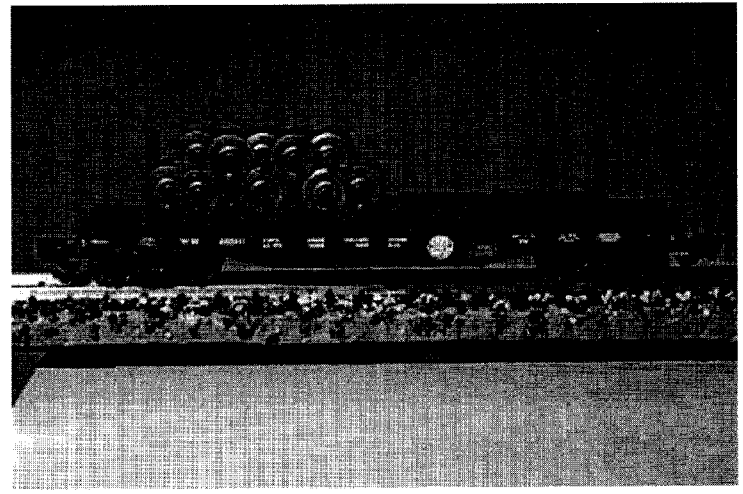
Figure 47  Loading arrangement used by North American railroads.
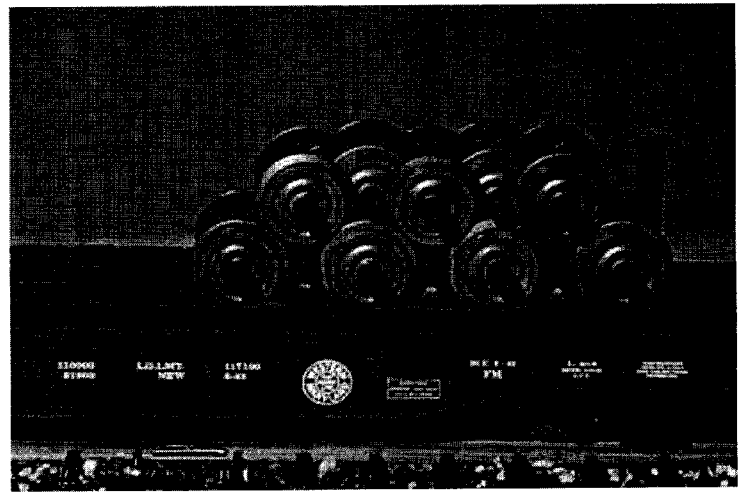
Figure 48  Loading arrangement used by North American railroads.

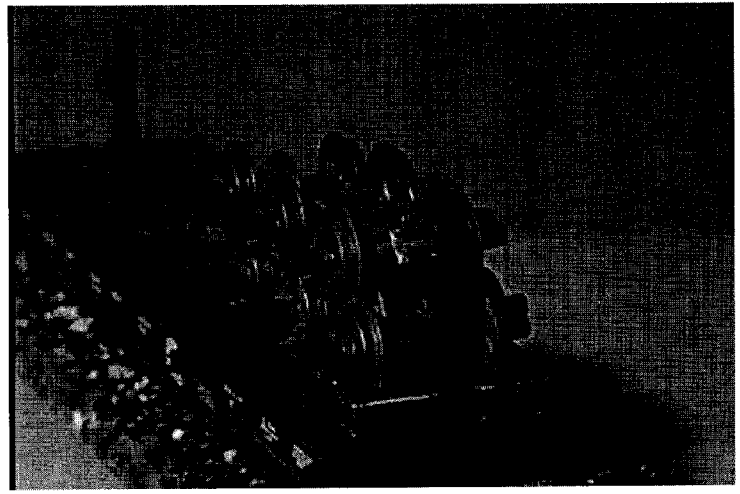
Figure 49 Loading arrangement used by North American railroads. Wheel flanges in line with adjacent roller bearings. Both end tie down steel clamps and bulkhead at one end shown above, as used by CN Rail.
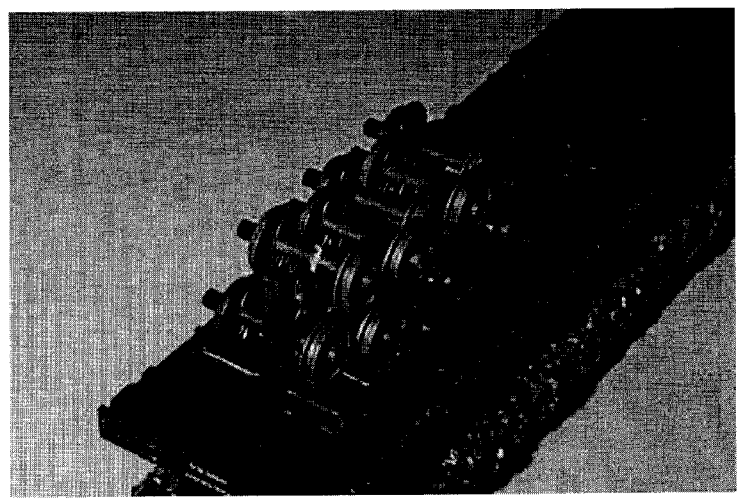
Figure 50 Loading arrangement used by North American railroads. Wheel flanges in line with adjacent roller bearings.

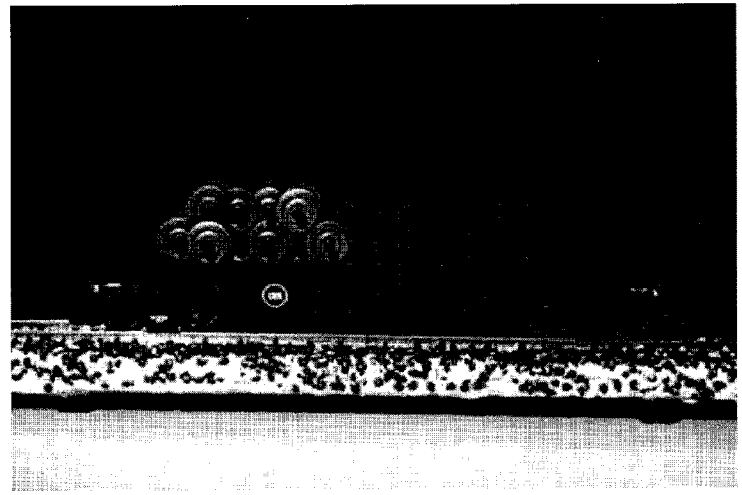
Figure 51 Wheel transporter equipped with wheelset stoppers that prevent any wheel movement. Therefore, contact between wheel flanges and adjacent roller bearings is prevented.
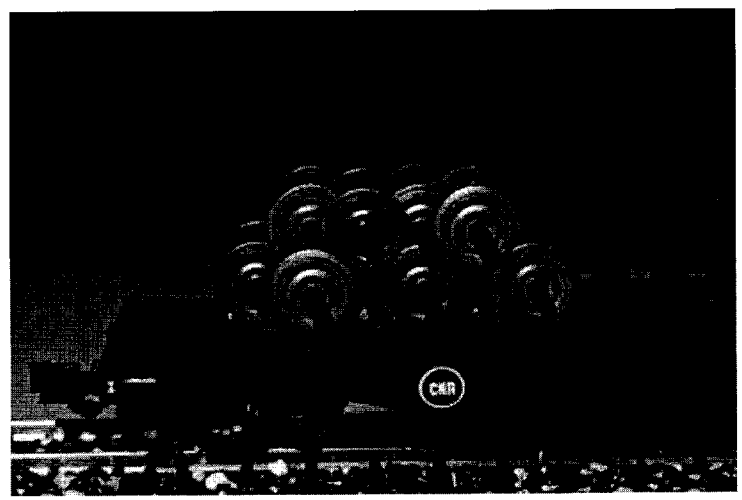
Figure 52 Tying down each wheelset is labour intensive. Permanent wheelset stoppers act as slots where wheelsets are properly positioned with no extra labour requirement.

Figure 53 Axle protectors for the axles are required to prevent single point contact with the axle and the wheelset stoppers. Protector also prevents movement by removing any gaps between axle and wheelset stoppers.

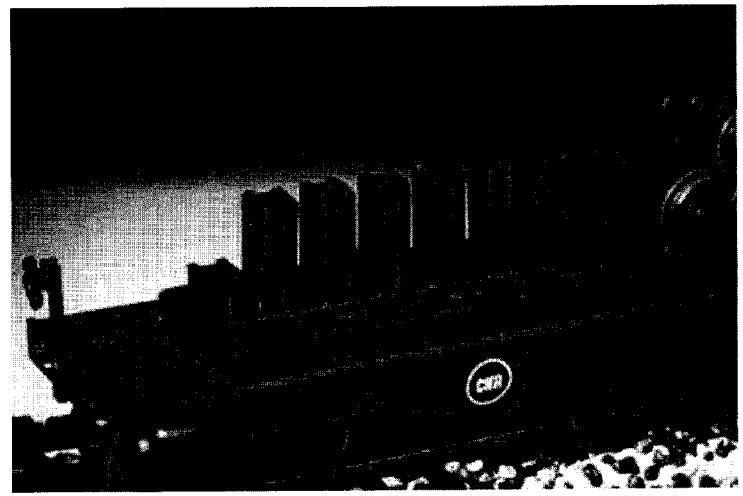

Figure 54 Instead of using axle protectors, protective linings may be applied to the wheelset stoppers. Not all the gap between the axle and the wheelset stopper is removed due to differences in axle sizes.

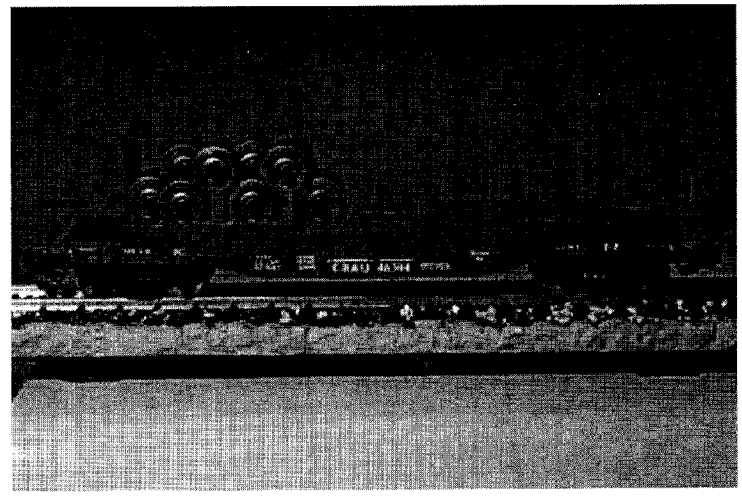
Figure 55  New wheel transporter design with shifted wheelset tiers.
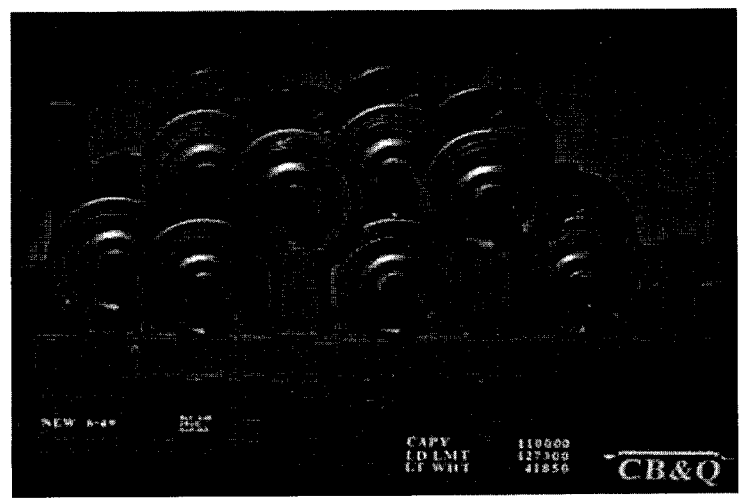
Figure 56  New wheel transporter design with shifted wheelset tiers. Top row of wheelsets prevented from moving laterally by lateral stoppers.

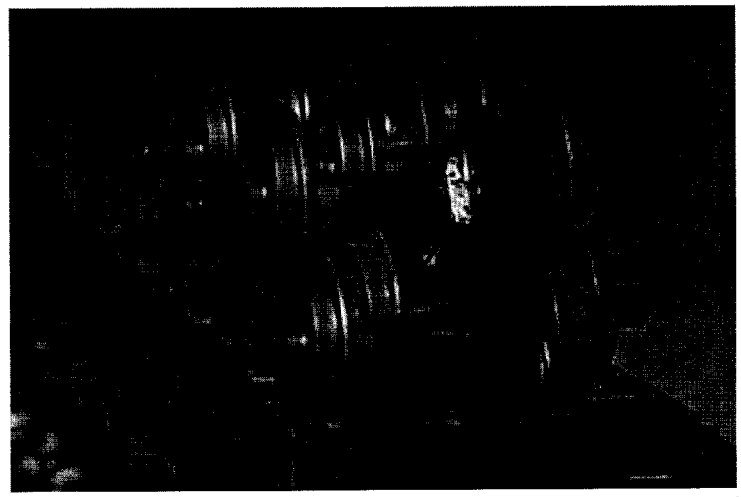

Figure 57 New wheel transporter design with shifted wheelset tiers. Tie down steel clamps at ends would still be required, but arrangement may differ. Since bulkhead is not at center of the first wheelset, then a wheel stopper may be required on left side above.

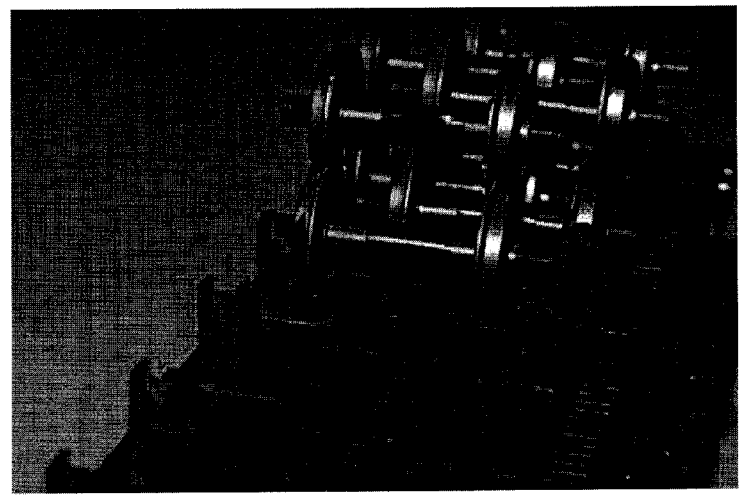

Figure 58 New wheel transporter design with shifted wheelset tiers. Axle protectors are required to prevent contact between wheel flanges and adjacent axles. Wheel flanges are not in line with roller bearings anymore.

75.

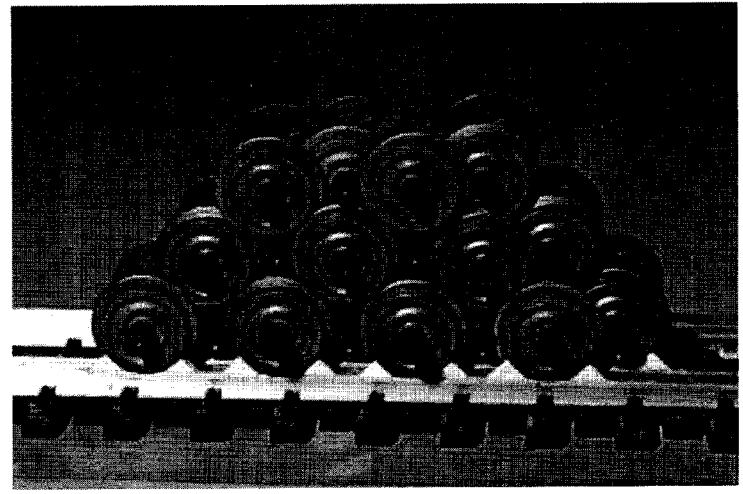
Figure 59 Present method of stacked roller bearing wheelset storage used by North American railroads.
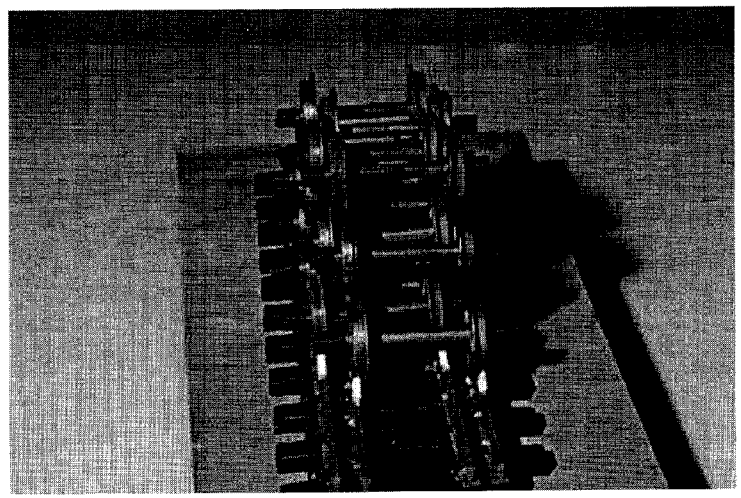
Figure 60 Present method of stacked roller bearing wheelset storage used by North American railroads. Wheel flanges are in line with adjacent roller bearings. This is an approved method for friction bearing wheelsets, but not for roller bearing wheelsets.

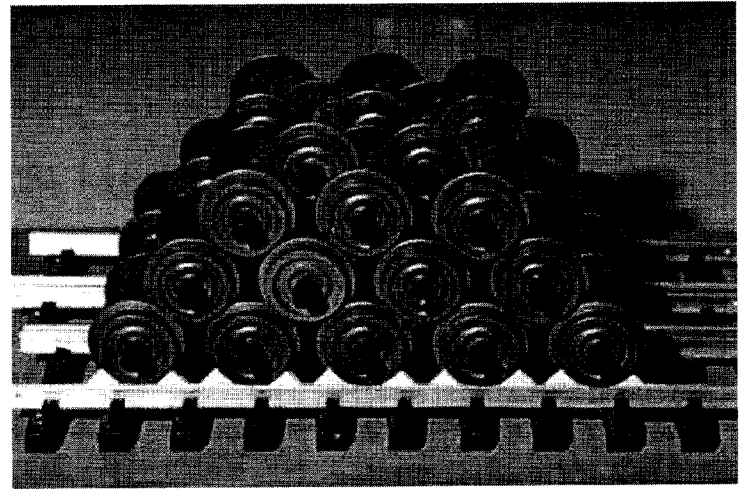
Figure 61 Approved method of storing and stacking roller bearing wheelsets, but not used by North American railroads.
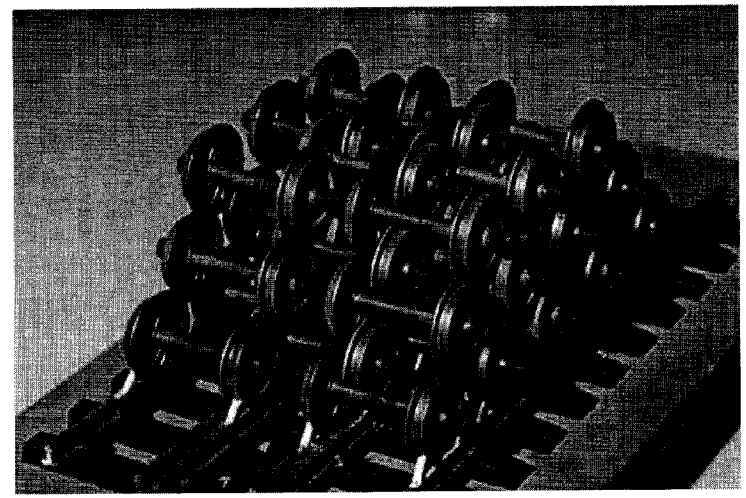
Figure 62 Approved method of storing and stacking roller bearing wheelset since wheel flanges are not in line with adjacent roller bearings. Easy to load and unload with overhead crane, but not with forklift.

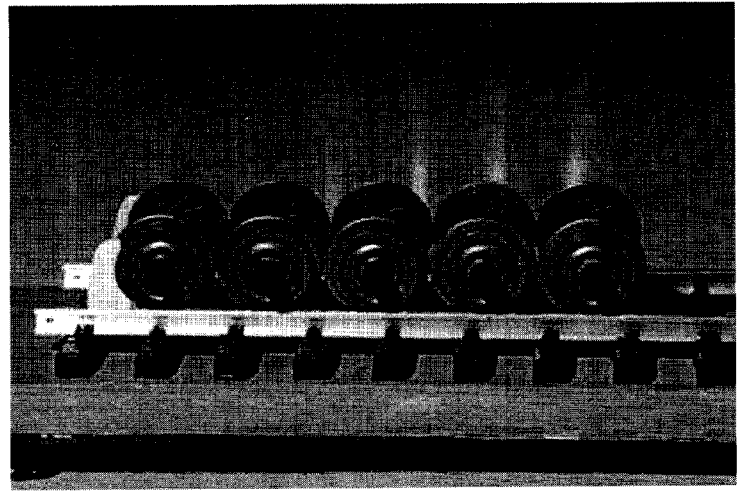
Figure 63 Approved method of storing roller bearing wheelsets. Wheelsets are not stacked and only in a single tier.
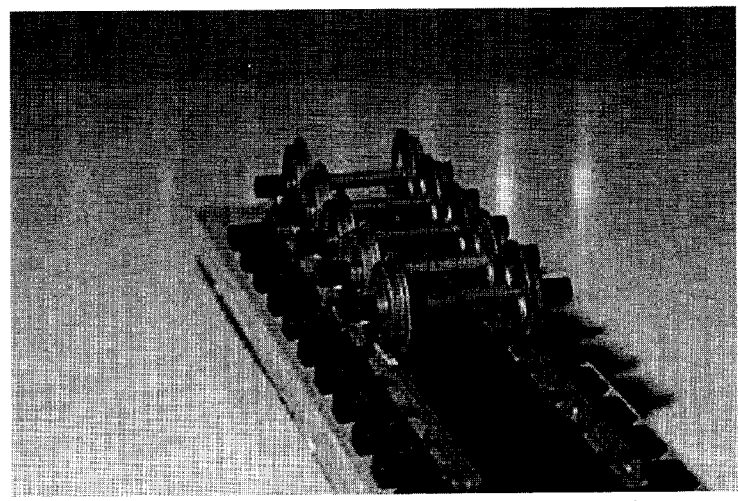
Figure 64 Approved method of storing roller bearing wheelsets. This method would require more storage space at major line points.

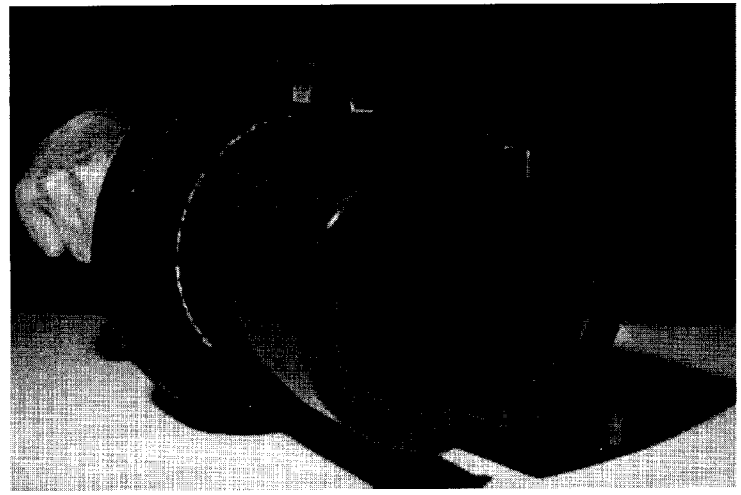

Figure 65 Roller bearing protector. Red portion represents a hard protective shell and the black portion is a softer energy absorbing material (i.e. rubber).

Figure 66 The above consists of two halves that are placed on a roller bearing and held in place by an appropriate fastening method (i.e. straps, tape or clips). The protector may also be a single whole unit that is slipped on (see figures 68 to 70 and 73 to 74).

Figure 67 Interior of the above protector has an energy absorbing lining (i.e. rubber).
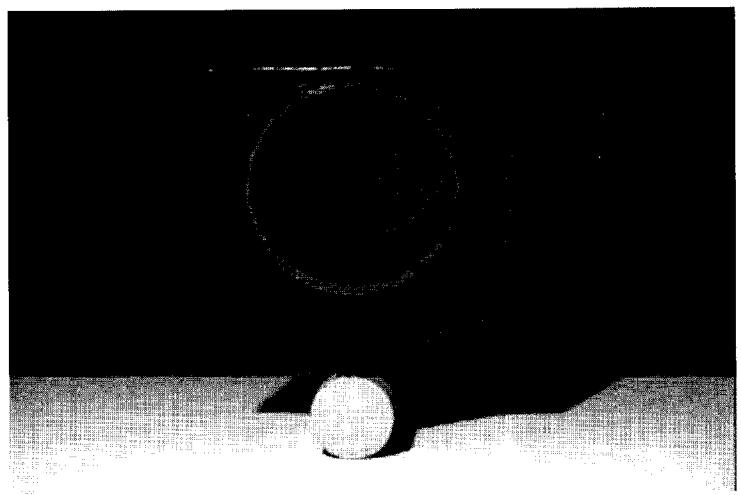
Figure 68 Single unit protector that is self positioning. Red portion represents a hard protective shell, black is a softer energy absorbing material (i.e. Rubber) and grey is a weight for self positioning.

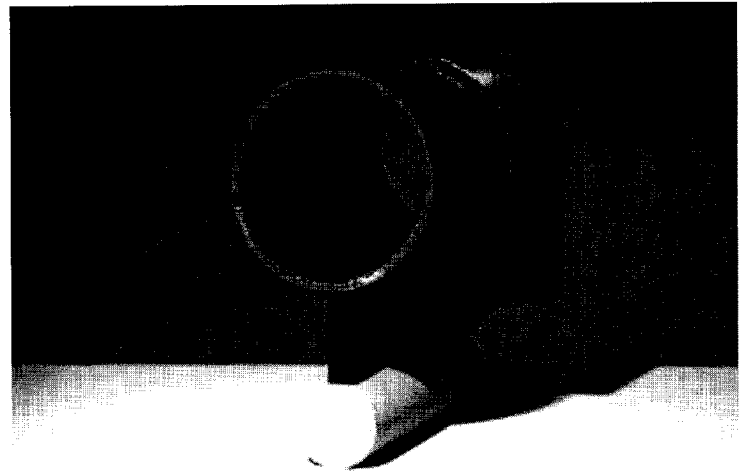
Figure 69 This roller bearing protector is a single unit that is slipped onto the roller bearing. It could also be designed as two halves like the previous roller bearing protector.
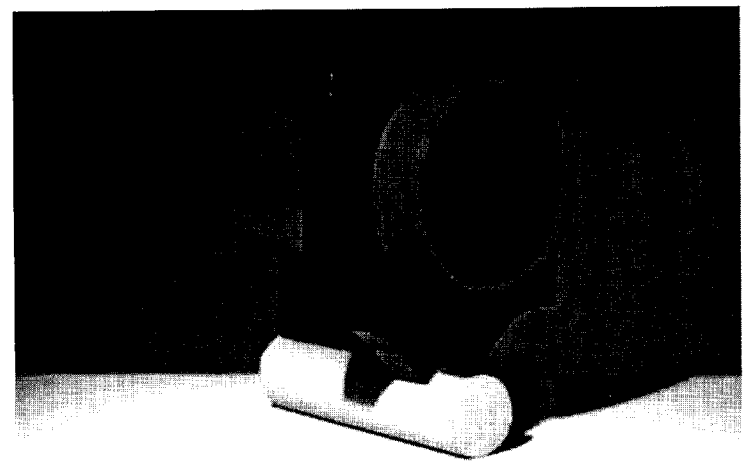
Figure 70 Self positioning roller bearing protector.

Figure 71 In the previous examples of roller bearing protectors, the hard red protective shell was on the exterior. This shell may be sandwiched between two energy absorbing linings and completely on the interior.

Figure 72 Roller bearing protector may consist of a simple ring made of some energy absorbing material. This ring would have to be properly positioned on the roller bearing so that it is in contact with the tread of an adjacent wheelset.

82.

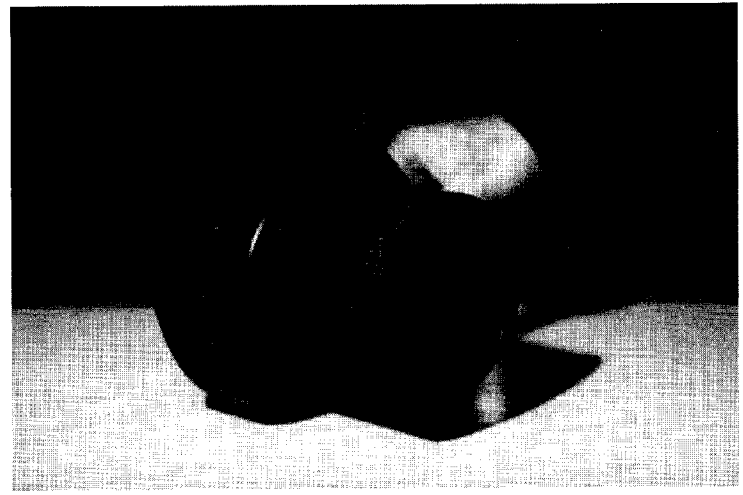
Figure 73 Roller bearing protector that has no protective hard shell. It is made of a energy absorbing material only (i.e. rubber).
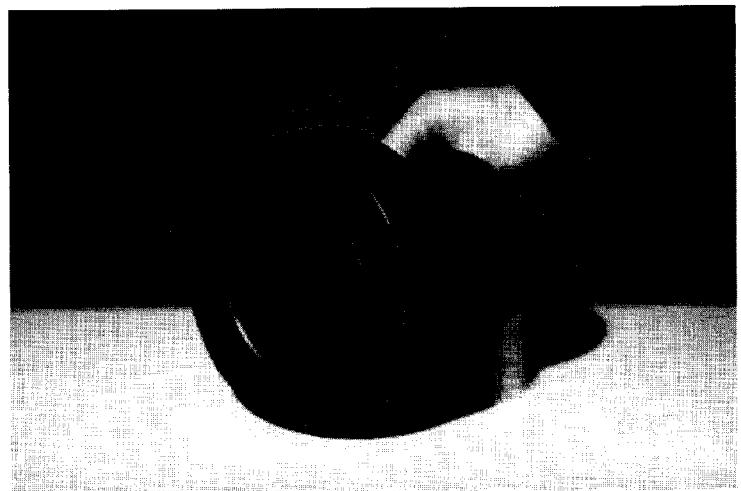
Figure 74 This is a single unit that is slipped onto the roller bearing. It could be designed as two halves (see figures 65 to 67).
83.

Having thus described the invention and illustrated its use, what I claim as new and is desired to be secured by Letters of Patent of the United States is:

1. A method of protecting railway wheelsets from damage due to impact forces during handling and storage comprising the step of providing a blocking material to absorb resistive forces acting along a horizontal plane that bisects a wheelset's center of gravity upon receipt of said impact force, wherein a roller bearing protector is provided between the roller bearing of a wheelset and the flange of an adjacent wheel during storage or handling.

2. A method of protecting railway wheelsets from damage due to impact forces during handling and storage comprising the step of providing a blocking material to absorb resistive forces acting along a horizontal plane that bisects a wheelset's center of gravity upon receipt of said impact force, wherein an axle protector is provided between the axle and the flange of an adjacent wheel during storage or handling.

3. A method of protecting railway wheelsets from damage due to impact forces during handling and storage comprising the step of providing a blocking material to absorb resistive forces acting along a horizontal plane that bisects a wheelset's center of gravity upon receipt of said impact force, wherein one or more axle spacers are provided between the axles of adjacent wheelsets being stored or moved, the axle spacer restraining movement between wheelsets.

4. A method of protecting railway wheelsets from damage due to impact forces between wheel flanges and roller bearings of adjacent wheelsets during handling and storage comprising the removal of gaps between adjacent wheelsets to prevent relative movement between wheelsets, wherein a roller bearing protector is provided between the roller bearing of a wheelset and the flange of an adjacent wheel during storage or handling.

5. A method of protecting railway wheelsets from damage due to impact forces between wheel flanges and roller bearings of adjacent wheelsets during handling and storage comprising the removal of gaps between adjacent wheelsets to prevent relative movement between wheelsets, wherein an axle protector is provided between the axle and the flange of an adjacent wheel during storage or handling.

6. A method of protecting railway wheelsets from damage due to impact forces between wheel flanges and roller bearings of adjacent wheelsets during handling and storage comprising the removal of gaps between adjacent wheelsets to prevent relative movement between wheelsets wherein one or more axle spacers are provided between the axles of adjacent wheelsets being stored or moved, the axle spacer restraining movement between wheelsets.

7. A method of protecting railway wheelsets from damage due to impact forces between wheel flanges and roller bearings of adjacent wheelsets during handling and storage comprising the step of increasing the contact area on a wheelset to decrease the pressure on the wheelset due to impact forces received, wherein a roller bearing protector is provided between the roller bearing of a wheelset and the flange of an adjacent wheel during storage or handling.

8. A system for preventing damage to railway wheelsets from impact forces during handling and storage comprising roller bearing protectors, axle protectors, and axle spacers formed of resilient material to block, remove or diffuse shock forces received by individual wheelsets.

9. A method of protecting railway wheelsets that are loaded or stored in an interlocking two tier formation from damage due to impact forces between wheel flanges and roller bearings of adjacent wheelsets during handling and storage, wherein an offset transporter is provided to prevent the alignment of wheel flanges and roller bearings during storage or handling.

10. The method of claim 9, wherein lateral stoppers are used to allow a second row of wheelsets to be stored or transported in an offset tier arrangement.

11. A method of protecting railway wheelsets that are loaded or stored in an interlocking two tier formation from damage due to impact forces between wheel flanges and roller bearings of adjacent wheelsets during handling and storage, wherein individual cradles that cradle each axle of the wheelsets are provided to act as wheelset stoppers on a wheel transporter to restrict movement of wheelsets relative to each other during storage or handling.

* * * * *

UNITED STATES PATENT AND TRADEMARK OFFICE
CERTIFICATE OF CORRECTION

PATENT NO.    : 6,572,313 B2
DATED         : June 3, 2003
INVENTOR(S)   : Joseph Porto It is certified that error appears in the above-identified patent and that said Letters Patent is hereby corrected as shown below:

Column 2,
Line 37, delete "filly" and replace with -- fully --;

Column 5,
Line 66, delete "(";

Column 8,
Line 19, delete "if" and replace with -- If --;

Column 10,
Line 67, after "single points" delete "if" and replace with -- . If --.

Signed and Sealed this

Ninth Day of December, 2003

JAMES E. ROGAN
*Director of the United States Patent and Trademark Office*